(12) United States Patent
Tanaka et al.

(10) Patent No.: US 8,999,596 B2
(45) Date of Patent: Apr. 7, 2015

(54) FUEL CELL

(71) Applicant: Honda Motor Co., Ltd., Tokyo (JP)

(72) Inventors: Hiroyuki Tanaka, Utsunomiya (JP); Seiji Sugiura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/907,064

(22) Filed: May 31, 2013

(65) Prior Publication Data

US 2013/0337358 A1   Dec. 19, 2013

Related U.S. Application Data

(62) Division of application No. 12/299,283, filed as application No. PCT/JP2007/059311 on May 1, 2007, now Pat. No. 8,475,972.

(30) Foreign Application Priority Data

| May 1, 2006 | (JP) | 2006-127578 |
| Oct. 5, 2006 | (JP) | 2006-274165 |
| Dec. 11, 2006 | (JP) | 2006-333305 |
| Feb. 9, 2007 | (JP) | 2007-030448 |

(51) Int. Cl.
*H01M 2/08* (2006.01)
*H01M 2/38* (2006.01)
(Continued)

(52) U.S. Cl.
CPC .......... *H01M 8/0271* (2013.01); *H01M 8/0206* (2013.01); *H01M 8/0228* (2013.01);
(Continued)

(58) Field of Classification Search
USPC ........................................ 429/507–514, 460
See application file for complete search history.

(56) References Cited

U.S. PATENT DOCUMENTS 5,472,801 A   12/1995 Mattejat et al.
6,566,001 B2   5/2003 Yosida et al.
(Continued)

FOREIGN PATENT DOCUMENTS

CA   2404166 A1   3/2003
CA   2414979 A1   6/2003
(Continued)

OTHER PUBLICATIONS

Canadian Office Action for Application No. 2,763,084, 3 pages, dated Oct. 1, 2013.
(Continued)

*Primary Examiner* — Muhammad Siddiquee
(74) *Attorney, Agent, or Firm* — Nelson Mullins Riley & Scarborough LLP; Anthony A. Laurentano; Matthew T. Fagan

(57) ABSTRACT

A fuel cell stack comprising a second metal separator set to have an external dimension larger than a first metal separator, wherein the second metal separator comprises, formed integrally, a first seal member in contact with the peripheral edge of a first electrolyte membrane/electrode structure, a second seal member in contact with the peripheral edge of the first metal separator, and a third seal member in contact with the peripheral edge of an adjoining fourth metal separator. Since the first seal member, the second seal member and the third seal member are integrally formed on one surface of the second separator or one surface of the first separator, a seal-forming step can be carried out at one effort, simply and economically. In addition, use of a triple seal structure containing the first through the third seal members can favorably improve the sealing feature of reaction gas and minimize reaction gas leakage.

5 Claims, 48 Drawing Sheets

(51) Int. Cl.
　　　*H01M 8/02*　　　(2006.01)
　　　*H01M 8/10*　　　(2006.01)
　　　*H01M 8/24*　　　(2006.01)

(52) U.S. Cl.
　　　CPC .......... *H01M 8/0254* (2013.01); *H01M 8/0258* (2013.01); *H01M 8/0267* (2013.01); *H01M 8/0273* (2013.01); *H01M 8/1002* (2013.01); *H01M 8/241* (2013.01); *Y02E 60/521* (2013.01)

(56) References Cited

U.S. PATENT DOCUMENTS

| | | |
|---|---|---|
| 6,692,860 B2 | 2/2004 | Inoue et al. |
| 6,815,115 B2 | 11/2004 | Sugita et al. |
| 2002/0122970 A1* | 9/2002 | Inoue et al. ............ 429/35 |
| 2002/0127461 A1 | 9/2002 | Sugita et al. |
| 2002/0187384 A1 | 12/2002 | Kato et al. |
| 2003/0031914 A1 | 2/2003 | Frank et al. |
| 2003/0129474 A1* | 7/2003 | Kikuchi et al. ......... 429/35 |
| 2005/0095492 A1 | 5/2005 | Frank et al. |
| 2005/0153192 A1 | 7/2005 | Nakagawa et al. |
| 2006/0216572 A1 | 9/2006 | Yoshida et al. |

FOREIGN PATENT DOCUMENTS

| | | |
|---|---|---|
| CA | 2632597 A1 | 6/2003 |
| CA | 2479325 A1 | 2/2005 |
| CA | 2519825 A1 | 4/2006 |
| JP | 6-218275 | 8/1994 |
| JP | 2000-21434 | 1/2000 |
| JP | 2002-25587 | 1/2002 |
| JP | 2002-100381 | 4/2002 |
| JP | 2002-270202 | 9/2002 |
| JP | 2004-335178 | 11/2004 |
| JP | 2005-339891 | 12/2005 |
| JP | 2006-93086 | 4/2006 |

OTHER PUBLICATIONS

Canadian Office Action for Application No. 2,763,084, 3 pages, dated Nov. 27, 2012.

Chinese Office Action for Application No. 201210022450.1, 9 pages, dated Nov. 25, 2013.

* cited by examiner

Prior Art

//FUEL CELL

RELATED APPLICATIONS

This application is a divisional of U.S. application Ser. No. 12/299,283, filed 31 Oct. 2008, which is a 35 U.S.C. 371 national stage filing of International Application No. PCT/JP2007/059311, filed 1 May 2007, which claims priority to Japanese Patent Application No. 2006-127578, filed 1 May 2006, Japanese Patent Application No. 2006-274165, filed 5 Oct. 2006, Japanese Patent Application No. 2006-333305, filed 11 Dec. 2006, and Japanese Patent Application No. 2007-030448, filed 9 Feb. 2007, all filed in Japan. This application is also related to Japanese Patent Application No. 2007-119308 filed 27 Apr. 2007. The contents of the aforementioned applications are hereby incorporated by reference.

TECHNICAL FIELD

The present invention relates to a fuel cell including an electrolyte electrode assembly and first and second separators sandwiching the electrolyte electrode assembly. The electrolyte electrode assembly includes electrodes and an electrolyte interposed between the electrodes.

BACKGROUND ART

For example, a solid polymer electrolyte fuel cell employs a solid polymer electrolyte membrane. The solid polymer electrolyte membrane is a polymer ion exchange membrane. In the fuel cell, the solid polymer electrolyte membrane is interposed between an anode and a cathode each comprising an electrode catalyst layer and porous carbon to form a membrane electrode assembly (electrolyte electrode assembly). The membrane electrode assembly is sandwiched between separators (bipolar plates) to form a unit cell. In use, normally, a predetermined number of unit cells are stacked together to form a fuel cell stack.

In general, the fuel cell adopts so called internal manifold structure where supply passages and discharge passages extend through the separators in the stacking direction. The fuel gas, the oxygen-containing gas, and the coolant are supplied from the respective supply passages to a fuel gas flow field, an oxygen-containing gas flow field, and a coolant flow field, and then, discharged to the respective discharge passages.

Therefore, in the fuel cell, it is necessary to prevent leakage of the fuel gas, the oxygen-containing gas, and the coolant individually. In this regard, for example, a fuel cell disclosed in Japanese Laid-Open Patent Publication No. 2002-270202 is known. In the fuel cell stack, as shown in FIG. 45, fuel cells 1001 are stacked together, and each of the fuel cells 1001 is formed by sandwiching an electrode assembly 1002 between a first separator 1003 and a second separator 1004.

The electrode assembly 1002 includes an anode 1002b, a cathode 1002c, and an electrolyte membrane 1002a interposed between the anode 1002b and the cathode 1002c. The surface area of the cathode 1002c is smaller than the surface area of the anode 1002b. The first separator 1003 and the second separator 1004 are hermetically sealed by an outer seal member 1005a, and a space between the second separator 1004 and the outer end of the electrode assembly 1002 are hermetically sealed by an inner seal member 1005b. Further, a seal member 1005c is provided between the fuel cells 1001.

As shown in FIG. 46, in the fuel cell 1001 disclosed in Japanese Laid-Open Patent Publication No. 2002-270202, a fuel gas inlet 1007a, an oxygen-containing gas inlet 1008a, and a coolant inlet 1009a are formed at one end of first and second separators 1003, 1004 in a longitudinal direction, and a fuel gas outlet 1007b, an oxygen-containing gas outlet 1008b, and a coolant outlet 1009b are formed at the other end of the first and second separators 1003, 1004 in the longitudinal direction.

In the fuel cell 1001, the dimensions of the first and second separators 1003, 1004 are relatively large in comparison with the outer dimensions of the electrode assembly 1002. In the case of adopting a structure where several hundreds of the fuel cells 1001 are stacked together and used as the fuel cell stack in a vehicle application, the overall size and weight of the fuel cell stack may become large undesirably.

Further, in the fuel cell 1001, an outer seal member 1005 and an inner seal member 1006 having desired shapes are formed beforehand, and then, the outer seal member 1005 and the inner seal member 1006 are supported, e.g., by the second separator 1004. Thus, the process of producing the fuel cell 1001 and operation of assembling the fuel cell 1001 may become complicated undesirably.

Further, in a fuel cell disclosed in Japanese Laid-Open Patent Publication No. 2002-025587, as shown in FIG. 47, a fuel unit cell 1101 is sandwiched between a first separator 1102 and a second separator 1103. The fuel unit cell 1101 is formed by sandwiching a solid polymer electrolyte membrane 1104 between a cathode 1105 and an anode 1106. The cathode 1105 and the anode 1106 include gas diffusion layers 1105a, 1106a.

The solid polymer electrolyte membrane 1104 protrudes out from inner circumferences of the cathode 1105 and the anode 1106. The surface area of the cathode 1105 is smaller than the surface area of the anode 1106.

A first seal 1107a and a second seal 1107b are attached between the first separator 1102 and the second separator 1103. The first seal 1107a tightly contacts the solid polymer electrolyte membrane 1104, and the first seal 1107a is provided around the cathode 1105. The second seal 1107b is provided around the anode 1106, and around the first seal 1107a. Thus, leakage of the oxygen-containing gas is prevented by the first seal 1107a, and leakage of the fuel gas is prevented by the second seal 1107b. In the structure, the first seal 1107a and the second seal 1107b are provided at positions deviated laterally with respect to the stacking direction of the fuel cell. Therefore, reduction in the overall thickness of the fuel cell in the stacking direction is achieved.

In the case of the fuel unit cell 1101, at the time of stacking a plurality of the fuel unit cells 1101, a coolant flow field is formed between each fuel unit cell 1101 along the electrode surface for cooling the fuel unit cell 1101. Thus, a seal member for preventing leakage of the coolant needs to be provided between each fuel unit cell 1101. In the presence of the seal member, the fuel unit cells 1101 tend to be spaced from each other, and reduction in the overall size of the fuel cell stack may not be achieved.

In a process control apparatus disclosed in Japanese Laid-Open Patent Publication No. 06-218275, as shown in FIG. 48, stack plates each formed by overlapping two plates in parallel with each other, and units 1202 are stacked alternately. The unit 1202 is formed by sandwiching an MEA 1202a between an anode 1202b and a cathode 1202c, and sandwiching these components between a pair of contact plates 1202d.

A first chamber 1203a is formed between the plate 1201a and the unit 1202, a second chamber 1203b is formed between the plate 1201b and the unit 1202, and a third chamber 1203c is formed between the plates 1201a, 1201b. A passage 1205 extends through ends of the plates 1201a, 1201b through packings 1204.

The passage 1205 is connected to, e.g., the second chamber 1203*b* through a flow field 1206 between the plates 1201*a*, 1201*b*. Though not shown, two other passages extend in the stacking direction, and the other two passages are connected to the first chamber 1203*a* and the third chamber 1203*c*, respectively through flow fields (not shown) between the plates 1201*a*, 1201*b*.

However, in the process control apparatus, the flow field 1206 for connecting the passage 1205 extending in the stacking direction to the second chamber 1203*b* needs to have the sufficient flow field height in the stacking direction, and the sufficient seal height by the packing 1204, in order for sufficient fluid to flow therethrough. Thus, the space between the units 1202 becomes considerably large, and reduction in the overall size of the fuel cell cannot be achieved.

In particular, a fuel cell stack mounted in a vehicle is formed by stacking a large number of, e.g., several hundreds of fuel cells. Therefore, space between the fuel cells becomes large, and reduction in the overall size of the fuel cell cannot be achieved.

DISCLOSURE OF THE INVENTION

An object of the present invention is to provide a fuel cell which makes it possible to perform, in particular, seal forming operation economically and efficiently, while effectively improving the performance of preventing leakage of reactant gases.

Another object of the present invention is to provide a fuel cell which makes it possible to suitably reduce the overall weight and size of the fuel cell, in particular, even if a larger number of components are stacked to form the fuel cell.

Still another object of the present invention is to provide a fuel cell which makes it possible to simplify the structure of the fuel cell, and, in particular, economically and efficiently perform seal forming operation.

Still another object of the present invention is to provide a fuel cell which makes it possible to suitably prevent leakage of a fuel gas, an oxygen-containing gas, and a coolant, and reduce the thickness in the stacking direction as much as possible.

Still another object of the present invention is to provide a fuel cell in which reactant gases suitably flow between reactant gas passages extending in the stacking direction and reactant gas flow fields extending along the electrode surfaces, and which makes it possible to reduce the thickness in the stacking direction.

The present invention relates to a fuel cell including an electrolyte electrode assembly and first and second separators sandwiching the electrolyte electrode assembly. The electrolyte electrode assembly includes a first electrode, a second electrode, and an electrolyte interposed between the first electrode and the second electrode. The second electrode has a surface area smaller than that of the first electrode.

The first separator faces the first electrode, the second separator has outer dimensions different from those of the first separator, and faces the second electrode. A first seal member, a second seal member, and a third seal member are formed integrally on one surface of the second separator or on one surface of the first separator. The first seal member contacts the electrolyte at an outer end of the electrolyte electrode assembly. The second seal member contacts an outer end of the first separator or the second separator. A third seal member contacts an outer end of the adjacent second separator or an outer end of the adjacent first separator.

Further, in a fuel cell according to the present invention, outer dimensions of the first separator are smaller than those of the second separator, and fluid passages at least including a fuel gas supply passage, a fuel gas discharge passage, an oxygen-containing gas supply passage, an oxygen-containing gas discharge passage extend through an outer end of the second separator in the stacking direction, at positions outside the outer end of the first separator.

Further, in a fuel cell according to the present invention, outer dimensions of the second metal separator are larger than those of the first metal separator, metal of the first metal separator is exposed over the entire surface, and a seal member is formed integrally only on the second metal separator.

The seal member is formed on one surface of the second metal separator facing the electrode. The seal member includes an inner seal contacting an outer end of the electrolyte electrode assembly, and an outer seal contacting an outer end of the adjacent second metal member.

Further, in a fuel cell according to the present invention, at least the first separator or the second separator includes a first seal for preventing leakage of the fuel gas, a second seal for preventing leakage of the oxygen-containing gas, and a third seal for preventing leakage of the coolant. The first seal, the second seal, and the third seal are offset from one another in the stacking direction.

Further, in a fuel cell according to the present invention, the electrolyte electrode assembly has an uneven portion in the same plane as the electrode surface, and the uneven portion forms a connection channel connecting the reactant gas flow field to the reactant gas passage. Uneven portions of adjacent electrolyte electrode assemblies in the stacking direction are offset from each other in the stacking direction.

Further, in a fuel cell according to the present invention, the first electrolyte electrode assembly has a first uneven portion in the same plane as the electrode surface, and the first uneven portion forms a first connection channel connecting the reactant gas flow field for supplying the reactant gas along the electrode surface, to the reactant gas passage. The second electrolyte electrode assembly has a second uneven portion in the same plane as the electrode surface, and the second uneven portion forms a second connection channel connecting the reactant gas flow field for supplying the reactant gas along the electrode surface, to the reactant gas passage. The first uneven portion and the second uneven portion are offset from each other in the stacking direction.

In the present invention, the first seal member, the second seal member, and the third seal member are formed integrally on one surface of the second separator or on one surface of the second separator. Thus, the seal forming process is significantly simplified, and carried out economically. Further, by adopting triple seal structure including the first to third seal members, improvement in the reactant gas sealing performance is achieved suitably, and leakage of the reactant gas is prevented as much as possible.

Further, the outer dimensions of one of the first separator and the second separator are relatively small in comparison with the outer dimensions of the other of the first separator and the second separator. Thus, the desired rigidity at the time of stacking the fuel cells, and the rigidity of the electrode surface required for assembling the fuel cells are maintained. Further, the weight reduction of the fuel cell is achieved, and the overall weight of the fuel cell stack is reduced.

Further, in the present invention, the outer dimensions of the first separator are smaller than the outer dimensions of the second separator. The fluid passages pass through only the second separator. Thus, the size of the first separator is reduced as much as possible, and weight reduction is achieved easily. Therefore, in particular, at the time of stacking a large number of fuel cells to form a fuel cell stack, the overall size and weight of the fuel cell stack are reduced considerably.

Further, in the present invention, the seal members are formed integrally with the second metal separator. Thus, sealing structure is simplified significantly. In comparison with the structure in which the seal members having a desired shape are formed beforehand, the performance of assembling the fuel cell is improved suitably. It is because operation of positioning the seal members relative to the second metal separator is not required at the time of assembling the fuel cell.

Further, operation of forming the seal members is not required for the first metal separator, and operation of forming the seal members is only required for the second metal separator. Thus, seal forming operation is performed economically and efficiently. Reduction in the overall cost of producing the fuel cell is achieved easily.

Further, in the present invention, the first seal for preventing leakage of the fuel gas, the second seal for preventing leakage of the oxygen-containing gas, and the third seal for preventing leakage of the coolant are not overlapped with each other in the stacking direction. Thus, the sufficient seal height is achieved in each of the first seal, the second seal, and the third seal, and it is possible to suitably prevent leakage of the fuel gas, the oxygen-containing gas, and the coolant, and reduce the thickness in the stacking direction. Accordingly, the overall size of the fuel cell is reduced easily and reliably.

Further, in the present invention, the uneven portions provided in the electrolyte electrode assemblies adjacent to each other in the stacking direction are offset from each other in the stacking direction. Therefore, the adjacent channels are not overlapped with each other in the stacking direction. Thus, it is possible to reduce the thickness in the stacking direction in each unit cell, while maintaining the sufficient flow field height and seal height in the channel connecting the reactant gas flow field and the reactant gas passages. Accordingly, the overall size of the fuel cell is reduced easily, and in particular, the size of the fuel cell stack mounted in the vehicle is reduced suitably.

Further, in the present invention, the first electrolyte electrode assembly and the second electrolyte electrode assembly are adjacent to each other in the stacking direction, and the first uneven portion of the first electrolyte electrode assembly and the second uneven portion of the second electrolyte electrode assembly are offset from each other in the stacking direction. Therefore, the adjacent first channel and second channel are not overlapped with each other in the stacking direction. Thus, it is possible to reduce the thickness of the first unit cell and the second unit cell in the stacking direction while maintaining the sufficient flow field height and seal height in the first channel and the second channel connecting the reactant gas flow field to the reactant gas passages. Accordingly, the overall size of the fuel cell is reduced easily, and in particular, the size of the fuel cell stack mounted in the vehicle is reduced suitably.

BEST MODE FOR CARRYING OUT THE INVENTION

Figure 1:
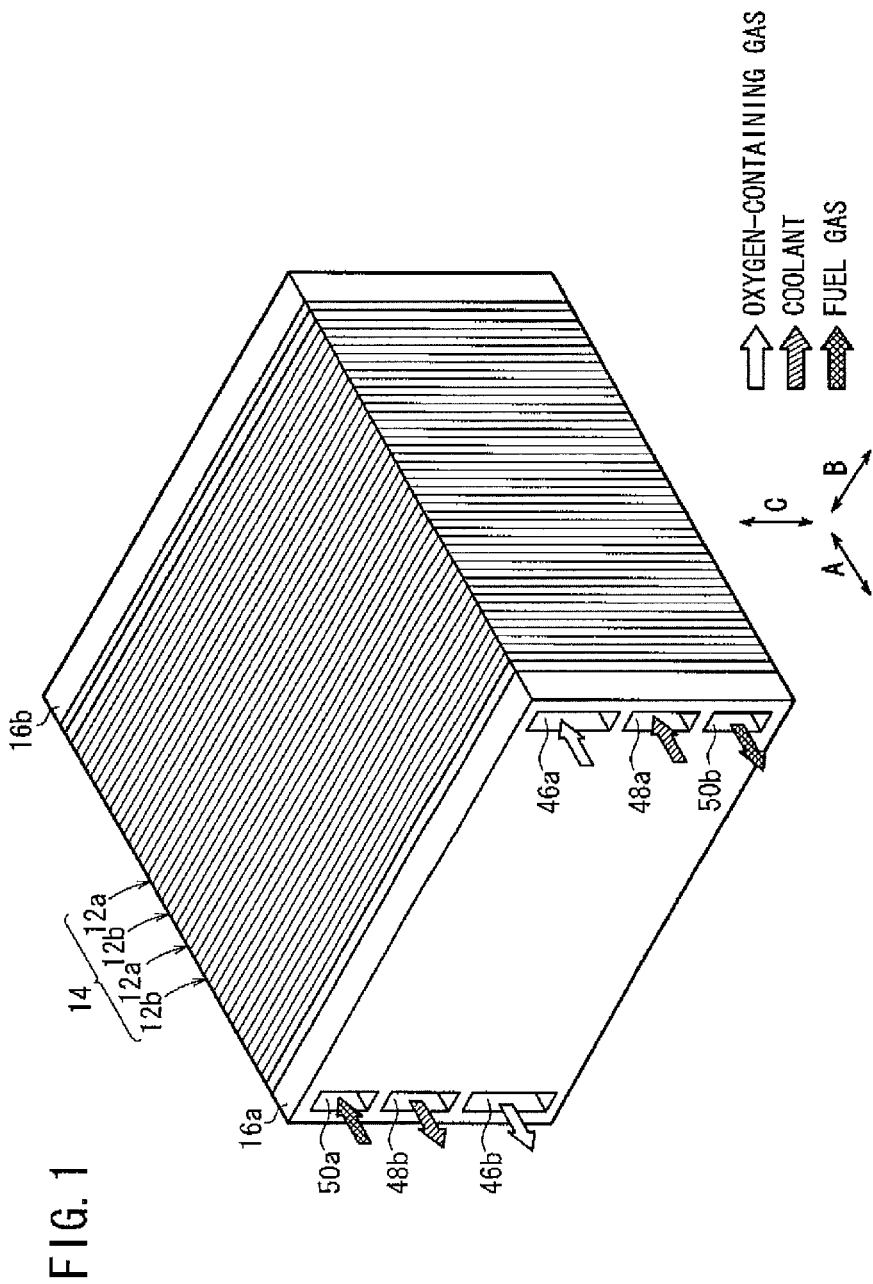
FIG. 1 is a schematic perspective view showing a fuel cell according to a first embodiment of the present invention.
Figure 2:
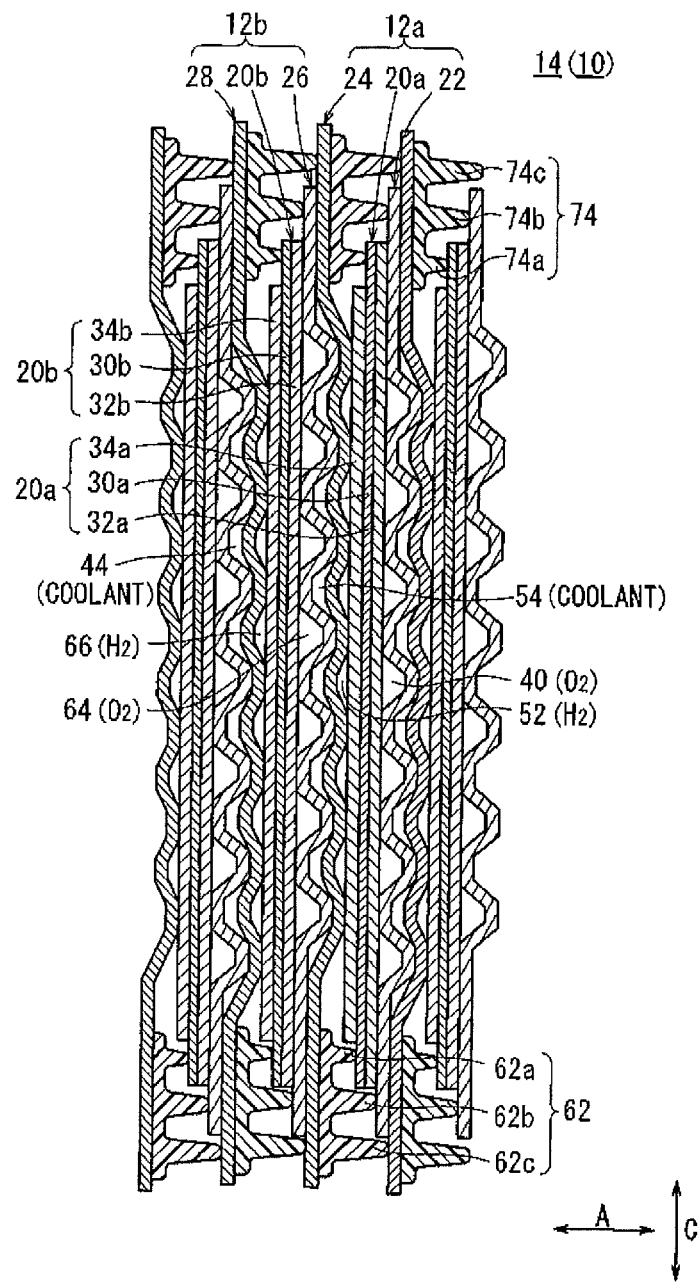
FIG. 2 is a cross sectional view showing the fuel cell.

FIG. 1 is a perspective view schematically showing a fuel cell 10 according to a first embodiment of the present invention. FIG. 2 is a cross sectional view showing the fuel cell 10.

The fuel cell 10 includes a stack body 14 formed by stacking unit cells 12a, 12b alternately in a horizontal direction indicated by an arrow A. End plates 16a, 16b are provided at opposite ends of the stack body 14 in the stacking direction. Though components between the end plates 16a, 16b are tightened together by tie-rods (not shown) in the embodiment, for example, the entire stack body 14 may be placed in a casing (not shown).

The unit cell 12a is formed by sandwiching a first membrane electrode assembly (electrolyte electrode assembly) 20a between a first metal separator 22 and a second metal separator 24. The unit cell 12b is formed by sandwiching a second membrane electrode assembly 20b between a third metal separator 26 and a fourth metal separator 28. The unit cells 12a, 12b are oppositely oriented to each other at an angle of 180° on a plane of the unit cells 12a, 12b. In practice, the second membrane electrode assembly 20b is the same as the first membrane electrode assembly 20a, the third metal separator 26 is the same as the first metal separator 22, and the fourth metal separator 28 is the same as the second metal separator 24.

Figure 3:
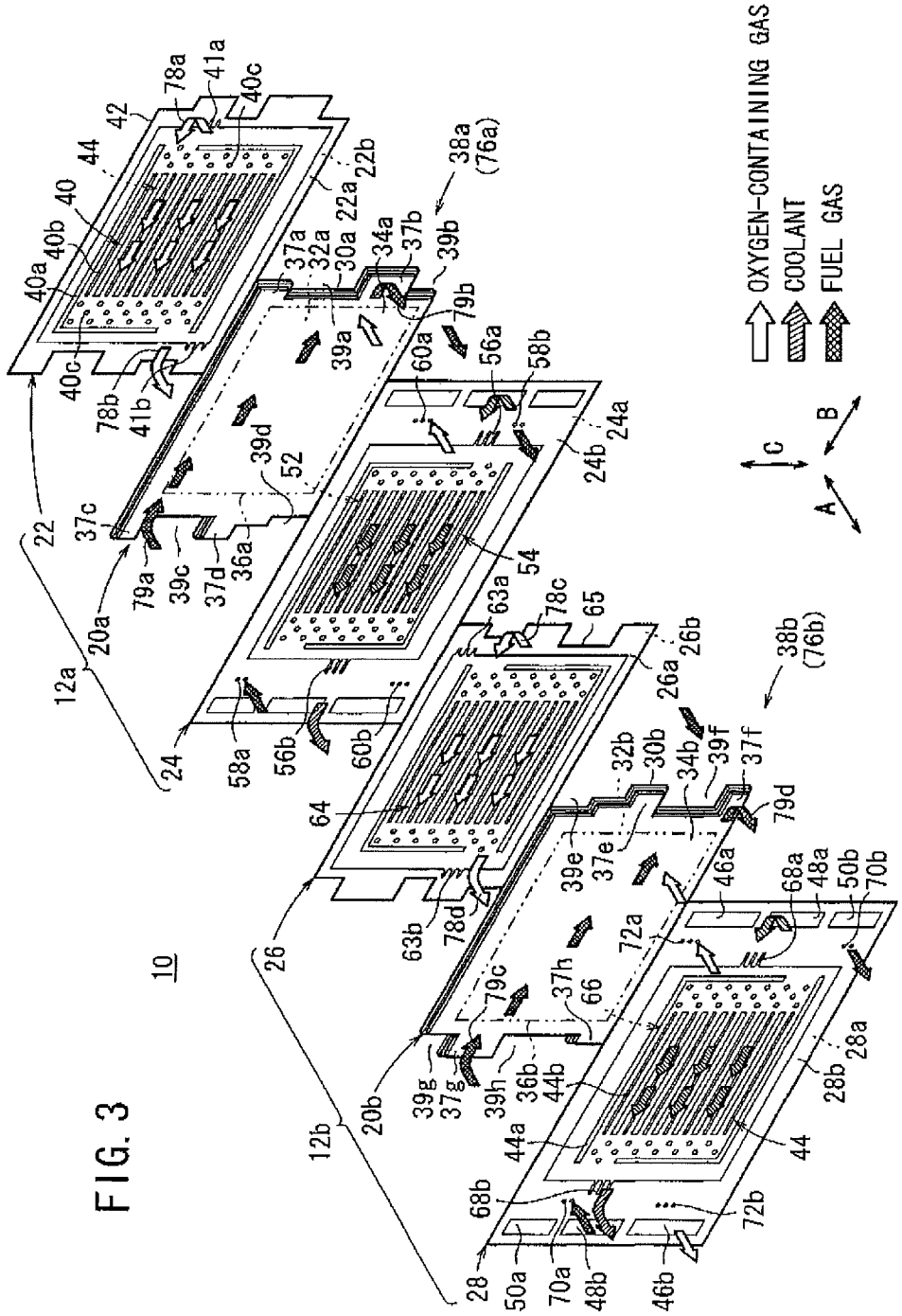
FIG. 3 is an exploded perspective view showing unit cells of the fuel cell.

As shown in FIG. 3, the first membrane electrode assembly 20a comprises a cathode (first electrode) 32a, an anode (second electrode) 34a, and a solid polymer electrolyte membrane (electrolyte) 30a interposed between the cathode 32a and the anode 34a. The solid polymer electrolyte membrane 30a is formed by impregnating a thin membrane of perfluorosulfonic acid with water, for example. The surface area of the cathode 32a is larger than the surface area of the anode 34a. The cathode 32a is provided over the entire surface of the solid polymer electrolyte membrane 30a (referred to as a stepped MEA).

Each of the cathode 32a and the anode 34a has a gas diffusion layer (not shown) such as a carbon paper, and an electrode catalyst layer (not shown) of platinum alloy supported on surfaces of porous carbon particles. The carbon particles are deposited uniformly on the surface of the gas diffusion layer. Each of the cathode 32a and the anode 34 has an area (catalyst area) 36a for applying a catalyst.

The first membrane electrode assembly 20a has a substantially quadrangular shape as a whole. At opposite ends of the first membrane electrode assembly 20a in the direction indicated by the arrow B, first uneven portions 38a are provided in the same plane as the electrode surface. The first uneven portion 38a at one end of the first membrane electrode assembly 20a in the direction indicated by the arrow B includes a first extension 37a, a first cutout 39a, a second extension 37b, and a second cutout 39b from upper to lower positions. Further, the first uneven portion 38a at the other end of the first membrane electrode assembly 20a in the direction indicated by the arrow B includes a third extension 37c, a third cutout 39c, a fourth extension 37d, and a fourth cutout 39d from upper to lower positions.

Figure 4:
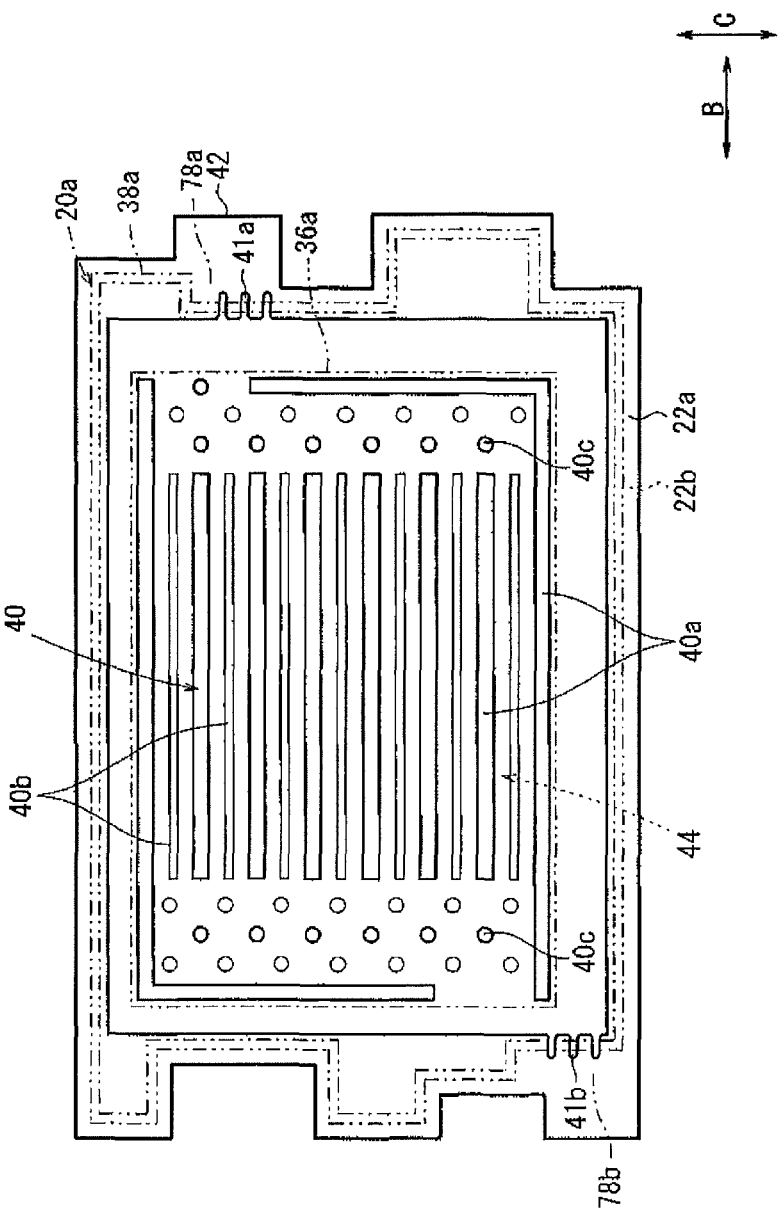
FIG. 4 is a view showing one surface of a first metal separator.

The outer dimensions of the first metal separator 22 are smaller than the outer dimensions of the second metal separator 24. As shown in FIGS. 3 and 4, the first metal separator 22 has a first oxygen-containing gas flow field (first reactant gas flow field) 40 on a surface 22a facing the first membrane electrode assembly 20a. The first oxygen-containing gas flow field (first reactant gas flow field) 40 is formed in an area corresponding to the catalyst area 36a of the first membrane electrode assembly 20a. By forming ridges 40a protruding on the side of the surface 22a and grooves 40b alternately, the first oxygen-containing gas flow field 40 extends straight in the direction indicated by the arrow B. Embossed sections 40c are formed on both sides of the first oxygen-containing gas flow field 40. At one end of the first oxygen-containing gas flow field 40 in the direction indicated by the arrow B, a corrugated inlet section 41a is formed, and likewise, at the other end of the first oxygen-containing gas flow field 40, a corrugated outlet section 41b is formed. As shown in FIG. 4, the inlet section 41a and the outlet section 41b protrude from the outer end of the first membrane electrode assembly 20a, respectively.

The first metal separator 22 has an outer shape forming section 42 having a desired uneven shape. The outer shape forming section 42 is larger than the outer size of the first membrane electrode assembly 20a. By forming the first oxygen-containing gas flow field 40 on the surface 22a of the first metal separator 22, a first coolant flow field 44 is formed on the back of the corrugated surface 22a.

As shown in FIG. 3, the second metal separator 24 has a laterally elongated rectangular shape. At one end of the second metal separator 24 and the fourth metal separator 28 in the direction indicated by the arrow B, an oxygen-containing gas supply passage 46a for supplying an oxygen-containing gas (one reactant gas), a coolant supply passage 48a for supplying a coolant, and a fuel gas discharge passage 50b for discharging a fuel gas (other reactant gas), such as a hydrogen-containing gas, are arranged vertically in a direction indicated by an arrow C. The oxygen-containing gas supply passage 46a, the coolant supply passage 48a, and the fuel gas discharge passage 50b extend through the second metal separator 24 and the fourth metal separator 28 in the direction indicated by the arrow A.

At the other end of the second metal separator 24 and the fourth metal separator 28 in the direction indicated by the arrow B, a fuel gas supply passage 50a for supplying the fuel gas, a coolant discharge passage 48b for discharging the coolant, and an oxygen-containing gas discharge passage 46b for discharging the oxygen-containing gas are arranged vertically in the direction indicated by the arrow C. The fuel gas supply passage 50a, the coolant discharge passage 48b, and the oxygen-containing gas discharge passage 46b extend through the second metal separator 24 and the fourth metal separator 28 in the direction indicated by the arrow A.

Figure 5:
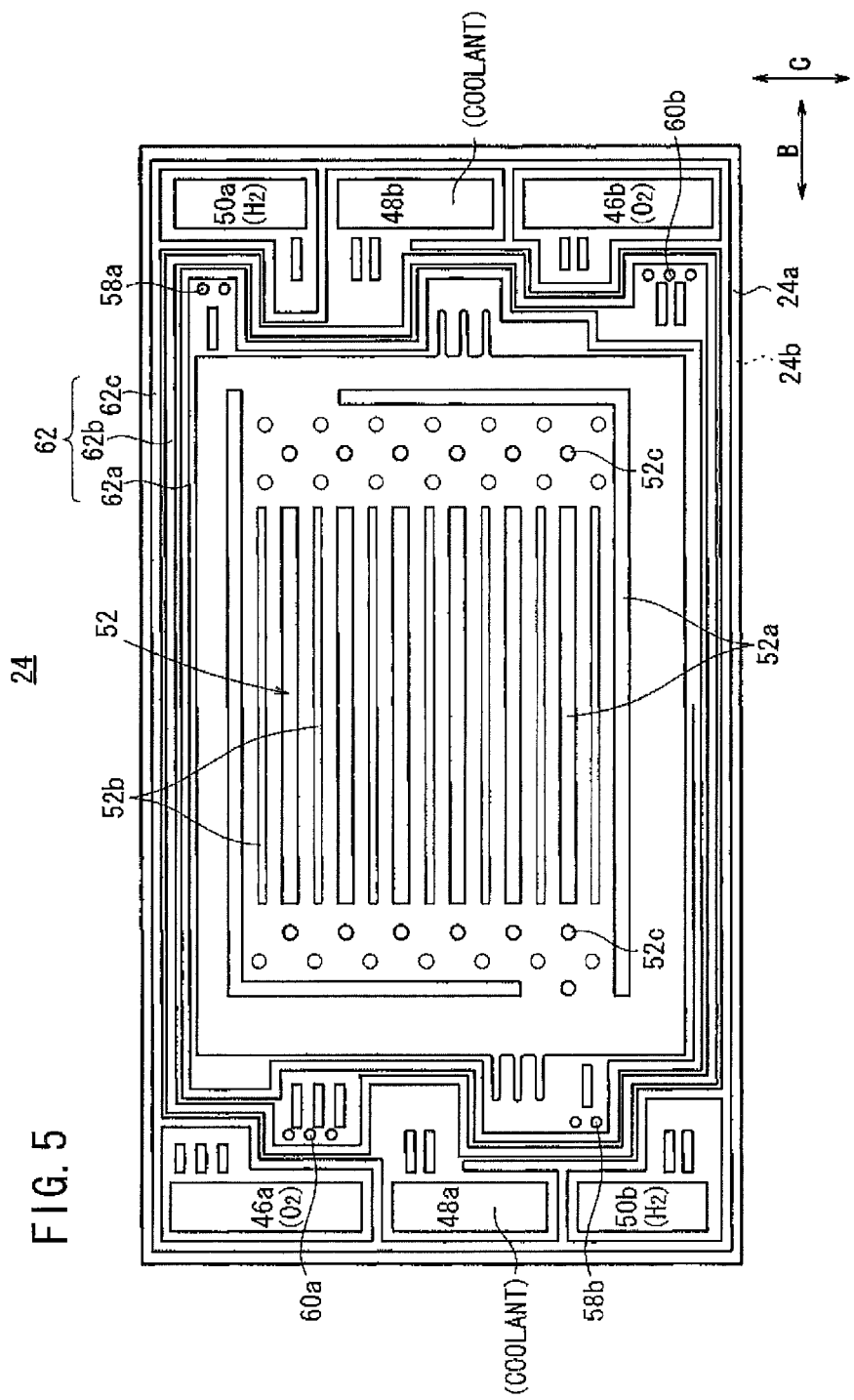
FIG. 5 is a view showing one surface of a second metal separator.

As shown in FIG. 5, the second metal separator 24 has a first fuel gas flow field (second reactant gas flow field) 52 on a surface 24a facing the first membrane electrode assembly 20a. The first fuel gas flow field 52 is formed in an area corresponding to the catalyst area 36a of the first membrane electrode assembly 20a. By forming ridges 52a protruding on the side of the surface 24a and grooves 52b alternately, the first fuel gas flow field 52 extends in the direction indicated by the arrow B. Embossed sections 52c are formed on both sides of the first fuel gas flow field 52.

Figure 6:
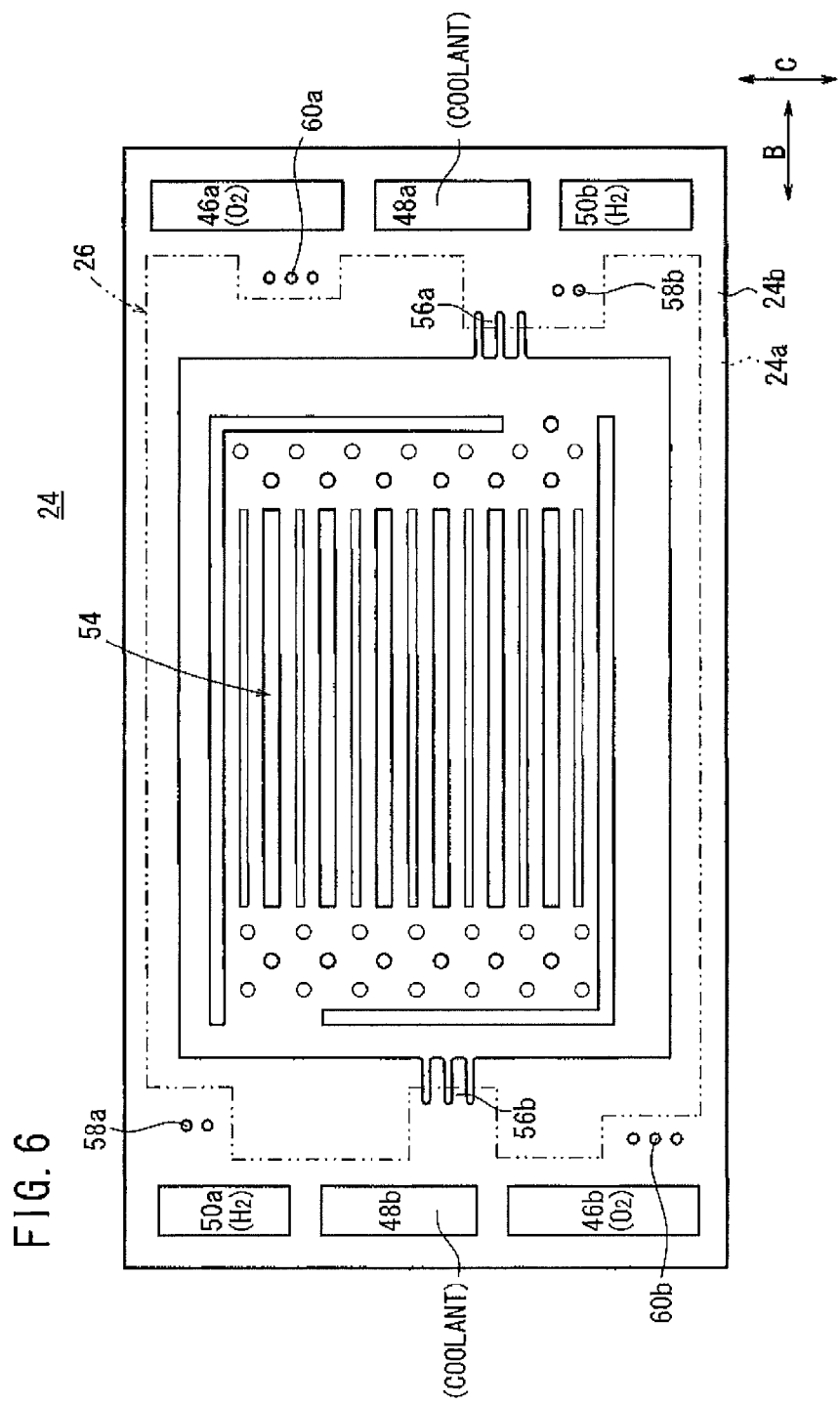
FIG. 6 is a view showing the other surface of the second metal separator.

As shown in FIG. 6, the second metal separator 24 has a second coolant flow field 54 on a surface 24b, i.e., on the back of the surface 24a forming the first fuel gas flow field 52. At one end of the second coolant flow field 54 in the direction indicated by the arrow B, a corrugated inlet section 56a is formed, and likewise, at the other end of the second coolant flow field 54 in the direction indicated by the arrow B, a corrugated outlet section 56b is formed.

When the second metal separator 24 and the third metal separator 26 are stacked together, the inlet section 56a and the outlet section 56b are provided at cutouts of the third metal separator 26. The coolant supply passage 48a is connected to the second coolant flow field 54 through the inlet section 56a and the coolant discharge passage 48b is connected to the second coolant flow field 54 through the outlet section 56b.

The second metal separator 24 has two fuel gas inlet holes 58a adjacent to the fuel gas supply passage 50a, and two fuel gas outlet holes 58b adjacent to the fuel gas discharge passage 50b. Further, the second metal separator 24 has three oxygen-containing gas inlet holes 60a near the oxygen-containing gas supply passage 46a, and three oxygen-containing gas outlet holes 60b near the oxygen-containing gas discharge passage 46b.

As shown in FIGS. 2 and 5, a seal member 62 is formed integrally on a surface 24a of the second metal separator 24, around the first fuel gas flow field 52. The seal member 62 includes a first seal (first seal member) 62a as an inner seal formed integrally with the second metal separator 24, a second seal (second seal member) 62b positioned outside the first seal 62a, and a third seal (third seal member) 62c as an outer seal positioned outside the second seal 62b. The seal member 62 is made of an EPDM (Etylene Propylene rubber), a silicone rubber, a nitrile rubber, or an acrylic rubber. For example, the seal member 62 is formed by injection molding using melted resin obtained by heating silicone resin to a predetermined temperature (e.g., 160° C. to 170° C.).

The first seal member 62a contacts the outer end of the first membrane electrode assembly 20a, i.e., the outer end of the solid polymer electrolyte membrane 30a. The second seal member 62b contacts the outer end of the first metal separator 22. The third seal member 62c contacts the fourth metal separator 28 corresponding to the second metal separator of the adjacent unit cell 12b.

The first seal member 62a forms an inner seal member for preventing leakage of the fuel gas, the second seal member 62b forms an intermediate seal member for preventing leakage of the oxygen-containing gas, and the third seal member 62c forms an outer seal member for preventing leakage of the coolant.

The second membrane electrode assembly 20b has the same structure as the first membrane electrode assembly 20a. At opposite ends of the second membrane electrode assembly 20b in the direction indicated by the arrow B, second uneven portions 38b are provided in the same plane as the electrode surface. The second uneven portion 38b at one end of the second membrane electrode assembly 20b in the direction indicated by the arrow B includes a fifth cutout 39e, a fifth extension 37e, a sixth cutout 39f, and a sixth extension 37f from upper to lower positions. Further, the second uneven portion at the other end of the second membrane electrode assembly 20b in the direction indicated by the arrow B includes a seventh cutout 39g, a seventh extension 37g, an eighth cutout 39h, and an eighth extension 37h from upper to lower positions.

The third metal separator 26 has a second oxygen-containing gas flow field 64 on a surface 26a facing the second membrane electrode assembly 20b. At one end of the second oxygen-containing gas flow field 64 in the direction indicated by the arrow B, a corrugated inlet section 63a is formed, and likewise, at the other end of the second oxygen-containing gas flow field 64 in the direction indicated by the arrow B, a corrugated outlet section 63b is formed. The inlet section 63a and the outlet section 63b protrude from the outer ends of the second membrane electrode assembly 20b, respectively. Thus, when the surface 26b of the third metal separator 26 is stacked on the surface 24b of the second metal separator 24, the second coolant flow field 54 is formed between the second metal separator 24 and the third metal separator 26. The third metal separator 26 has an outer shape forming portion 65 having a predetermined uneven shape.

Figure 7:
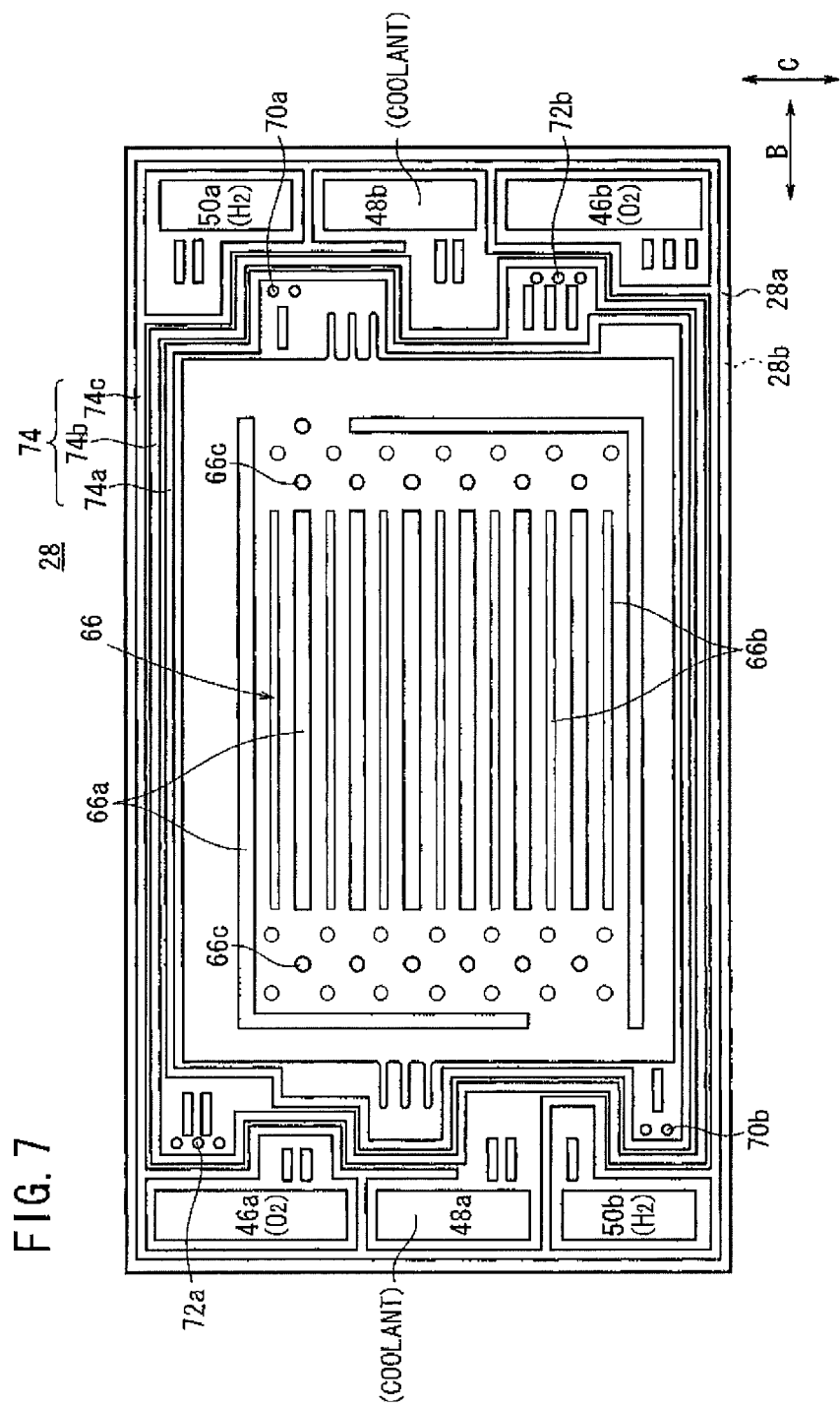
FIG. 7 is a view showing one surface of a fourth metal separator.

As shown in FIG. 7, the fourth metal separator 28 has a second fuel gas flow field 66 on a surface 28a facing the second membrane electrode assembly 20b. The second fuel gas flow field 66 includes ridges 66a and grooves 66b, extending in the direction indicated by the arrow B. At opposite ends of the second fuel gas flow field 66, embossed sections 66c are formed.

Figure 8:
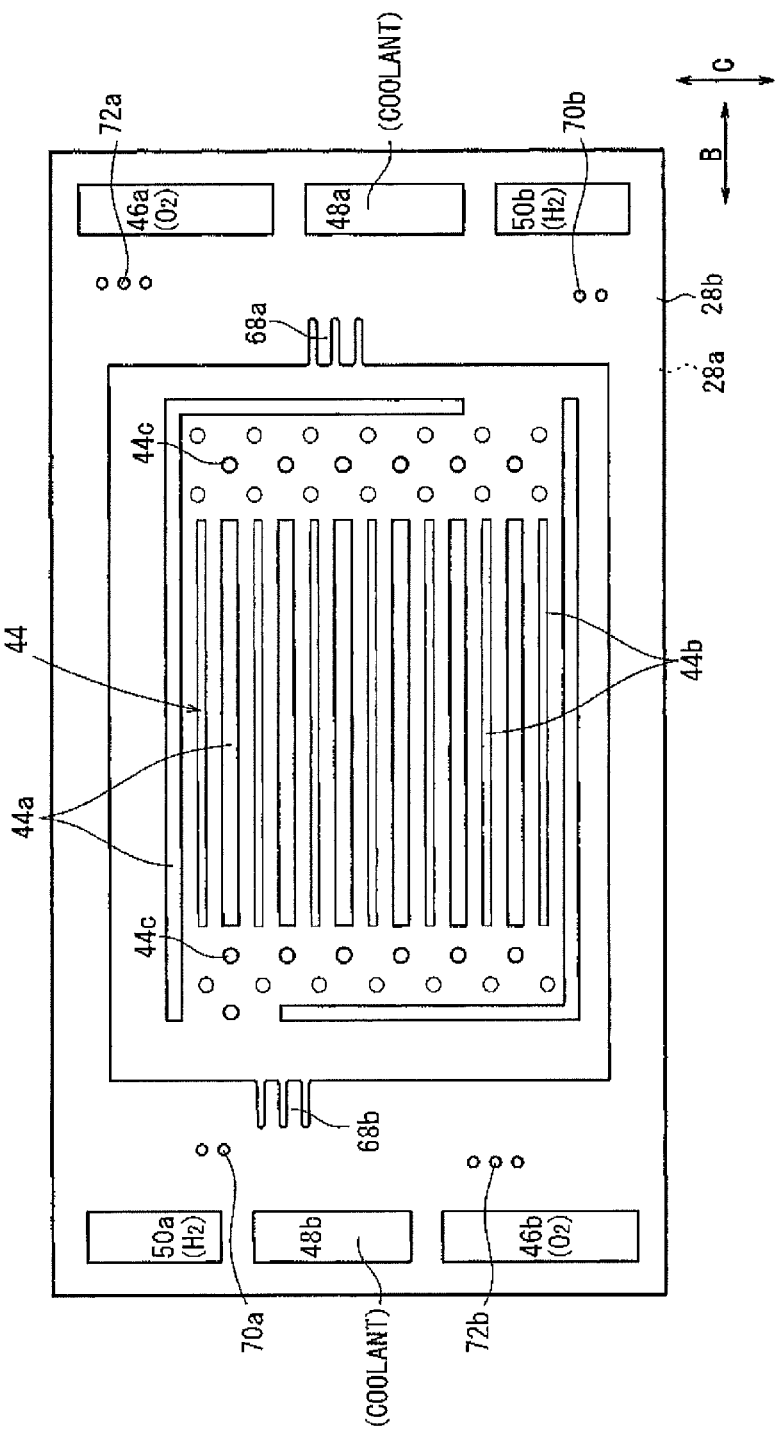
FIG. 8 is a view showing the other surface of the fourth metal separator.

As shown in FIG. 8, the first coolant flow field 44 is formed on a surface 28b of the fourth metal separator 28, i.e., on the back of the surface 28a forming the second fuel gas flow field 66. When the fourth metal separator 28 is stacked on the first metal separator 22, the first coolant flow field 44 is formed between the first metal separator 22 and the fourth metal separator 28. At opposite ends of the first coolant flow field 44 in the direction indicated by the arrow B, a corrugated inlet section 68a and a corrugated outlet section 68b are provided at outer positions.

The inlet section 68a and the outlet section 68b connect the coolant supply passage 48a and the coolant discharge passage 48b to the first coolant flow field 44 through cutouts of the first metal separator 22.

The fourth metal separator 28 has two inlet holes 70a and two outlet holes 70b at positions deviated from the two inlet holes 58a and the two outlet holes 58b of the second metal separator 24 in the stacking direction. Further, the fourth metal separator 28 has three inlet holes 72a and three outlet holes 72b at positions deviated from the three inlet holes 60a and the three outlet holes 60b in the stacking direction.

As shown in FIG. 7, a seal member 74 is formed integrally on a surface 28a of the fourth metal separator 28, around the second fuel gas flow field 66. The seal member 74 includes a first seal (first seal member) 74a as an inner seal, a second seal (second seal member) 74b as an intermediate seal positioned outside the first seal 74a, and a third seal (third seal member) 74c as an outer seal positioned outside the second seal 74b. The first seal 74a as the inner seal for preventing leakage of the fuel gas contacts the outer end of the solid polymer electrolyte membrane 30b of the second membrane electrode assembly 20b, the second seal 74b as the intermediate seal for preventing leakage of the oxygen-containing gas contacts the outer end of the third metal separator 26, and the third seal 74c as the outer seal for preventing leakage of the coolant contacts the outer end of the second metal separator 24 of the unit cell 12a.

Figure 9:
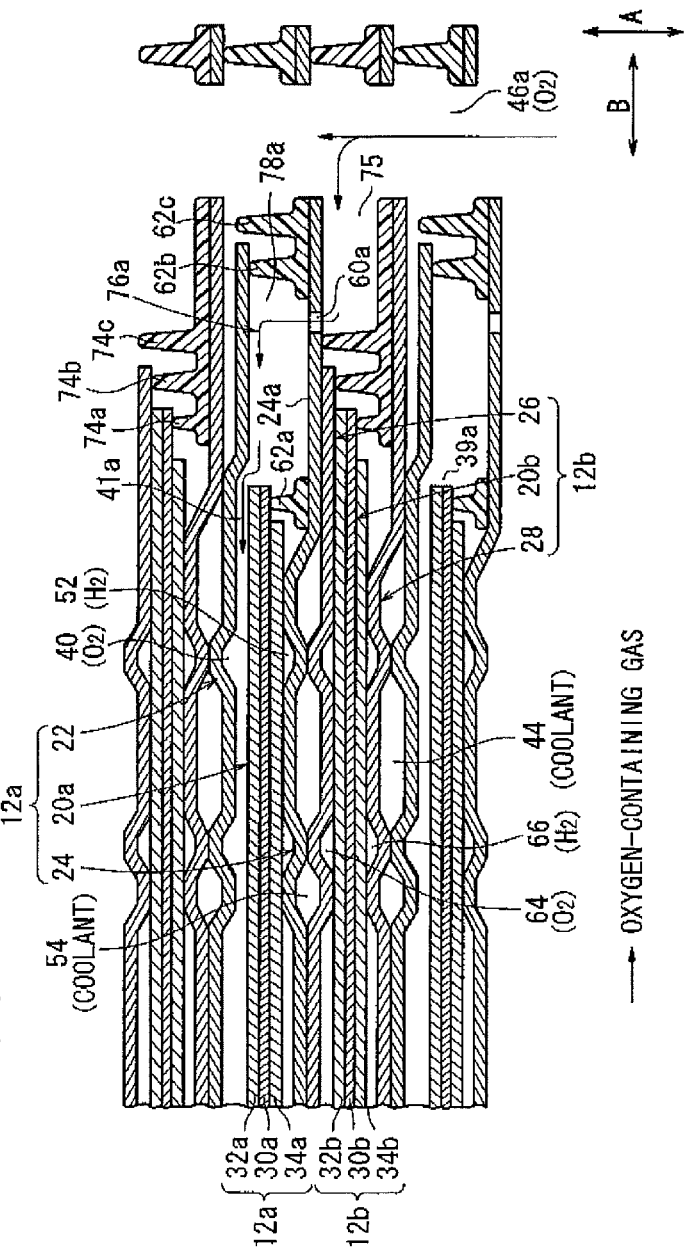
FIG. 9 is a view showing a flow of an oxygen-containing gas in the fuel cell.
Figure 10:
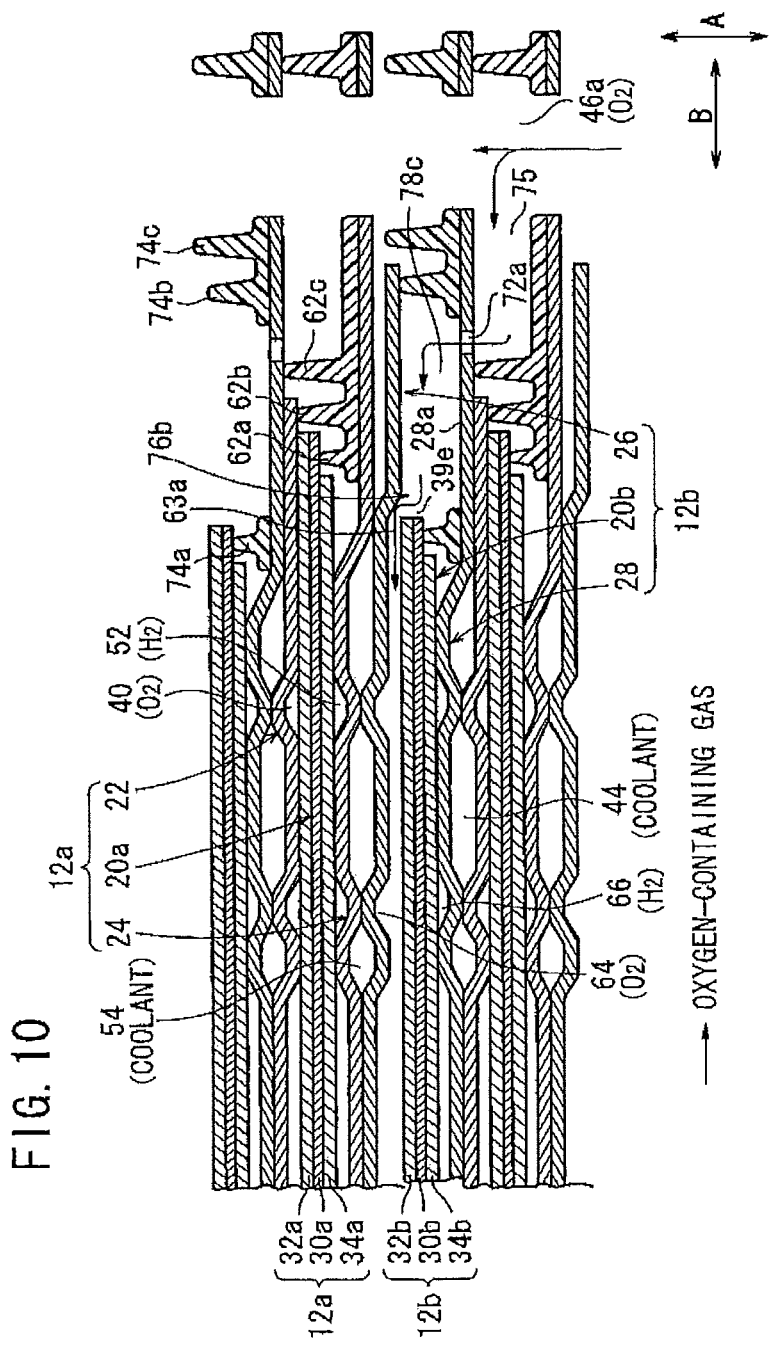
FIG. 10 is a view showing another flow of the oxygen-containing gas in the fuel cell.
Figure 11:
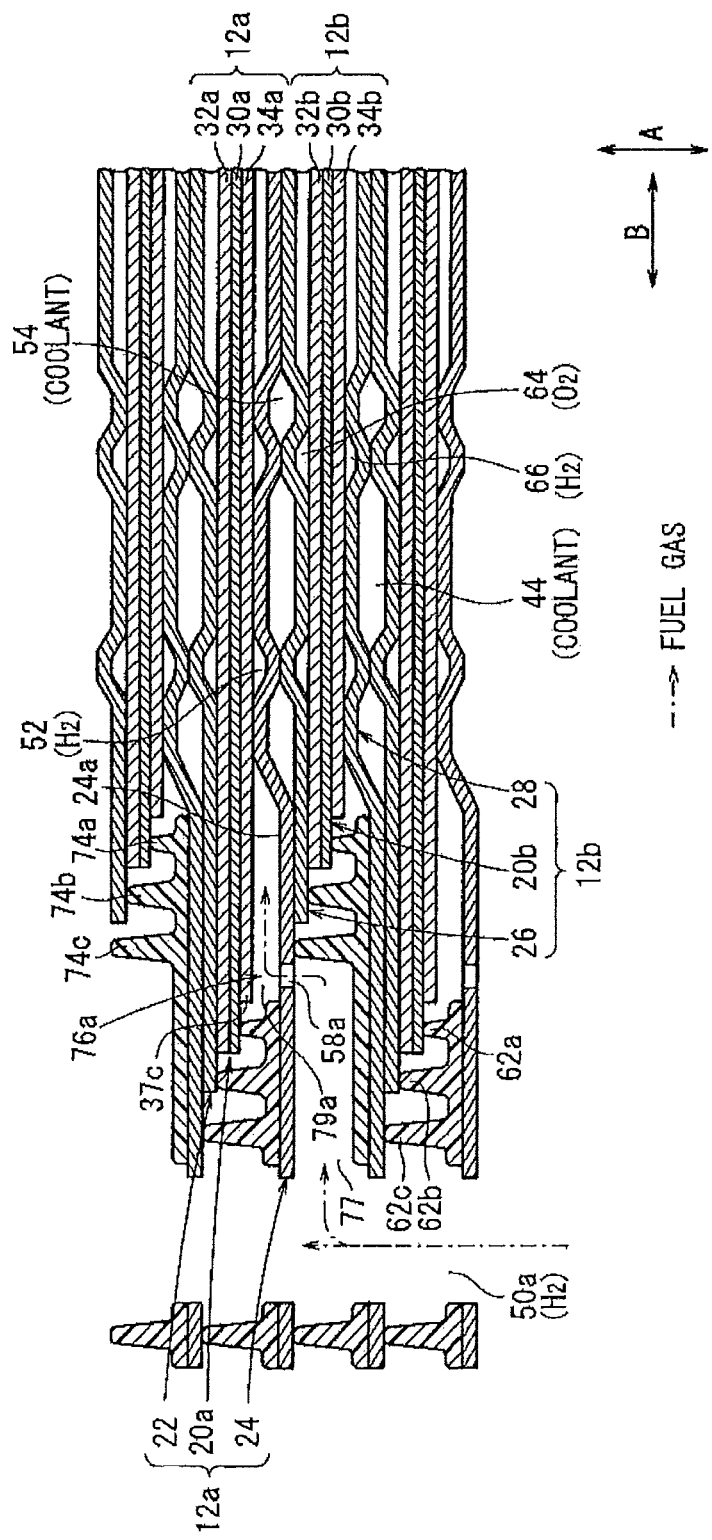
FIG. 11 is a view showing a flow of a fuel gas in the fuel cell.
Figure 12:
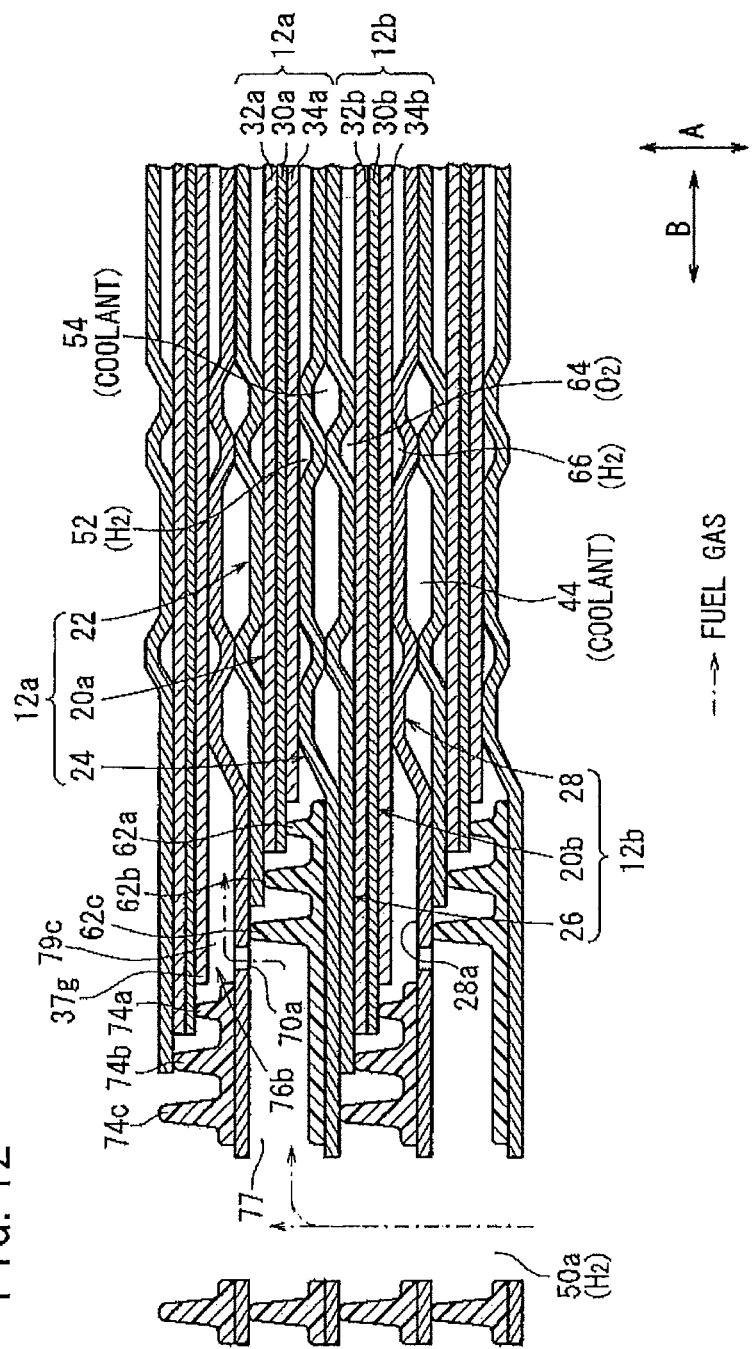
FIG. 12 is a view showing another flow of the fuel gas in the fuel cell.

As shown in FIGS. 9 and 10, the second metal separator 24 and the fourth metal separator 28 include a channel 75 connecting the oxygen-containing gas supply passage 46a to the first oxygen-containing gas flow field 40 and the second oxygen-containing gas flow field 64 in the presence of the third seals 62c, 74c. The channel 75 includes inlet holes (through holes) 60a, 72a for the oxygen-containing gas. Likewise, as shown in FIGS. 11 and 12, the second metal separator 24 and the fourth metal separator 28 include a channel 77 connecting the fuel gas supply passage 50a to the first fuel gas flow field 52 and the second fuel gas flow field 66 in the presence of the third seals 62c, 74c. The channel 77 includes inlet holes (through holes) 58a, 70a for the fuel gas.

A first channel 76a is formed in the unit cell 12a by the first uneven portion 38a, and a second channel 76b is formed in the unit cell 12b by the second uneven portion 38b.

As shown in FIG. 9, the first channel 76a is formed at the first cutout 39a between the first metal separator 22 and the second metal separator 24. The first channel 76a includes a first oxygen-containing gas supply connection channel 78a connecting the oxygen-containing gas supply passage 46a to the first oxygen-containing gas flow field 40. As shown in FIG. 11, the first channel 76a includes a first fuel gas supply connection channel 79a formed between the third extension 37c and the second metal separator 24 for connecting the fuel gas supply passage 50a to the first fuel gas flow field 52.

As shown in FIG. 3, the first channel 76a includes a first oxygen-containing gas discharge connection channel 78b formed at the fourth cutout 39d between the first metal separator 22 and the second metal separator 24 for connecting the oxygen-containing gas discharge passage 46b to the first oxygen-containing gas flow field 40. The first channel 76a includes a first fuel gas discharge connection channel 79b formed between the second extension 37b and the second metal separator 24 for connecting the fuel gas supply passage 50a to the first fuel gas flow field 52.

As shown in FIG. 10, the second channel 76b includes a second oxygen-containing gas supply connection channel 78c formed at the fifth cutout 39e between the third metal separator 26 and the fourth metal separator 28 for connecting the oxygen-containing gas supply passage 46a to the second oxygen-containing gas flow field 64. As shown in FIG. 12, the second channel 76b includes a second fuel gas supply connection channel 79c formed between the seventh extension 37g and the fourth metal separator 28 for connecting the fuel gas supply passage 50a to the second fuel gas flow field 66.

As shown in FIG. 3, the second channel 76b includes a second oxygen-containing gas discharge connection channel 78d formed at the eighth cutout 39h between the third metal separator 26 and the fourth metal separator 28 for connecting the oxygen-containing gas discharge passage 46b to the second oxygen-containing gas flow field 64. The second channel 76b includes a second fuel gas discharge connection channel 79d formed between the sixth extension 37f and the fourth metal separator 28 for connecting the fuel gas supply passage 50a to the second fuel gas flow field 66.

Operation of the fuel cell 10 having the above structure will be described below.

As shown in FIG. 1, at the end plate 16a, an oxygen-containing gas is supplied to the oxygen-containing gas supply passage 46a, and a fuel gas such as a hydrogen-containing gas is supplied to the fuel gas supply passage 50a. Further, a coolant such as pure water or ethylene glycol is supplied to the coolant supply passage 48a.

As shown in FIG. 6, the second metal separator 24 of the unit cell 12a has the three inlet holes 60a connected to the oxygen-containing gas supply passage 46a from the surface 24b. Further, as shown in FIG. 8, the fourth metal separator 28 of the unit cell 12b has the three inlet holes 72a connected to the oxygen-containing gas supply passage 46a from the surface 28b.

In the structure, as shown in FIG. 9, some of the oxygen-containing gas supplied to the oxygen-containing gas supply passage 46a flows through the inlet holes 60a of the second metal separator 24 to the first oxygen-containing gas supply connection channel 78a on the surface 24a, and the oxygen-containing gas flows into the first oxygen-containing gas flow field 40 from the inlet section 41a of the first metal separator 22.

As shown in FIG. 10, in the unit cell 12b, some of the oxygen-containing gas supplied to the oxygen-containing gas supply passage 46a flows through the inlet holes 72a of the fourth metal separator 28 to the second oxygen-containing gas supply connection channel 78c on the surface 28a, and the oxygen-containing gas flows into the second oxygen-containing gas flow field 64 from the inlet section 63a of the third metal separator 26.

Further, as shown in FIG. 6, the second metal separator 24 has two inlet holes 58a connected to the fuel gas supply passage 50a on the surface 24b. As shown in FIG. 8, the fourth metal separator 28 has two inlet holes 70a connected to the fuel gas supply passage 50a on the surface 28b.

Thus, as shown in FIG. 11, some of the fuel gas supplied to the fuel gas supply passage 50a flows through the inlet holes 58a of the second metal separator 24 to the first fuel gas supply connection channel 79a on the surface 24a, and the fuel gas is supplied to the first fuel gas flow field 52 connected to the first fuel gas supply connection channel 79a.

Further, as shown in FIG. 12, some of the fuel gas supplied to the fuel gas supply passage 50a flows through the inlet holes 70a of the fourth metal separator 28 to the second fuel gas supply connection channel 79c on the surface 28a, and the fuel gas is supplied to the second fuel gas flow field 66 connected to the second fuel gas supply connection channel 79c.

Thus, as shown in FIG. 3, in the first membrane electrode assembly 20a, the oxygen-containing gas supplied to the cathode 32a and the fuel gas supplied to the anode 34a are consumed in the electrochemical reactions at electrode catalyst layers for generating electricity. Similarly, in the second membrane electrode assembly 20b, the oxygen-containing gas supplied to the cathode 32b and the fuel gas supplied to the anode 34b are consumed for generating electricity.

The oxygen-containing gas from the first oxygen-containing gas flow field 40 of the unit cell 12a flows from the outlet section 41b to the first oxygen-containing gas discharge connection channel 78b, and flows to the surface 24b through the outlet holes 60b of the second metal separator 24. Then, the oxygen-containing gas is discharged to the oxygen-containing gas discharge passage 46b. Likewise, the oxygen-containing gas from the second oxygen-containing gas flow field 64 of the unit cell 12b flows from the outlet section 63b to the second oxygen-containing gas discharge connection channel 78d. Then, the oxygen-containing gas is discharged to the oxygen-containing gas discharge passage 46b through the outlet holes 72b of the fourth metal separator 28.

Further, the fuel gas from the first fuel gas flow field 52 of the second metal separator 24 flows into the first fuel gas discharge connection channel 79b, and flows toward the surface 24b through the outlet holes 58b. Then, the fuel gas is discharged to the fuel gas discharge passage 50b. Likewise, the fuel gas from the second fuel gas flow field 66 of the fourth metal separator 28 flows into the second fuel gas discharge connection channel 79d, and flows toward the surface 28b through the outlet holes 70b. Then, the fuel gas is discharged to the fuel gas discharge passage 50b.

Further, as shown in FIG. 8, the inlet section 68a and the outlet section 68b connected to the first coolant flow field 44 are provided on the surface 28b of the fourth metal separator 28. The inlet section 68a and the outlet section 68b are provided at positions corresponding to the cutouts of the first metal separator 22.

Figure 13:
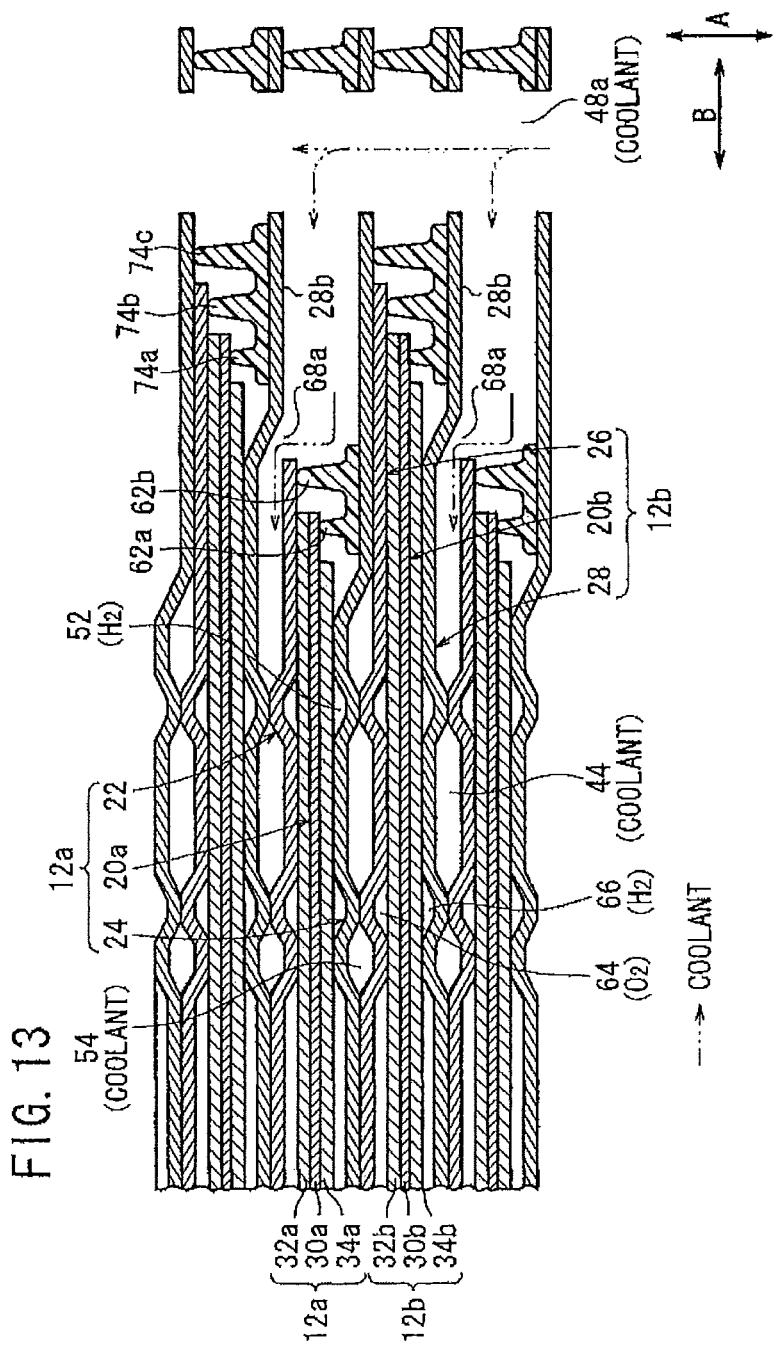
FIG. 13 is a view showing a flow of a coolant in the fuel cell.

In the structure, as shown in FIG. 13, the coolant supplied to the coolant supply passage 48a flows from the surface 28b of the fourth metal separator 28 to the first coolant flow field 44 formed between the fourth metal separator 28 and the first metal separator 22 through the inlet section 68a. After the coolant flows through the first coolant flow field 44 for cooling the fuel cell 10, the coolant is discharged from the surface 28b to the coolant discharge passage 48b through the outlet section 68b (see FIG. 3).

As shown in FIG. 6, the inlet section 56a and the outlet section 56b connected to the second coolant flow field 54 are provided on the surface 24b of the second metal separator 24. The inlet section 56a and the outlet section 56b are provided at positions corresponding to the cutouts of the third metal separator 26.

Figure 14:
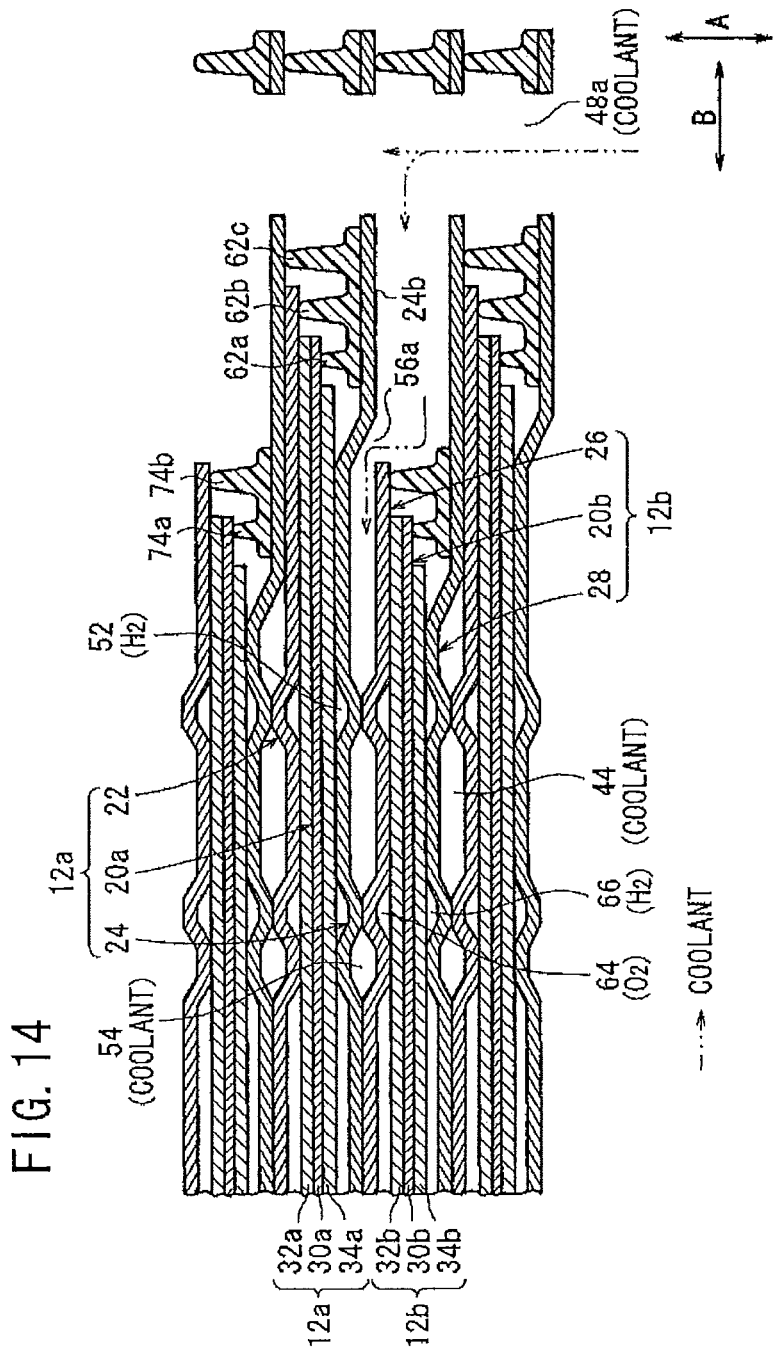
FIG. 14 is a view showing another flow of the coolant in the fuel cell.

Thus, as shown in FIG. 14, the coolant supplied to the coolant supply passage 48a flows from the surface 24b to the second coolant flow field 54 formed between the second metal separator 24 and the third metal separator 26 through the inlet section 56a. After the coolant flows through the second coolant flow field 54, the coolant is discharged through the outlet section 56b from the surface 24b into the coolant discharge passage 48b (see FIG. 3).

In the first embodiment, the outer dimensions of the first metal separator 22 of the unit cell 12a are smaller than the outer dimensions of the second metal separator 24. In the first membrane electrode assembly 20a, the surface area of the anode 34a is smaller than the surface area of the cathode 32a.

As shown in FIGS. 2 and 5, the first seal member 62a which contacts the outer end of the solid polymer electrolyte membrane 30a of the first membrane electrode assembly 20a, the second seal member 62b which contacts the outer end of the second metal separator 24, and the third seal member 62c which contacts the fourth metal separator 28 (substantially the same as the second metal separator 24) of the adjacent unit cell 12b are formed integrally on the surface 24a of the second metal separator 24.

Thus, in the second metal separator 24, simply by forming the seal only on the surface 24a, in comparison with the case where the seal is formed also on the surface 24b, the seal forming process is significantly simplified, and carried out economically.

The first seal 62a for preventing leakage of the fuel gas, the second seal 62b for preventing leakage of the oxygen-containing gas, and the third seal 62c for preventing leakage of the coolant are offset from one another in the stacking direction indicated by the arrow A. Thus, in comparison with the structure in which at least any two of the fuel gas seal, the oxygen-containing gas seal, and the coolant seal are overlapped with each other, reduction in the thickness of the fuel cell 10 is achieved easily.

In the structure, each of the first seal 62a, the second seal 62b, and the third seal 62c has the sufficient height for suitably preventing leakage of the oxygen-containing gas, the fuel gas, and the coolant. Reduction in the thickness in the stacking direction is achieved. The overall size of the fuel cell 10 is reduced easily and reliably.

Further, the fuel gas flow field 52, the inlet holes 58a, and the outlet holes 58b are sealed by triple seal structure including the first seal member 62a, the second seal member 62b, and the third seal member 62c. Thus, improvement in the fuel gas sealing performance is achieved suitably, and leakage of the fuel gas is prevented as much as possible.

Further, in the first embodiment, the oxygen-containing gas supply passage 46a, the coolant supply passage 48a, the fuel gas discharge passage 50b, the fuel gas supply passage 50a, the coolant discharge passage 48b, and the oxygen-containing gas discharge passage 46b are not provided in the first metal separator 22. In the structure, a desired rigidity at the time of stacking the unit cells 12, and the rigidity of the electrode surface required for assembling the unit cells 12a is maintained. Further, the weight reduction of the unit cell 12a is achieved, and the overall weight of the fuel cell 10 is reduced easily. Also in the unit cell 12b, the same advantages as in the case of the unit cell 12a are achieved.

In the structure, the overall weight and size of the fuel cell 10 are reduced easily. In particular, at the time of stacking a large number of unit cells 12a, 12b together to form the fuel cell 10 mounted in a vehicle, the overall weight of the fuel cell 10 is reduced significantly, and improvement in the fuel economy is achieved reliably.

Further, in the unit cell 12b, in effect, the first metal separator 22 can be used as the third metal separator 26 by 180° rotation such that the first metal separator 22 and the third metal separator 26 are oriented oppositely. The second metal separator 24 can be used as the fourth metal separator 28 by 180° rotation such that the second metal separator 24 and the fourth metal separator 28 are oriented oppositely. Thus, the fuel cell 10 has economical structure as a whole.

The first seal member 62a, the second seal member 62b, and the third seal member 62c are provided on the second metal separator 24. The rounded front ends of the first seal member 62a, the second seal member 62b, and the third seal member 62c contact the flat outer end of the solid polymer electrolyte membrane 30a, the surface 22a of the first metal separator 22, and the surface 28b of the fourth metal separator 28, respectively. In the structure, it is possible to reliably prevent decrease in the line pressure in the sealing regions, occurrence of leakage, and deformation of the separators.

In the first embodiment, the seal member 62 is formed integrally with the second metal separator 24. In the structure, unlike the structure in which the seal member 62 having a desired shape is formed beforehand, and then, the seal member 62 is joined to the second metal separator 24, operation of positioning the seal member 62 relative to the second metal separator 24 is not required. Thus, the sealing structure is simplified significantly, and performance in the operation of assembling the fuel cell 10 is improved suitably.

As shown in FIGS. 2 and 5, the first seal 62a which contacts the outer end of the solid polymer electrolyte membrane 30a of the first membrane electrode assembly 20a, the second seal 62b which contacts the outer end of the second metal separator 24, and the third seal 62c which contacts the fourth metal separator 28 (substantially the same as the second metal separator 24) of the adjacent unit cell 12b are formed integrally on the surface 24a of the second metal separator 24.

Thus, in the second metal separator 24, simply by forming the seal only on the surface 24a, in comparison with the case where the seal is formed also on the surface 24b, the seal forming process is significantly simplified, and carried out economically.

Further, in the first metal separator 22, no seal forming operation is required. Thus, it is sufficient to form the seal member 62 only on the second metal separator 24. The seal forming operation is performed simply and economically. The overall production cost of the fuel cell 10 is reduced easily.

Further, in the first embodiment, the first uneven portions 38*a* of the first membrane electrode assembly 20*a* and the second uneven portions 38*b* of the second membrane electrode assembly 20*b* which are adjacent to each other in the stacking direction are offset from each other in the stacking direction. In the structure, the adjacent first channel 76*a* and the second channel 76*b* are not overlapped with each other in the stacking direction.

Specifically, for example, the first oxygen-containing gas supply connection channel 78*a* connecting the first oxygen-containing gas flow field 40 to the oxygen-containing gas supply passage 46*a* is offset from the second oxygen-containing gas supply connection channel 78*c* connecting the second oxygen-containing gas flow field 64 to the oxygen-containing gas supply passage 46*a*, in the stacking direction. Thus, it is possible to reduce the thickness of the unit cells 12*a*, 12*b* in the stacking direction while maintaining the sufficient flow field height and the sufficient seal height in the first oxygen-containing gas supply connection channel 78*a* and the second oxygen-containing gas supply connection channel 78*c*. Accordingly, reduction in the entire size of the fuel cell 10 is achieved easily, and in particular, the size of the fuel cell stack mounted in a vehicle is suitably reduced.

Figure 15:
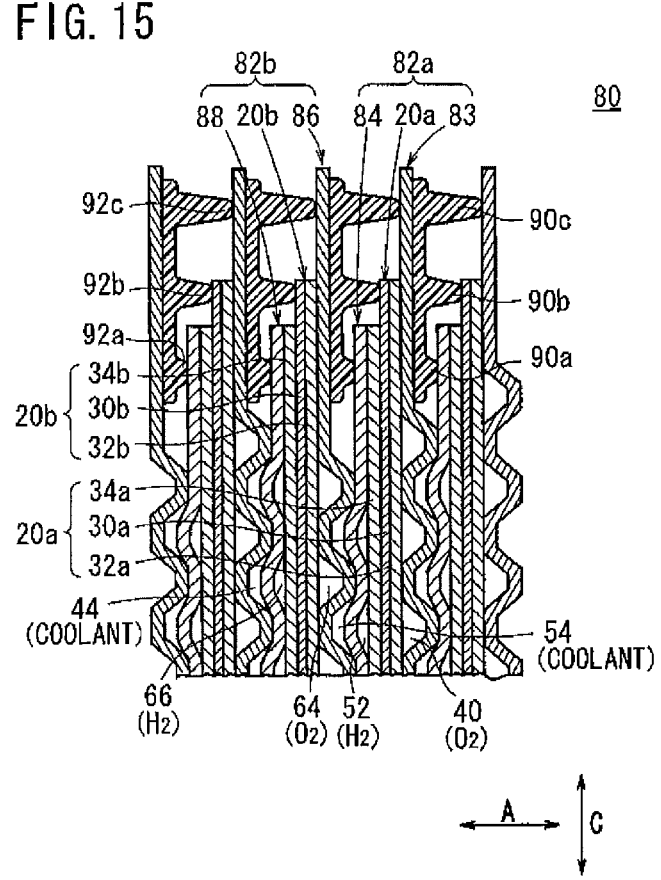
FIG. 15 is a partial cross sectional view showing a fuel cell according to a second embodiment of the present invention.

FIG. 15 is a partial cross sectional view showing a fuel cell 80 according to a second embodiment of the present invention. The constituent elements that are identical to those of the fuel cell 10 according to the first embodiment are labeled with the same reference numerals, and detailed description thereof will be omitted. Also in third to sixteenth embodiments as described later, the constituent elements that are identical to those of the fuel cell 10 according to the first embodiment are labeled with the same reference numerals, and detailed description thereof will be omitted.

The fuel cell 80 is formed by stacking unit cells 82*a*, 82*b* alternately in the direction indicated by the arrow A. The unit cell 82*a* is formed by sandwiching a first membrane electrode assembly 20*a* between a first metal separator 83 and a second metal separator 84. The unit cell 82*b* is formed by sandwiching a second membrane electrode assembly 20*b* between a third metal separator 86 and a fourth metal separator 88.

The outer dimensions of the first metal separator 83 are larger than the outer dimensions of the second metal separator 84. The first metal separator 83 has an inner seal (second seal member, third seal) 90*a* for preventing leakage of the coolant, an intermediate seal (first seal member, first seal) 90*b* provided outside the inner seal 90*a* for preventing leakage of the fuel gas, and an outer seal (third seal member, second seal) 90*c* provided outside the intermediate seal 90*b* for preventing leakage of the oxygen-containing gas.

The outer dimensions of the third metal separator 86 are larger than the outer dimensions of the fourth metal separator 88. The third metal separator 86 has an inner seal (second seal member) 92*a* for preventing leakage of the coolant, an intermediate seal (first seal member) 92*b* provided outside the inner seal 92*a* for preventing leakage of the fuel gas, and an outer seal (third seal member) 92*c* provided outside the intermediate seal 92*b* for preventing leakage of the oxygen-containing gas.

In effect, the first metal separator 83 is used as the third metal separator 86 by 180° rotation such that the first metal separator 83 and the third metal separator 86 are oriented oppositely. In effect, the second metal separator 84 is used as the fourth metal separator 88 by 180° rotation such that the second metal separator 84 and the fourth metal separator 88 are oriented oppositely.

The inner seals 90*a*, 92*a* contact the outer ends of the fourth metal separator 88 and the second metal separator 84, respectively. The intermediate seals 90*b*, 92*b* contact the outer end of the solid polymer electrolyte membrane 30*b* of the second membrane electrode assembly 20*b* and the outer end of the solid polymer electrolyte membrane 30*a* of the first membrane electrode assembly 20*a*, respectively. The outer seals 90*c*, 92*c* contact the outer ends of third metal separator 86 and the first metal separator 83 which are adjacent to each other.

In the second embodiment having the above structure, in the unit cell 82*a*, the inner seal 90*a*, the intermediate seal 90*b*, and the outer seal 90*c* are formed integrally on only one surface of the first metal separator 83. Thus, seal forming process is significantly simplified, and carried out economically. Further, as the fuel gas seal structure, dual seal structure including the intermediate seal 90*b* and the outer seal 90*c* is adopted. Thus, the same advantages as in the case of the first embodiment are obtained. For example, the performance of preventing the leakage of the fuel gas is improved suitably.

Figure 16:
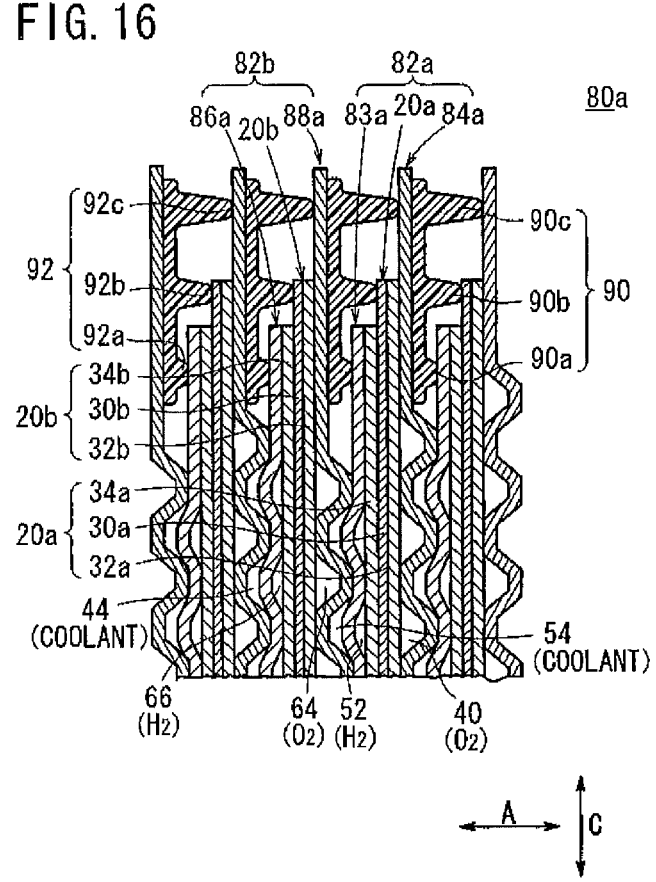
FIG. 16 is a partial cross sectional view showing a fuel cell according to a third embodiment of the present invention.

FIG. 16 is a partial cross sectional view showing a fuel cell 80*a* according to a third embodiment of the present invention. The constituent elements that are identical to those of the fuel cell 80 according to the second embodiment are labeled with the same reference numerals, and detailed description thereof will be omitted.

The fuel cell 80*a* is formed by stacking unit cells 82*a*, 82*b* alternately in the direction indicated by the arrow A. The unit cell 82*a* is formed by sandwiching a first membrane electrode assembly 20*a* between a first metal separator 83*a* and a second metal separator 84*a*. The unit cell 82*b* is formed by sandwiching a second membrane electrode assembly 20*b* between a third metal separator 86*a* and a fourth metal separator 88*a*.

The outer dimensions of the first metal separator 83*a* are smaller than the outer dimensions of the second metal separator 84*a*. A seal member 90 is formed integrally with the second metal separator 84*a*. The seal member 90 includes an inner seal 90*a* for preventing leakage of the coolant, an intermediate seal 90*b* provided outside the inner seal 90*a* for preventing leakage of the fuel gas, and an outer seal 90*c* provided outside the intermediate seal 90*b* for preventing leakage of the oxygen-containing gas.

The outer dimensions of the third metal separator 86*a* are smaller than the outer dimensions of the fourth metal separator 88*a*. A seal member 92 is formed integrally with the fourth metal separator 88*a*. The seal member 92 includes an inner seal 92*a* for preventing leakage of the coolant, an intermediate seal 92*b* provided outside the inner seal 92*a* for preventing leakage of the fuel gas, and an outer seal 92*c* provided outside the intermediate seal 92*b* for preventing leakage of the oxygen-containing gas.

In effect, the second metal separator 84*a* is used as the fourth metal separator 88*a* by 180° rotation such that the second metal separator 84*a* and the fourth metal separator 88*a* are oriented oppositely. In effect, the first metal separator 83*a* is used as the third metal separator 86*a* by 180° rotation such that the first metal separator 83*a* and the third metal separator 86*a* are oriented oppositely.

The inner seals 90*a*, 92*a* contact the outer ends of the third metal separator 86*a* and the first metal separator 83*a*, respectively. The intermediate seals 90*b*, 92*b* contact the outer end of the solid polymer electrolyte membrane 30*b* of the second membrane electrode assembly 20*b* and the outer end of the solid polymer electrolyte membrane 30*a* of the first membrane electrode assembly 20*a*, respectively. The outer seals 90*c*, 92*c* contact the outer ends of fourth metal separator 88*a* and the second metal separator 84*a* which are adjacent to each other.

In the third embodiment, operation of forming the seal member is not required for the first metal separator 83*a* and the third metal separator 86*a*. Thus, the seal forming process is significantly simplified, and carried out economically. The overall production cost of the fuel cell 80*a* is reduced easily.

Further, in the third embodiment, the seal member 90 includes the inner seal 90*a* for preventing leakage of the coolant, the intermediate seal 90*b* for preventing leakage of the fuel gas, and the outer seal 90*c* for preventing leakage of the oxygen-containing gas. The inner seal member 90*a*, the intermediate seal 90*b*, and the outer seal 90*c* are offset from one another in the stacking direction. Likewise, the seal member 92 includes the inner seal 92*a* for preventing leakage of the coolant, the intermediate seal 92*b* for sealing the fuel gas, and the outer seal 92*c* for preventing leakage of the oxygen-containing gas. The inner seal 92*a*, the intermediate seal 92*b*, and the outer seal 92*c* are offset from one another in the stacking direction.

In the structure, it is possible to prevent leakage of the coolant, the fuel gas, and the oxygen-containing gas, and reduce the overall size of the fuel cell 80*a* while maintaining the sufficient seal height in each fluid channel.

Figure 17:
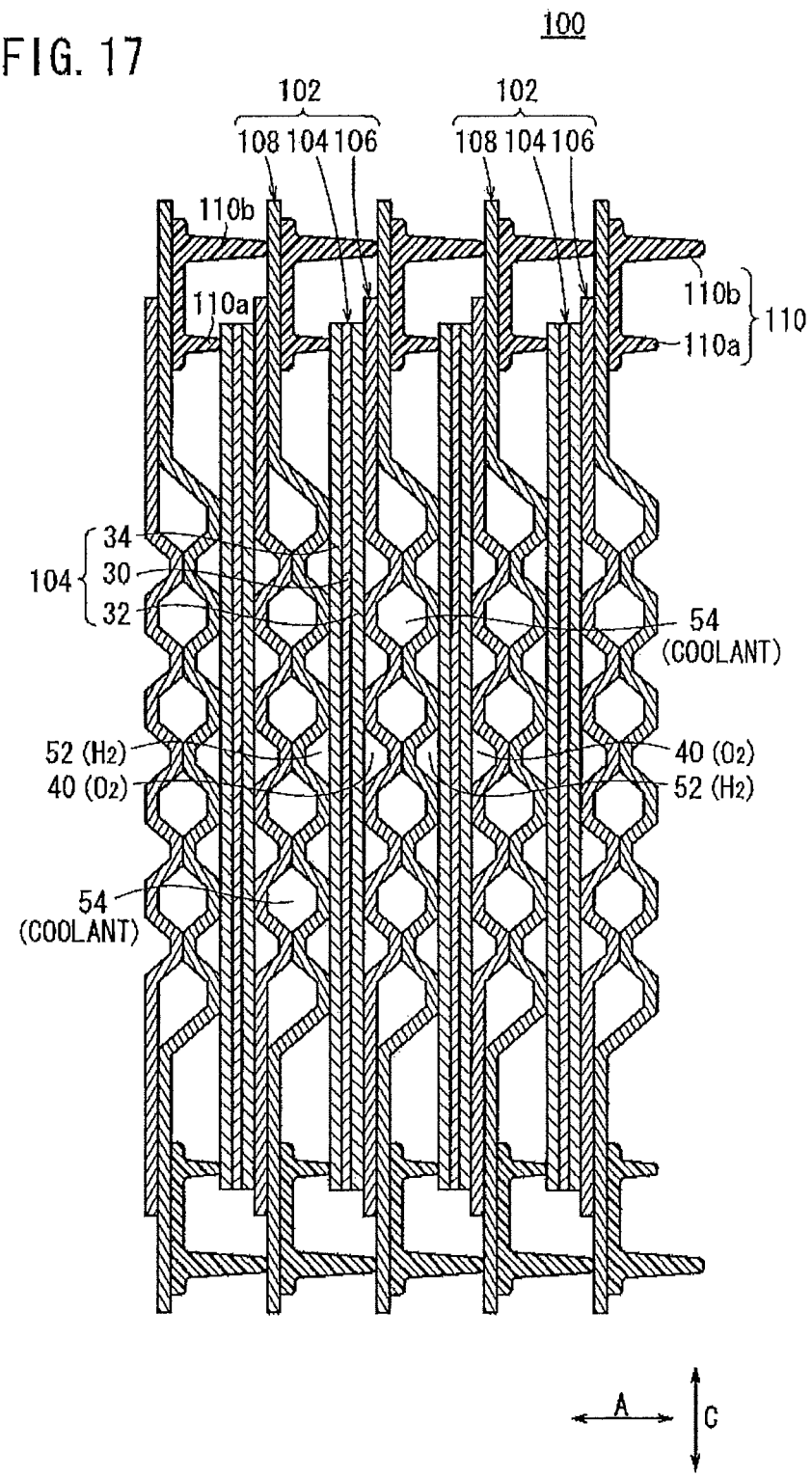
FIG. 17 is a cross sectional view showing a fuel cell according to a fourth embodiment of the present invention.

FIG. 17 is a cross sectional view showing a fuel cell 100 according to a fourth embodiment of the present invention.

Figure 18:
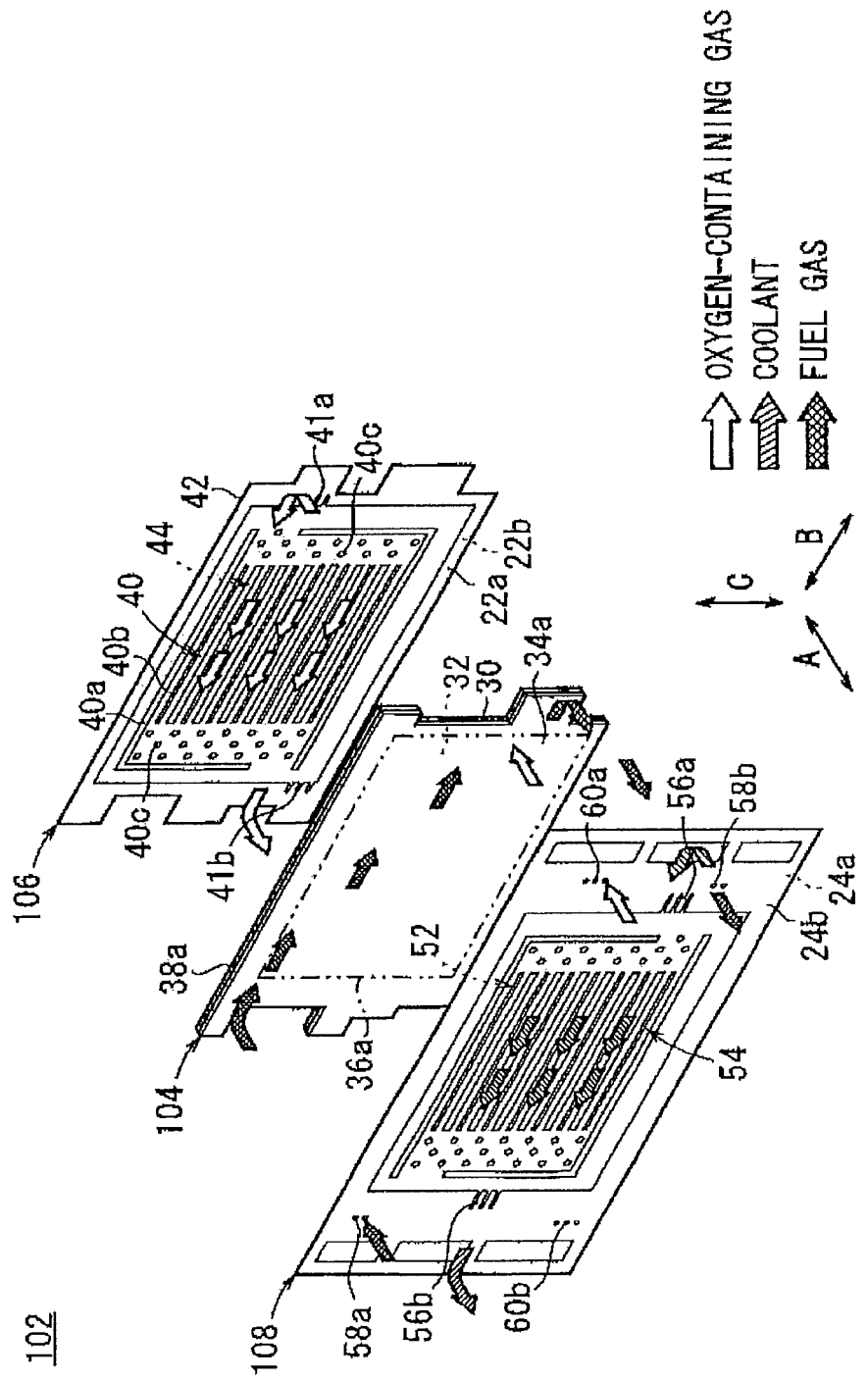
FIG. 18 is an exploded perspective view showing the fuel cell.

The fuel cell 100 is formed by stacking a plurality of unit cells 102 in the direction indicated by the arrow A. Each of the unit cells 102 is formed by sandwiching the membrane electrode assembly (electrolyte electrode assembly) 104 between a first metal separator 106 and a second metal separator 108 (see FIGS. 17 and 18). The membrane electrode assembly 104 includes a solid polymer electrolyte membrane 30, a cathode 32, and an anode 34. The outer dimensions (surface areas) of the solid polymer electrolyte membrane 30, the cathode 32, and the anode 34 are the same.

The outer dimensions of the first metal separator 106 are smaller than the outer dimensions of the second metal separator 108. In effect, the first metal separator 106 has the same structure as the first metal separator 22 of the first embodiment.

Figure 19:
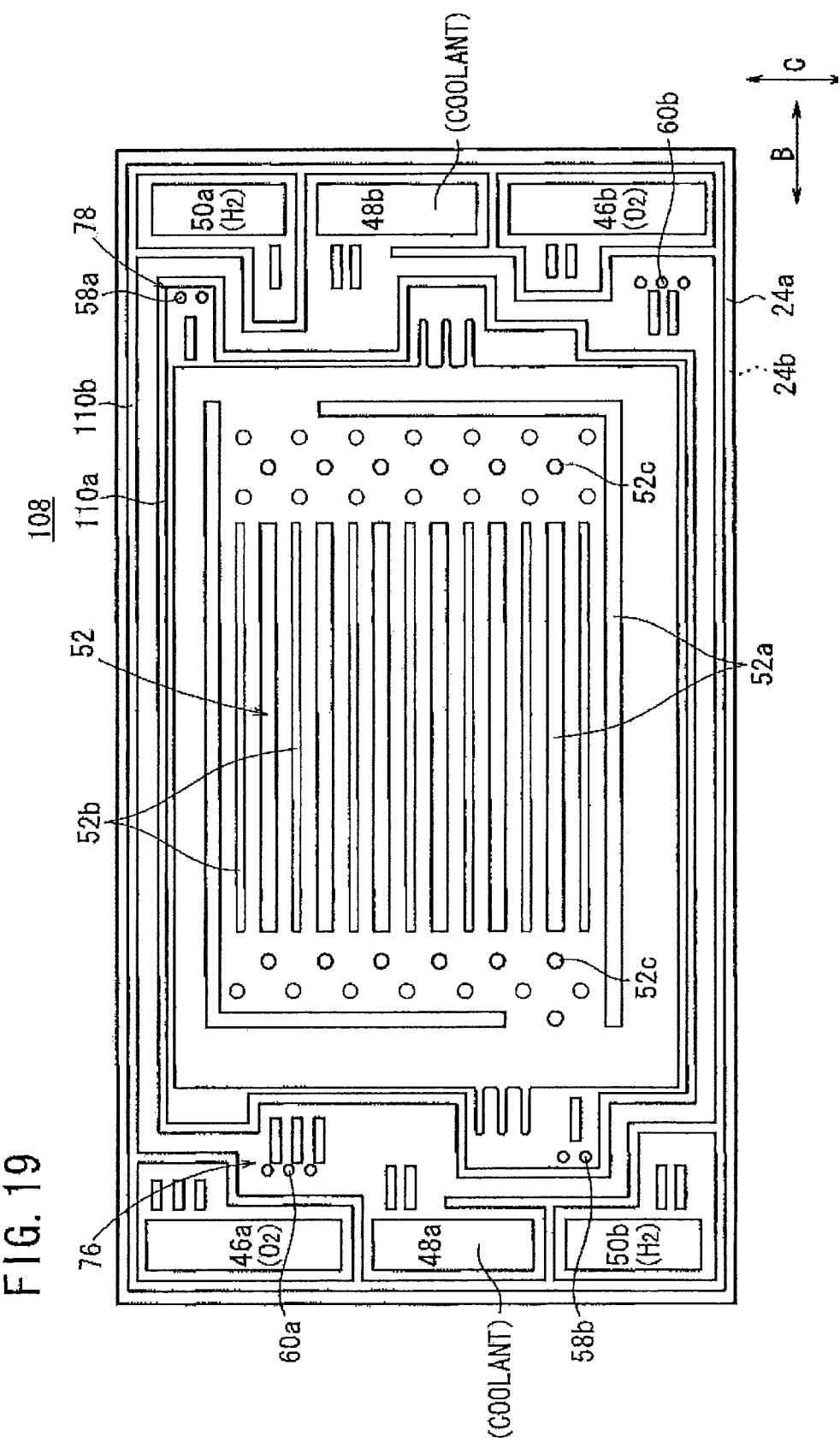
FIG. 19 is a view showing one surface of a second metal separator of the fuel cell.

A seal member 110 is formed integrally with the second metal separator 108. As shown in FIGS. 17 and 19, on the surface 24*a*, the seal member 110 includes a first seal (inner seal) 110*a* formed around the first fuel gas flow field 52, and a second seal (outer seal) 110*b*.

The first seal 110*a* contacts the outer end of the membrane electrode assembly 104, and the second seal 110*b* contacts the second metal separator 108 of the adjacent unit cell 102 (see FIG. 17).

In the fourth embodiment having the above structure, instead of adopting the first membrane electrode assembly 20*a* and the second membrane electrode assembly 20*b* including the electrodes having different sizes (referred to as a stepped MEA) according to the first embodiment, the membrane electrode assembly 104 including the electrodes having the same size is adopted. Also in the structure, the same advantages as in the case of the first embodiment are obtained.

Figure 20:
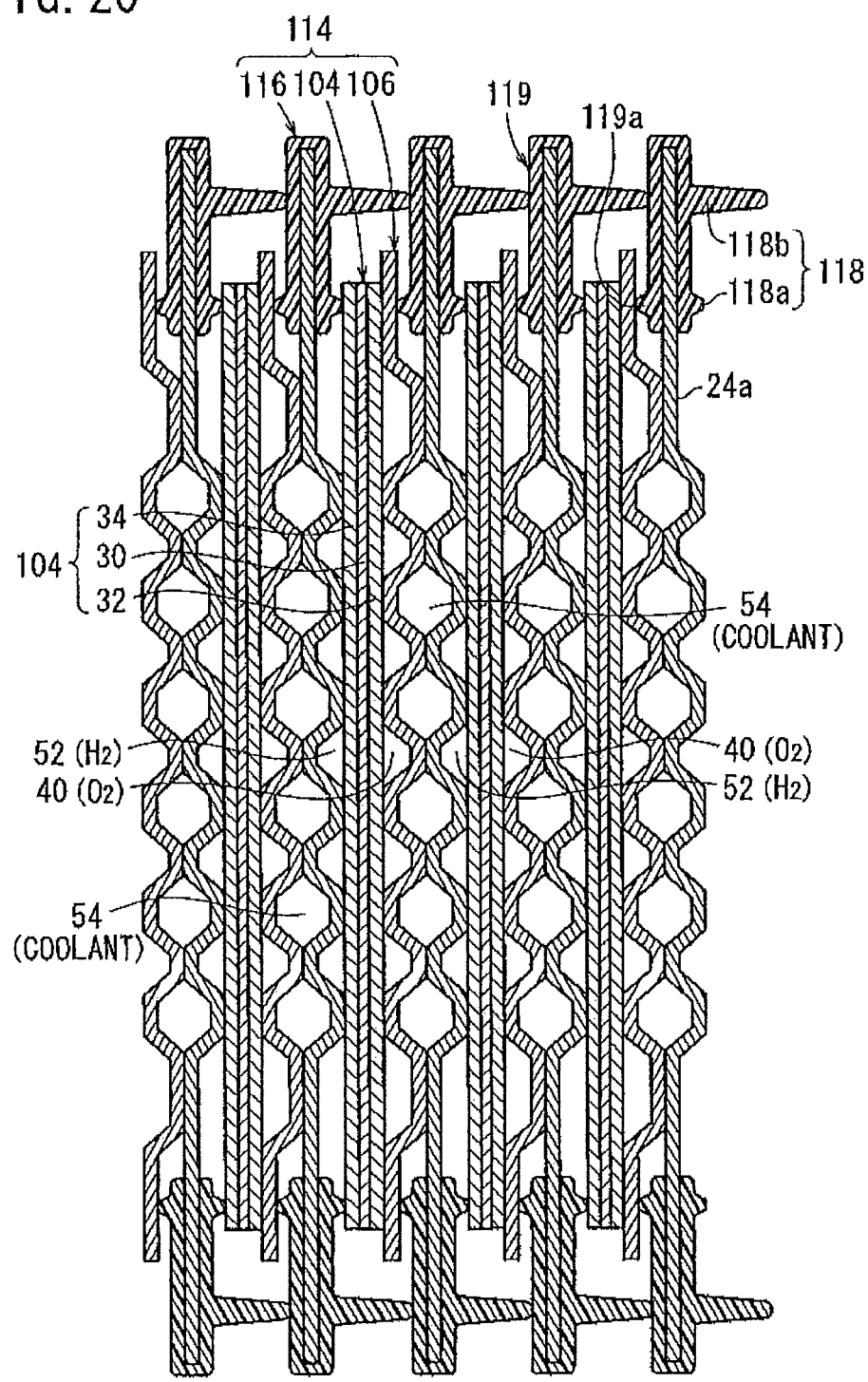
FIG. 20 is a cross sectional view showing a fuel cell according to a fifth embodiment of the present invention.

FIG. 20 is a cross sectional view showing a fuel cell 112 according to a fifth embodiment of the present invention.

The fuel cell 112 is formed by stacking a plurality of unit cells 114 in a direction indicated by the arrow A. The unit cell 114 includes a membrane electrode assembly 104, a first metal separator 106, and a second metal separator 116. The outer dimensions of the first metal separator 106 are smaller than the outer dimensions of the second metal separator 116.

A first seal member 118 is formed integrally on the surface 24*a* of the second metal separator 116, around the fuel gas flow field 52. The first seal member 118 includes a first seal (inner seal) 118*a* and a second seal (outer seal) 118*b*. The first seal 118*a* contacts the outer end of the membrane electrode assembly 104. The second seal 118*b* contacts a second seal member 119 (described later) provided on the second metal separator 126 of the adjacent unit cell 122.

The second seal member 119 is formed integrally with the surface 24*b* of the second metal separator 126 around the coolant flow field 54. The second seal member 119 includes a seal 119*a*. The outer ends of the membrane electrode assembly 104 and the first metal separator 106 are sandwiched between the seal 119*a* and the inner seal 118*a*.

In the fuel cell 120 having the above structure, the same advantages as in the cases of the first to fourth embodiments are obtained.

Figure 21:
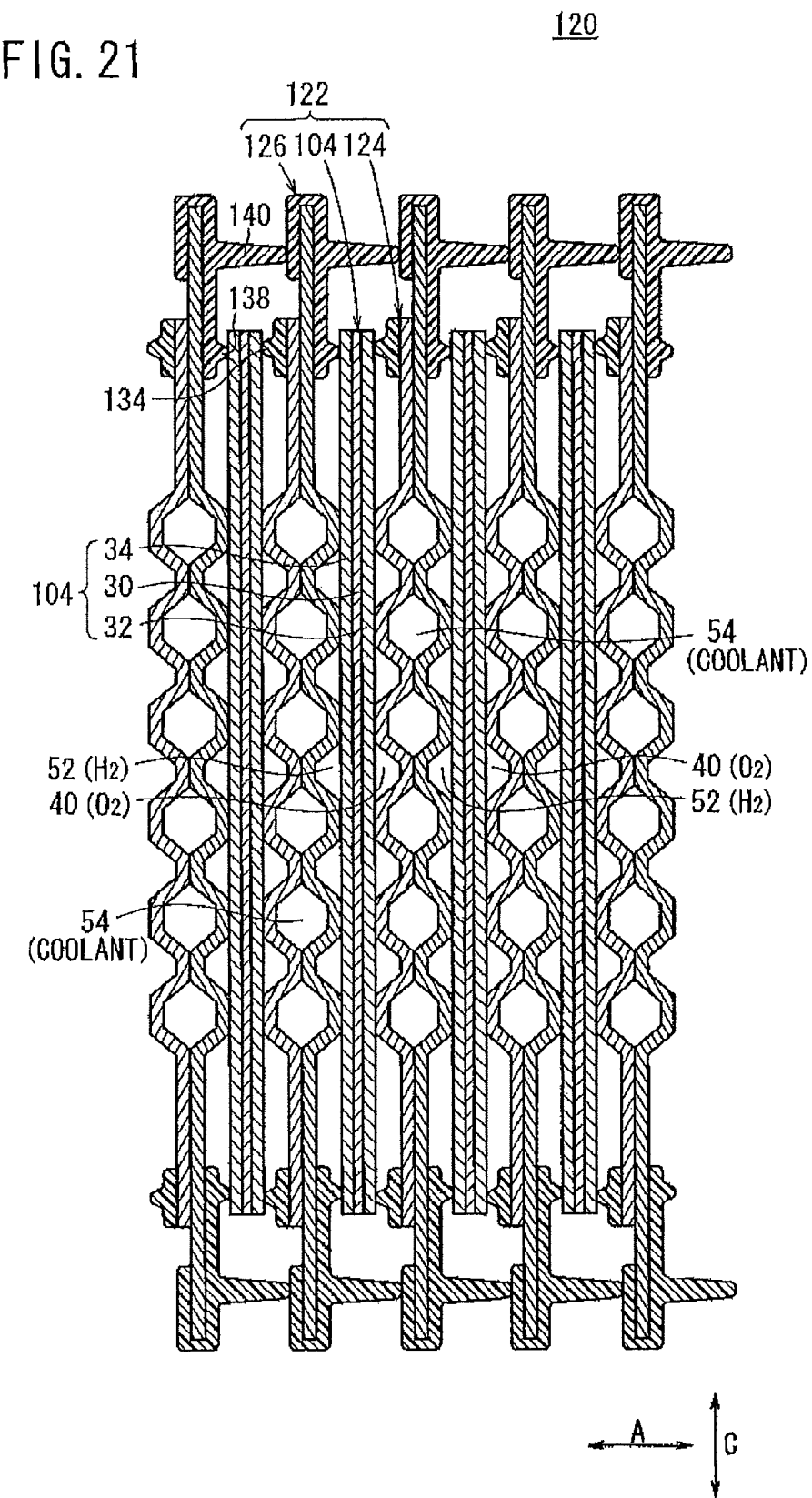
FIG. 21 is a cross sectional view showing a fuel cell according to a sixth embodiment of the present invention.

FIG. 21 is a cross sectional view showing a fuel cell 120 according to a sixth embodiment of the present invention.

The fuel cell 120 is formed by stacking a plurality of unit cells 122 in a direction indicated by the arrow A. The unit cell 122 includes a membrane electrode assembly 104, a first metal separator 124, and a second metal separator 126. The outer dimensions of the first metal separator 124 are smaller than the outer dimensions of the second metal separator 126.

Figure 22:
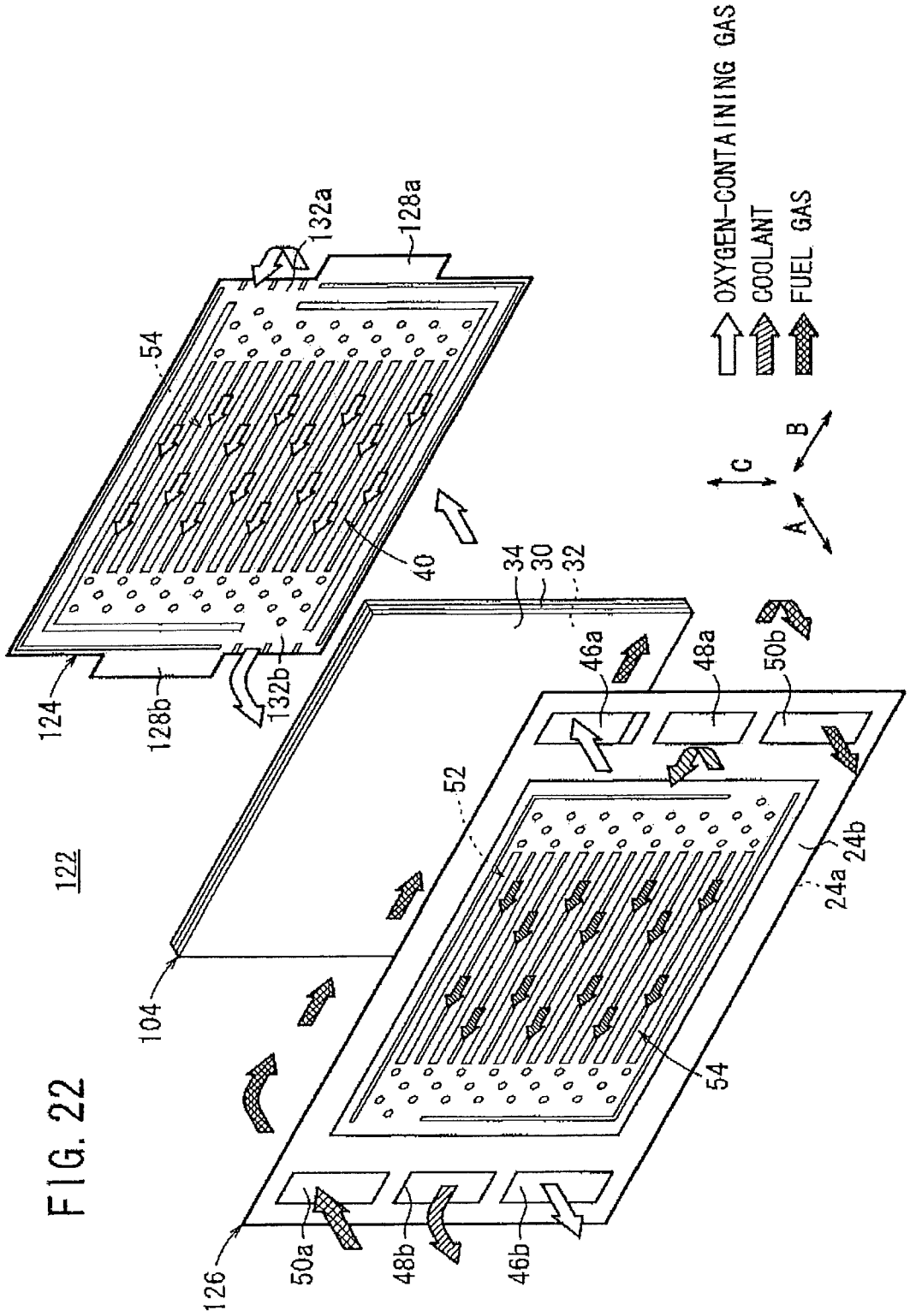
FIG. 22 is an exploded perspective view showing the fuel cell.
Figure 23:
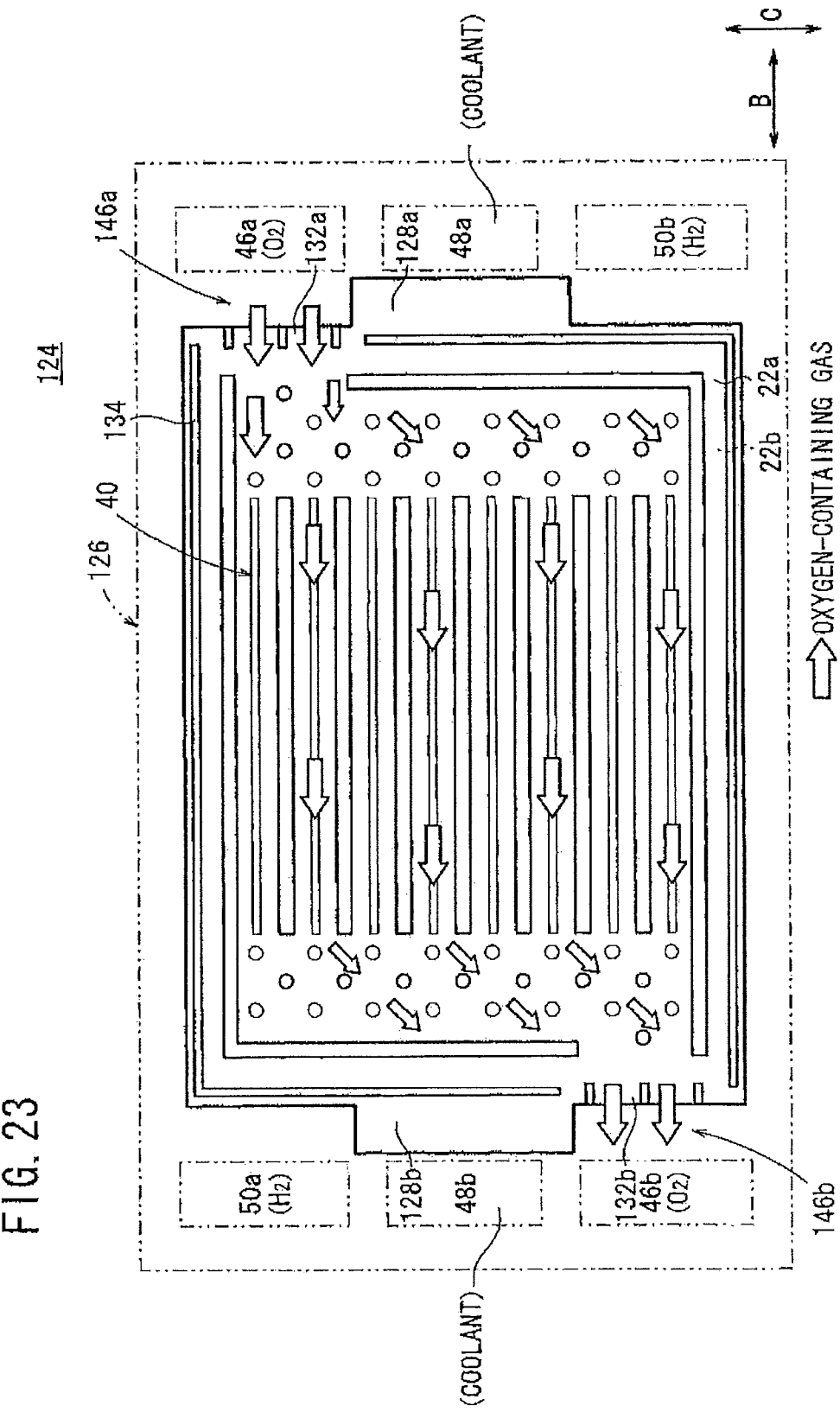
FIG. 23 is a view showing one surface of a first metal separator of the fuel cell.

As shown in FIGS. 22 and 23, at substantially central positions of both ends of the first metal separator 124 in the longitudinal direction indicated by the arrow B, extensions 128*a*, 128*b* protrude toward the coolant supply passage 48*a* and the coolant discharge passage 48*b* of the second metal separator 126, respectively.

The first metal separator 124 has a plurality of grooves 132*a*, 132*b* on a surface 22*a*. The inlet side and the outlet side of the oxygen-containing gas flow field 40 are opened to the outside through the grooves 132*a*, 132*b*. As shown in FIG. 23, a curved seal member 134 is provided around the oxygen-containing gas flow field 40 on the surface 22*a* of the first metal separator 124. Part of the seal member 134 forms the grooves 132*a*, 132*b*.

Figure 24:
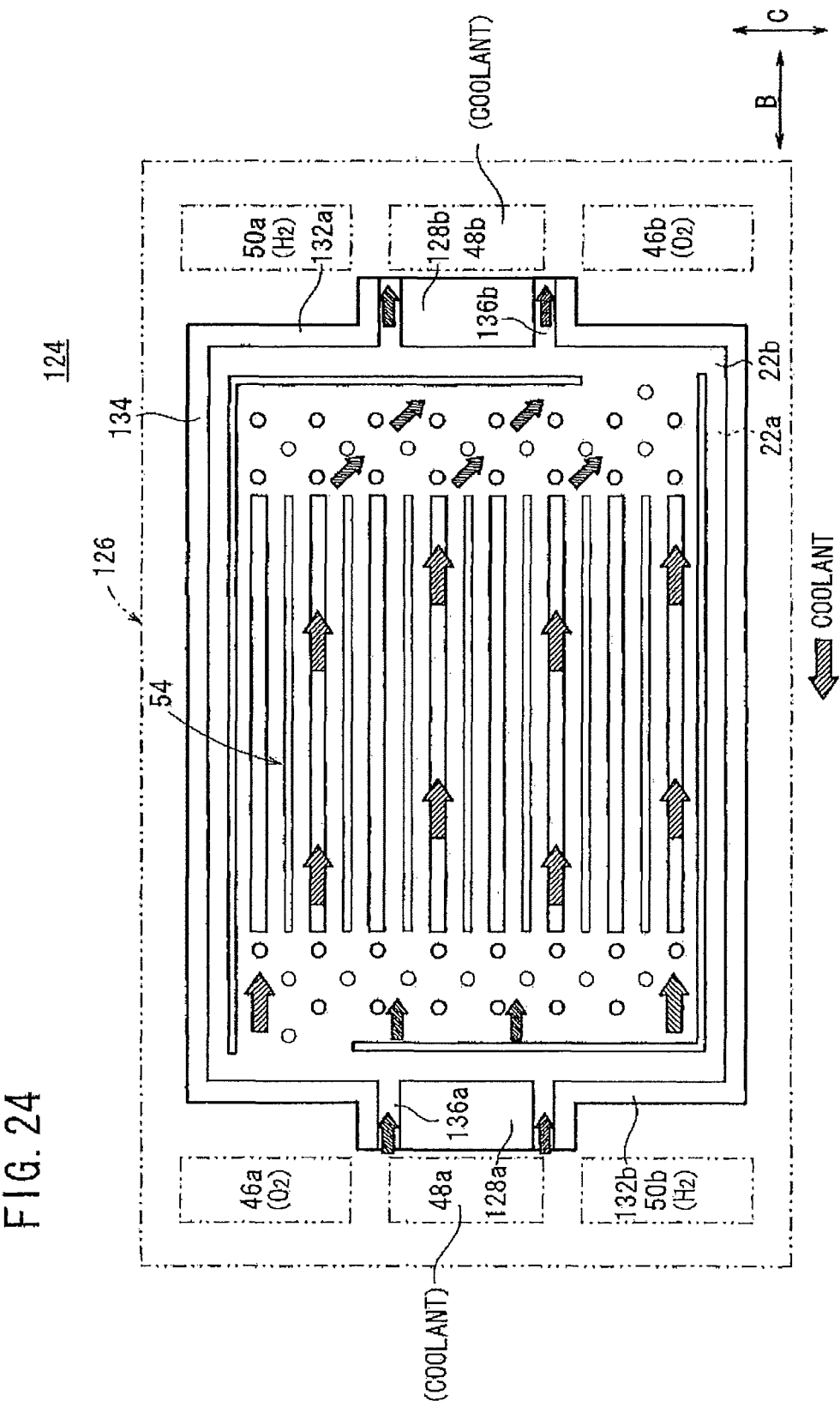
FIG. 24 is a view showing the other surface of the first metal separator.

As shown in FIG. 24, a coolant flow field 54 is formed in the surface 22*b* of the first metal separator 124. The extensions 128*a*, 128*b* have grooves 136*a*, 136*b* connecting the coolant flow field 54 to the coolant supply passage 48*a* and the coolant discharge passage 48*b* extending through the second metal separator 126.

Figure 25:
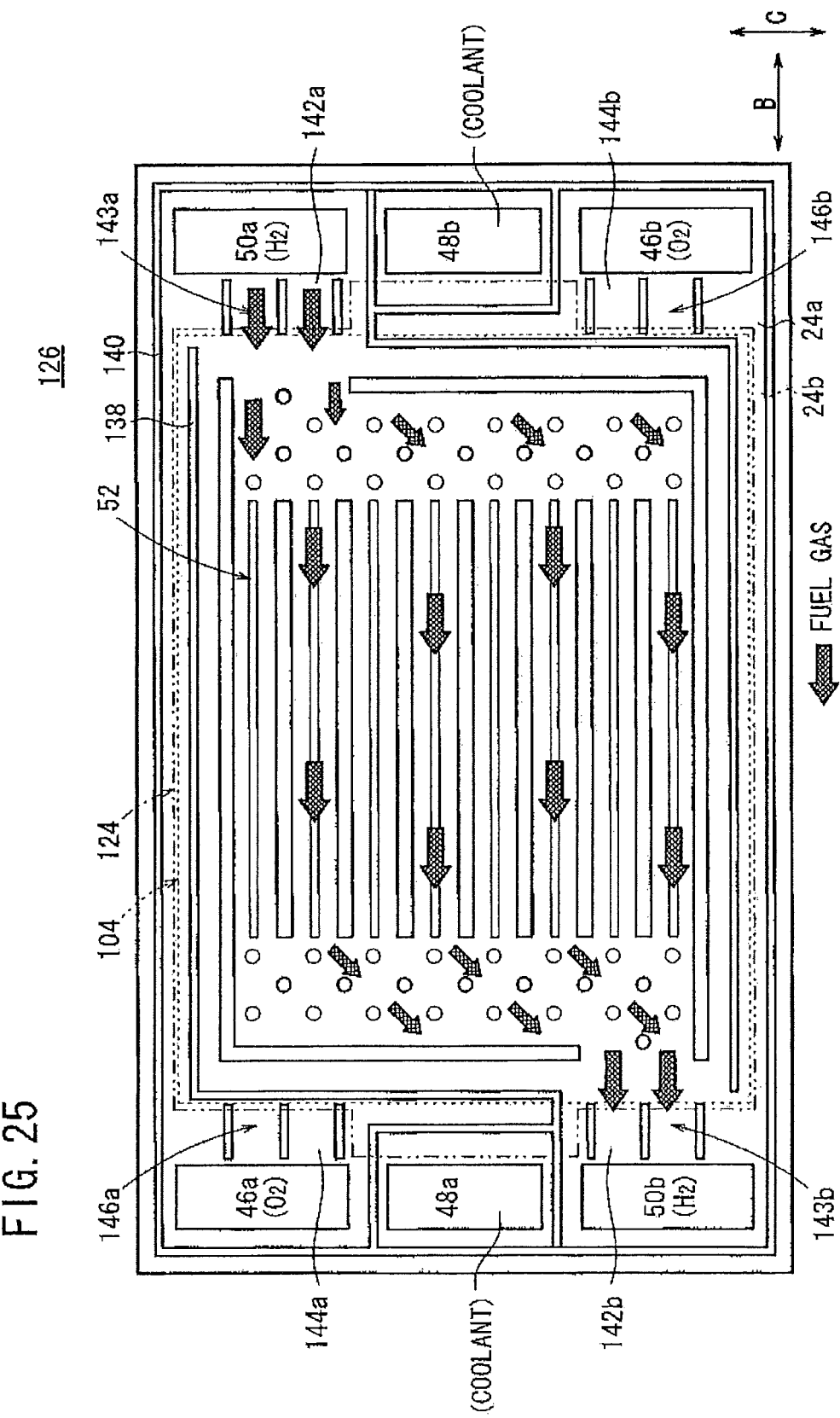
FIG. 25 is a view showing one surface of a second metal separator of the fuel cell.

As shown in FIG. 25, a first seal member 138 and a second seal member 140 are formed integrally on the surface 24*a* of the second metal separator 126 around the fuel gas flow field 52.

The membrane electrode assembly 104 is sandwiched between the first seal member 138 and the seal member 134 of the first metal separator 124. The second seal member 140 contacts the second metal separator 126 of the adjacent unit cell 122 (see FIG. 21).

As shown in FIG. 25, the first seal member 138 seals the oxygen-containing gas supply passage 46*a*, the oxygen-containing gas discharge passage 46*b*, the coolant supply passage 48*a*, and the coolant discharge passage 48*b*, while allowing the fuel gas supply passage 50*a* and the fuel gas discharge passage 50*b* to be connected to the fuel gas flow field 52.

Grooves 142*a* are formed by the first seal member 138 between the fuel gas supply passage 50*a* and the fuel gas flow field 52, and grooves 142*b* are formed by the first seal member 138 between the fuel gas discharge passage 50*b* and the fuel gas flow field 52.

As shown in FIG. 25, channels 143a, 143b connecting the fuel gas supply passage 50a and the fuel gas discharge passage 50b to the fuel gas flow field 52 are formed in the second metal separator 126. The channels 143a, 143b include grooves 142a, 142b, respectively.

Grooves 144a and 144b are formed between the first seal member 138 and the second seal member 140. The grooves 144a connect the oxygen-containing gas supply passage 46a to the grooves 132a of the first metal separator 124, and the grooves 144b connect the oxygen-containing gas discharge passage 46b to the grooves 132b.

As shown in FIGS. 23 and 25, the second metal separator 126 has channels 146a, 146b connecting the oxygen-containing gas supply passage 46a and the oxygen-containing gas discharge passage 46b respectively to the oxygen-containing gas flow field 40 of the first metal separator 124. The channels 146a, 146b include grooves 144a, 144b. The grooves 132a, 132b are connected to the oxygen-containing gas flow field 40 through the grooves 144a, 144b.

In the fuel cell 120 having the above structure, the first seal member 138 and the second seal member 140 of one of the adjacent second metal separators 126 tightly contact the other of the adjacent second metal separators 126.

In the structure, the oxygen-containing gas supplied to the oxygen-containing gas supply passage 46a of each unit cell 122 flows into the channel 146a (see FIG. 25), and then, the oxygen-containing gas is supplied from the grooves 144a of the second metal separator 126 to the oxygen-containing gas flow field 40 through the grooves 132a of the first metal separator 124 (see FIG. 23). The fuel gas consumed in the reaction in the oxygen-containing gas flow field 40 is discharged to the channel 146b from the grooves 132b, and flows through the grooves 144b to the oxygen-containing gas discharge passage 46b.

As shown in FIG. 25, the fuel gas supplied to the fuel gas supply passage 50a of the unit cells 122 flows into the channel 143a, and the fuel gas is supplied to the fuel gas flow field 52 through the grooves 142a. The fuel gas consumed in the fuel gas flow field 52 is discharged from the grooves 142b of the channel 143b to the fuel gas discharge passage 50b.

Further, the coolant supplied to the coolant supply passage 48a flows through the grooves 136a in the extension 128a of the first metal separator 24, and the coolant is supplied to the coolant flow field 54 (see FIG. 24). Then, the coolant used for cooling each unit cell 122 is discharged to the coolant discharge passage 48b through the grooves 136b formed in the other extension 128b.

In the sixth embodiment having the above structure, the same advantages as in the cases of the first to fifth embodiments are obtained. For example, the outer dimensions of the first metal separator 124 are reduced significantly. It is possible to reduce the weight and the size of each of the unit cells 122.

Figure 26:
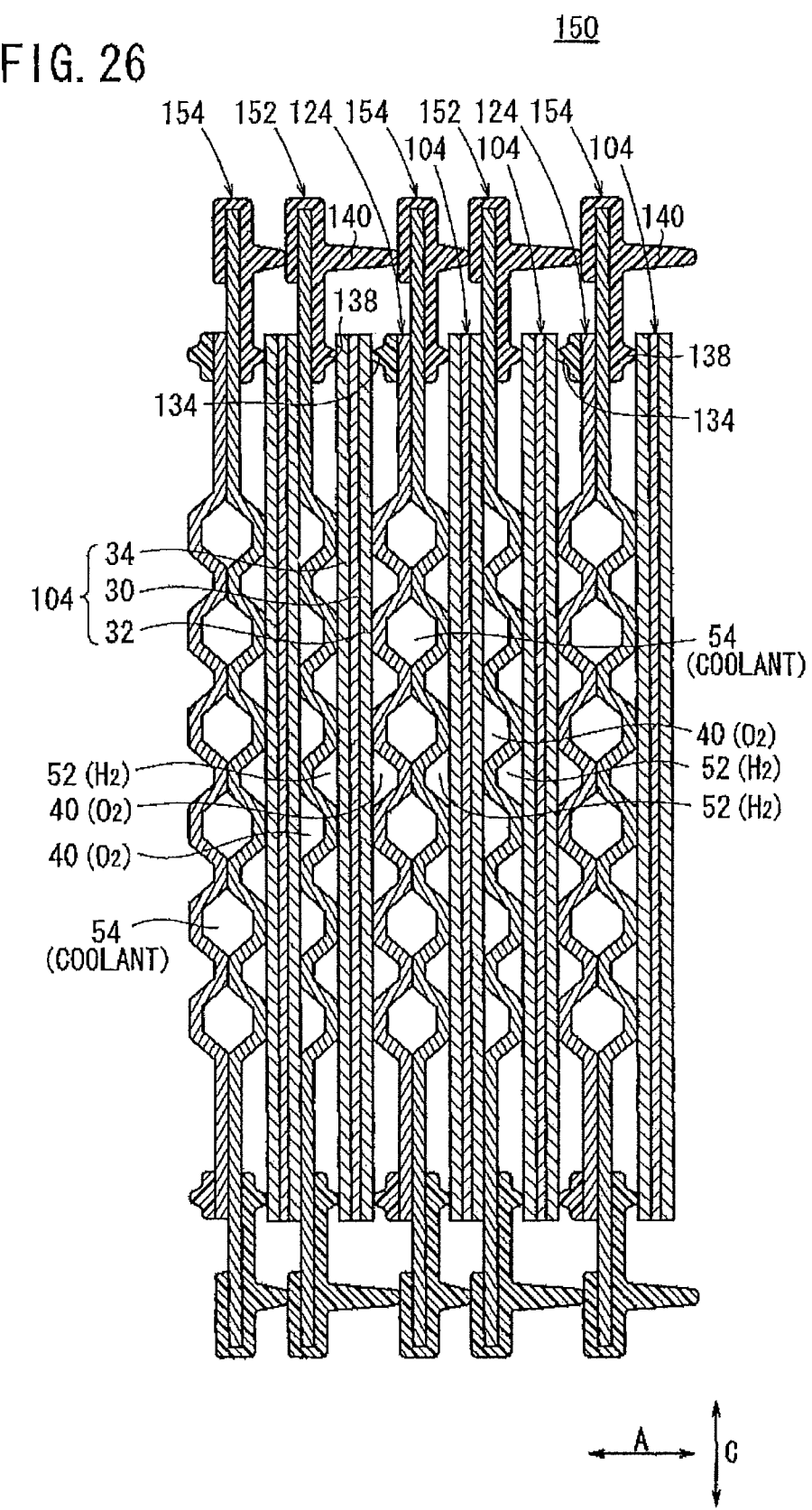
FIG. 26 is a cross sectional view showing a fuel cell according to a seventh embodiment of the present invention.

FIG. 26 is a cross sectional view showing a fuel cell 150 according to a seventh embodiment of the present invention.

The fuel cell 150 is obtained by modifying the fuel cell 120 according to the sixth embodiment by adopting so called skip cooling structure in which the coolant flow field 54 is provided for every predetermined number of, e.g., every two membrane electrode assemblies 104.

The fuel cell 150 is formed by stacking a first metal separator 124, a membrane electrode assembly 104, a second metal separator 152, another membrane electrode assembly 104, a third metal separator (having the same structure as the second metal separator 126) 154, another first metal separator 124, another membrane electrode assembly 104, another second metal separator 152, another membrane electrode assembly 104, and another third metal separator 154 successively in the direction indicated by the arrow A.

A fuel gas flow field 52 is formed on one surface of the second metal separator 152 facing the membrane electrode assembly 104, and the membrane electrode assembly 104 is sandwiched between the second metal separator 152 and the first metal separator 124. An oxygen-containing gas flow field 40 is formed on the other surface of the second metal separator 152 facing the other membrane electrode assembly 104, and the other membrane electrode assembly 104 is sandwiched between the second metal separator 152 and the third metal separator 154.

In the seventh embodiment, the area of the coolant flow field 54 is effectively reduced (by half). Thus, the overall dimension of the fuel cell 150 in the stacking direction is reduced significantly.

Figure 27:
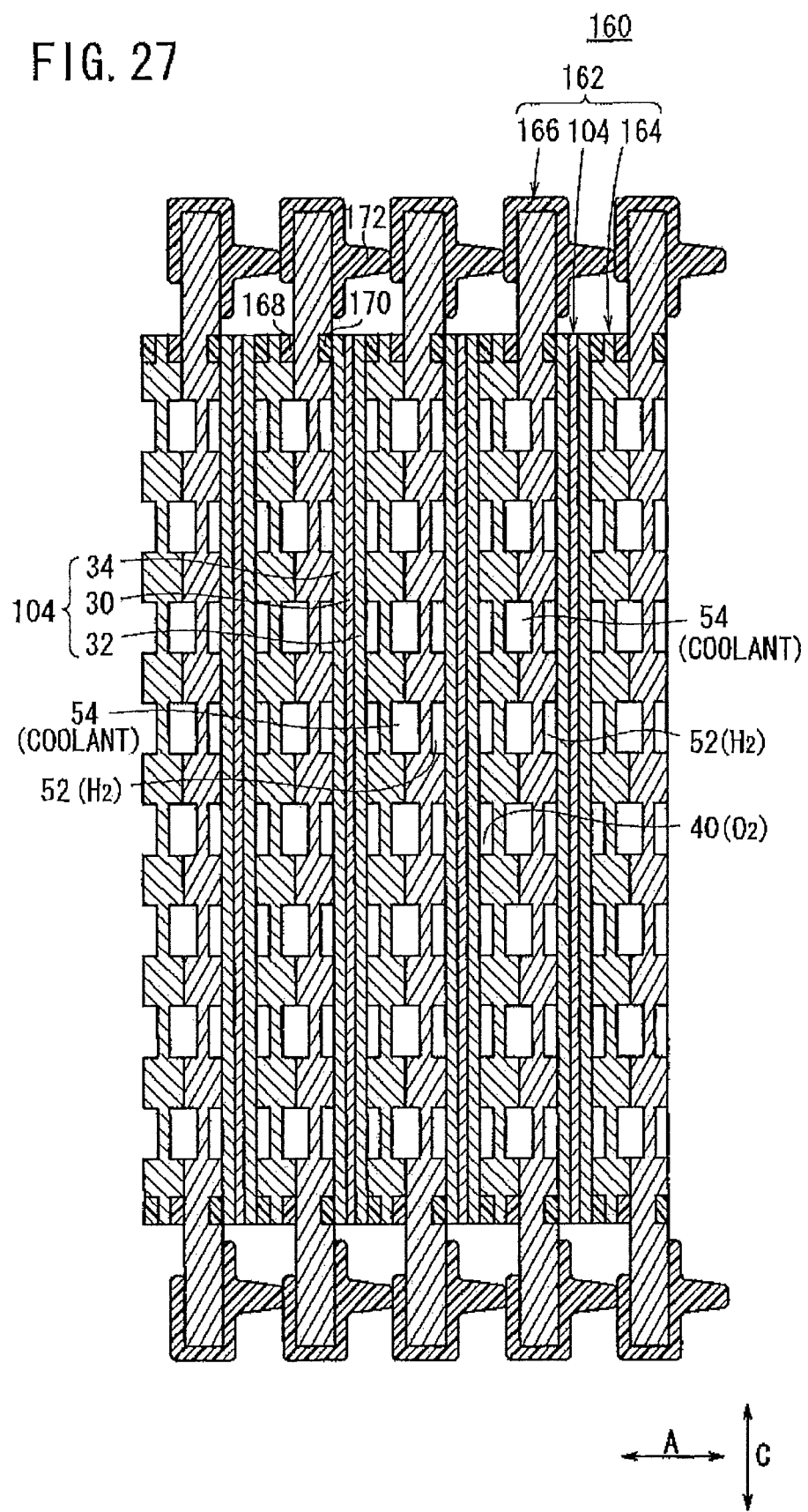
FIG. 27 is a cross sectional view showing a fuel cell according to an eighth embodiment of the present invention.

FIG. 27 is a cross sectional view showing a fuel cell 160 according to an eighth embodiment of the present invention.

The fuel cell 160 is formed by stacking unit cells 162 in the direction indicated by the arrow A. Each of the unit cells 162 is formed by sandwiching the membrane electrode assembly 104 between a first carbon separator 164 and a second carbon separator 166.

The fuel cell 160 has substantially the same structure as the fuel cell 120 according to the sixth embodiment. The outer dimensions of the first carbon separator 164 are smaller than the outer dimensions of the second carbon separator 166. A seal member 168 corresponding to the seal member 134 is provided on the first carbon separator 164. A first seal 170 and a second seal 172 corresponding to the first seal member 138 and the second seal member 140 are provided on the second carbon separator 166. The first seal 170 and the second seal 172 are attached to the second carbon separator 166 after molding.

In the eighth embodiment having the above structure, the same advantages as in the cases of the first to seventh embodiments are obtained. For example, the dimensions of the first carbon separator 164 are reduced as much as possible. It is possible to reduce the overall weight and size of the fuel cell 160.

The fuel cell 160 according to the eighth embodiment has substantially the same structure as the fuel cell 120 according to the sixth embodiment, and adopts the first carbon separator 164 and the second carbon separator 166. Also in the first to fifth embodiments and the seventh embodiments, carbon separators may be adopted.

Figure 28:
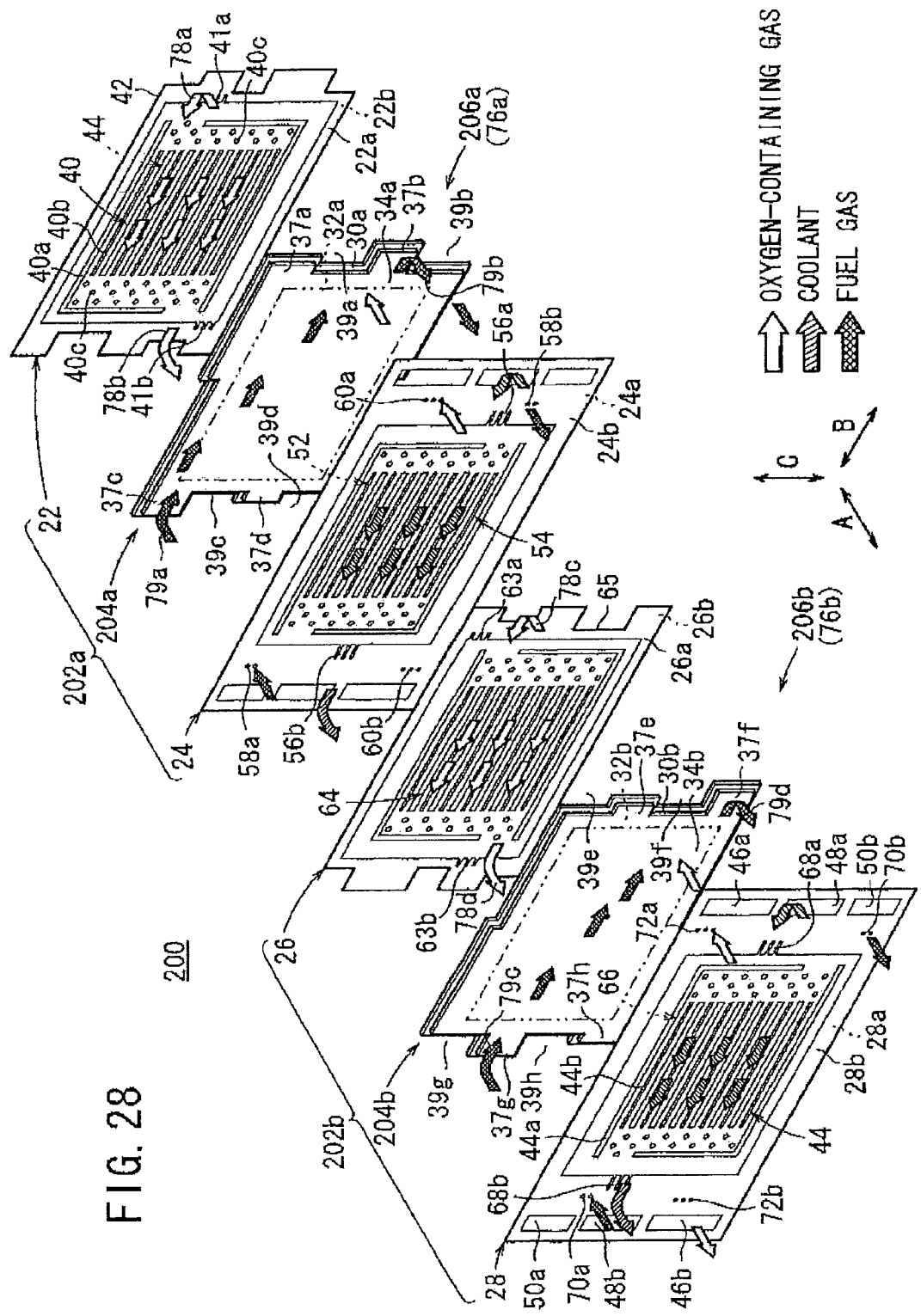
FIG. 28 is an exploded perspective view showing a fuel cell according to a ninth embodiment of the present invention.

FIG. 28 is an exploded perspective view showing a fuel cell 200 according to a ninth embodiment of the present invention.

The fuel cell 200 is formed by stacking unit cells 202a, 202b alternately in the direction indicated by the arrow A. The unit cell 202a is formed by sandwiching a first membrane electrode assembly 204a between the first metal separator 22 and the second metal separator 24, and the unit cell 202b is formed by sandwiching a second membrane electrode assembly 204b between the third metal separator 26 and the fourth metal separator 28.

The first membrane electrode assembly 204a has a substantially quadrangular shape as a whole. At opposite ends of the first membrane electrode assembly 204a in the direction indicated by the arrow B, first uneven portions 206a forming the first channel 76a are provided in the same plane as the electrode surface. The first uneven portion 206a at one end of the first membrane electrode assembly 204a in the direction indicated by the arrow B includes a first extension 37a, a first cutout 39a, a second extension 37b, and a second cutout 39b from upper to lower positions. Further, the first uneven portion 206a at the other end of the first membrane electrode assembly 20a in the direction indicated by the arrow B includes a third extension 37c, a third cutout 39c, a fourth extension 37d, and a fourth cutout 39d from upper to lower positions.

The second membrane electrode assembly 204b has the same structure as the first membrane electrode assembly 204a. At opposite ends of the second membrane electrode assembly 204b in the direction indicated by the arrow B, a second uneven portions 206b forming the second channel 76b are provided in the same plane as the electrode surface. The second uneven portion 206b at one end of the second membrane electrode assembly 204b in the direction indicated by the arrow B includes a fifth cutout 39e, a fifth extension 37e, a sixth cutout 39f, and a sixth extension 37f from upper to lower positions. Further, the second uneven portion 206b at the other end of the second membrane electrode assembly 204b in the direction indicated by the arrow B includes a seventh cutout 39g, a seventh extension 37g, an eighth cutout 39h, and an eighth extension 37h from upper to lower positions.

In the ninth embodiment having the above structure, the first uneven portions 206a and the second uneven portions 206b are offset from each other in the stacking direction, and the same advantages as in the cases of the above embodiments are obtained.

Figure 29:
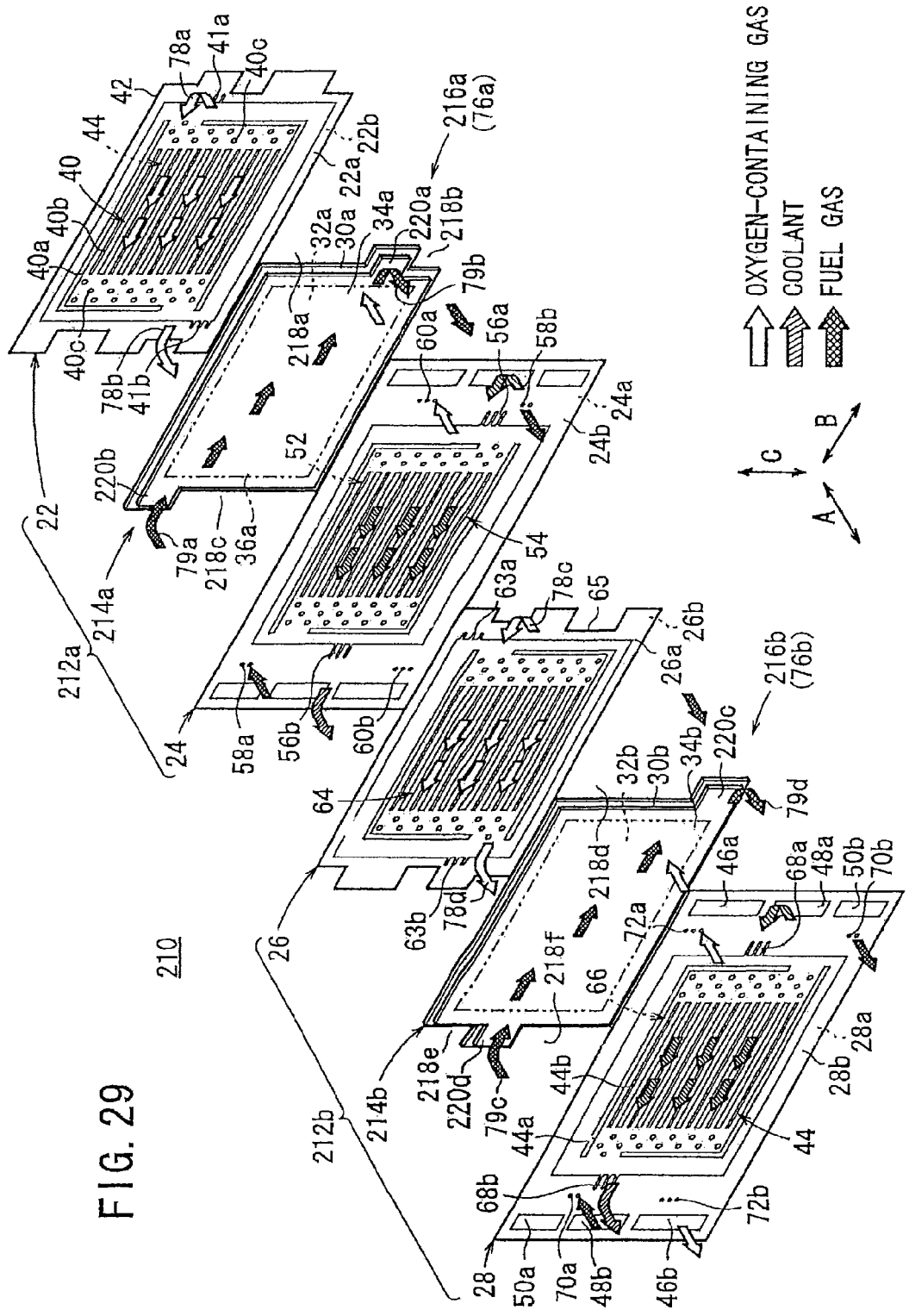
FIG. 29 is an exploded perspective view showing a fuel cell according to a tenth embodiment of the present invention.

FIG. 29 is an exploded perspective view showing a fuel cell 210 according to a tenth embodiment of the present invention.

The fuel cell 210 is formed by stacking unit cells 212a, 212b alternately in the direction indicated by the arrow A. The unit cell 212a is formed by sandwiching a first membrane electrode assembly 214a between the first metal separator 22 and the second metal separator 24, and the unit cell 212b is formed by sandwiching a second membrane electrode assembly 214b between the third metal separator 26 and the fourth metal separator 28.

The first membrane electrode assembly 214a has a substantially quadrangular shape as a whole. At opposite ends of the first membrane electrode assembly 214a in the direction indicated by the arrow B, first uneven portions 216a forming the first channel 76a are provided in the same plane as the electrode surface. The first uneven portion 216a at one end of the first membrane electrode assembly 104a in the direction indicated by the arrow B includes a first cutout 218a, a first extension 220a, and a second cutout 218b from upper to lower positions. Further, the first uneven portion 216a at the other end of the first membrane electrode assembly 214a in the direction indicated by the arrow B includes a second extension 220b and a third cutout 218c from upper to lower positions.

The second membrane electrode assembly 214b has the same structure as the first membrane electrode assembly 214a. At opposite ends of the second membrane electrode assembly 214b in the direction indicated by the arrow B, second uneven portions 216b forming the second channel 76b are provided in the same plane as the electrode surface. The second uneven portion 216b at one end of the second membrane electrode assembly 214b in the direction indicated by the arrow B includes a fourth cutout 218d and a third extension 220c from upper to lower positions. The second uneven portion 216b at the other end of the second membrane electrode assembly 214 in the direction indicated by the arrow B includes a fifth cutout 218e, a fourth extension 220d, and a sixth cutout 218f from upper to lower positions.

A first oxygen-containing gas supply connection channel 78a is formed at the first cutout 218a between the first metal separator 22 and the second metal separator 24. A first fuel gas supply connection channel 79a is formed between the first extension 220a and the second metal separator 24. A first oxygen-containing gas discharge connection channel 78b is formed at the third cutout 218c between the first metal separator 22 and the second metal separator 24. A first fuel gas discharge connection channel 79b is formed between the first extension 220a and the second metal separator 24.

A second oxygen-containing gas supply connection channel 78c is formed at the fourth cutout 218d between the third metal separator 26 and the fourth separator 28. A second fuel gas supply connection channel 79c is formed between the fourth extension 220d and the fourth metal separator 28. A second oxygen-containing gas discharge connection channel 78d is formed at the sixth cutout 218f between the third metal separator 26 and the fourth metal separator 28. A second fuel gas discharge connection channel 79d is formed between the third extension 220c and the fourth metal separator 28.

In the tenth embodiment having the above structure, the first uneven portions 216a and the second uneven portions 216b are offset from each other in the stacking direction, and the same advantages as in the cases of the above embodiments are obtained.

Figure 30:
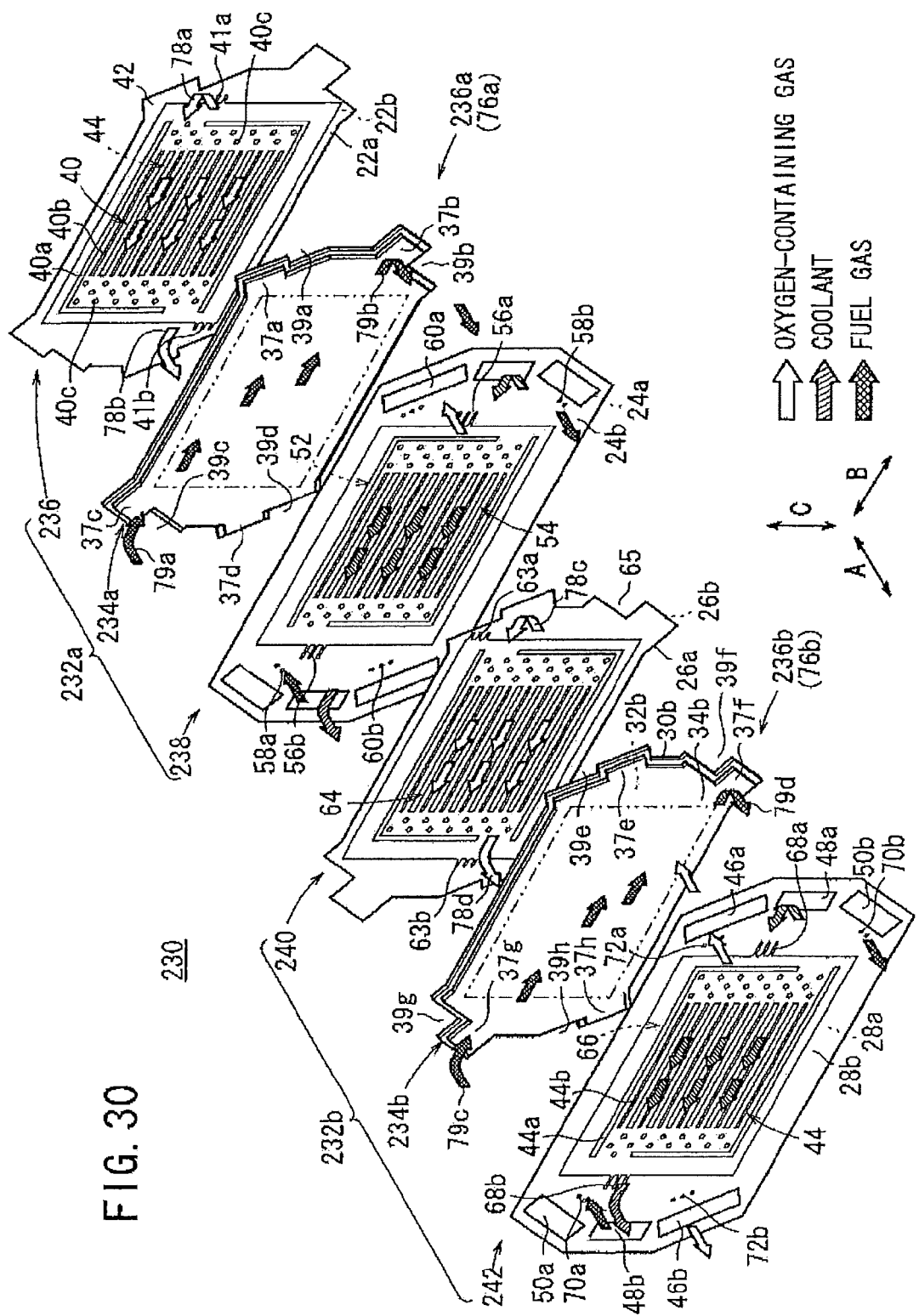
FIG. 30 is an exploded perspective view showing a fuel cell according to an eleventh embodiment of the present invention.

FIG. 30 is an exploded perspective view showing a fuel cell 230 according to an eleventh embodiment of the present invention.

The fuel cell 230 is formed by stacking unit cells 232a, 232b alternately in the direction indicated by the arrow A. The unit cell 232a is formed by sandwiching a first membrane electrode assembly 234a between a first metal separator 236 and a second metal separator 238, and the unit cell 232b is formed by sandwiching a second membrane electrode assembly 214b between a third metal separator 240 and a fourth metal separator 242.

The first membrane electrode assembly 234a has a substantially quadrangular shape as a whole. At opposite ends of the first membrane electrode assembly 234a in the direction indicated by the arrow B, first uneven portions 236a forming the first channel 76a are provided in the same plane as the electrode surface. The first uneven portions 236a include a first extension 37a, a first cutout 39a, a second extension 37b, a second cutout 39b, a third extension 37c, a third cutout 39c, a fourth extension 37d and a fourth cutout 39d provided at opposite ends of the first membrane electrode assembly 234a in the direction indicated by the arrow B.

The second membrane electrode assembly 234b has the same structure as the first membrane electrode assembly 234a. At opposite ends of the second membrane electrode assembly 234b in the direction indicated by the arrow B, a second uneven portion 236b forming the second channel 76b is provided along the electrode surface. The second uneven portion 236b includes a fifth cutout 39e, a fifth extension 37e, a sixth cutout 39f, and a sixth extension 37f, a seventh cutout 39g, a seventh extension 37g, an eighth cutout 39h, and an eighth extension 37h. The first extension 37a to the eighth extension 37h, and the first cutout 39a to the eighth cutout 39h are inclined in a predetermined direction from the vertical direction.

The shapes of the first metal separator 236 to the fourth metal separator 242 correspond to the shapes of the first membrane electrode assembly 234a and the second membrane electrode assembly 234b. Likewise, the shapes of the oxygen-containing gas supply passage 46a, the coolant supply passage 48a, the fuel gas discharge passage 50b, the fuel gas supply passage 50a, the coolant discharge passage 48b, and the oxygen-containing gas discharge passage 46b correspond to the shapes of the first membrane electrode assembly 234a and the second membrane electrode assembly 234b.

In the eleventh embodiment having the above structure, the first uneven portion 236a and the second uneven portion 236b are offset from each other in the stacking direction, and the same advantages as in the cases of the above described embodiments are obtained.

Figure 31:
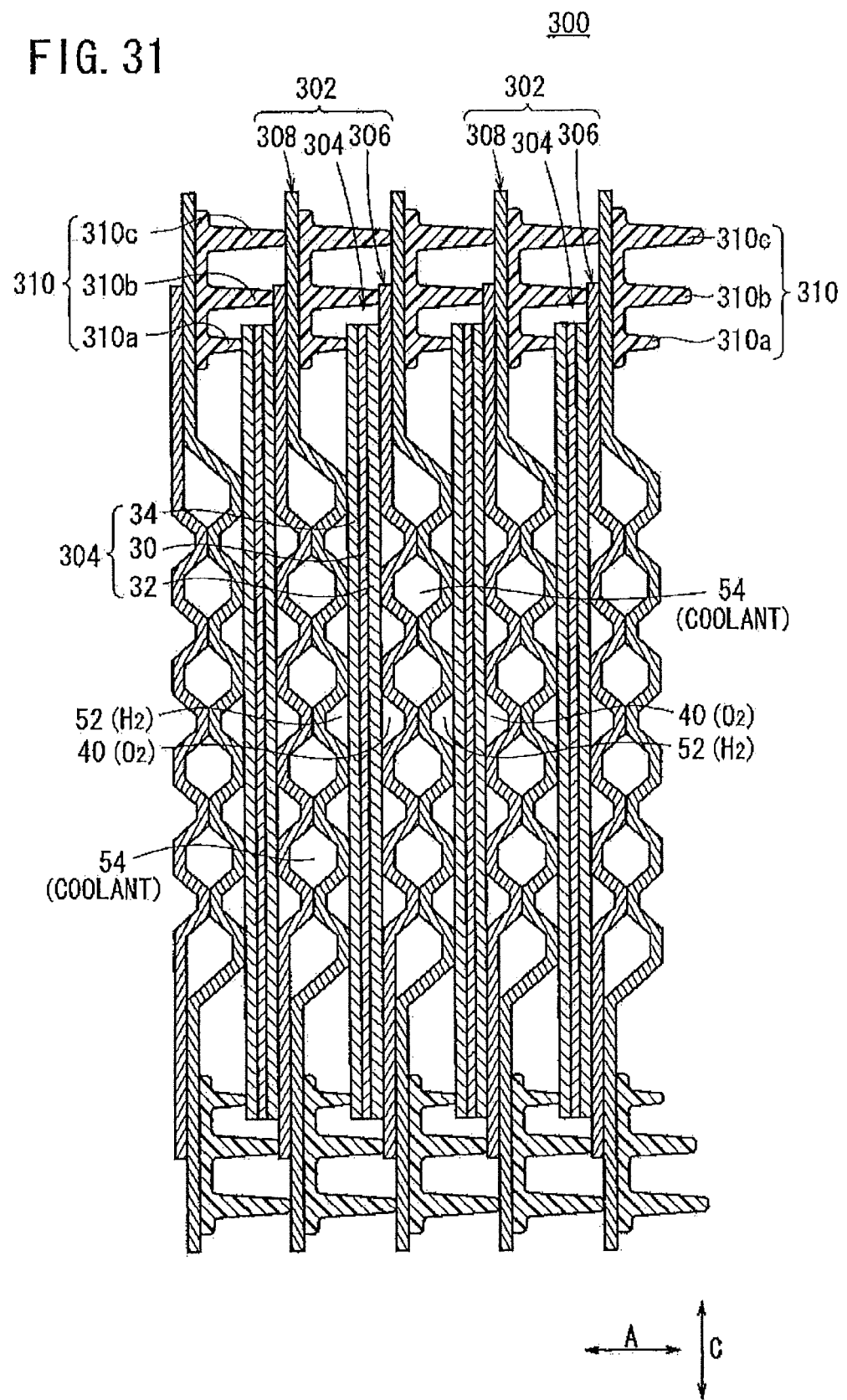
FIG. 31 is a cross sectional view showing a fuel cell according to a twelfth embodiment of the present invention.

FIG. 31 is a cross sectional view showing a fuel cell 300 according to a twelfth embodiment of the present invention.

Figure 32:
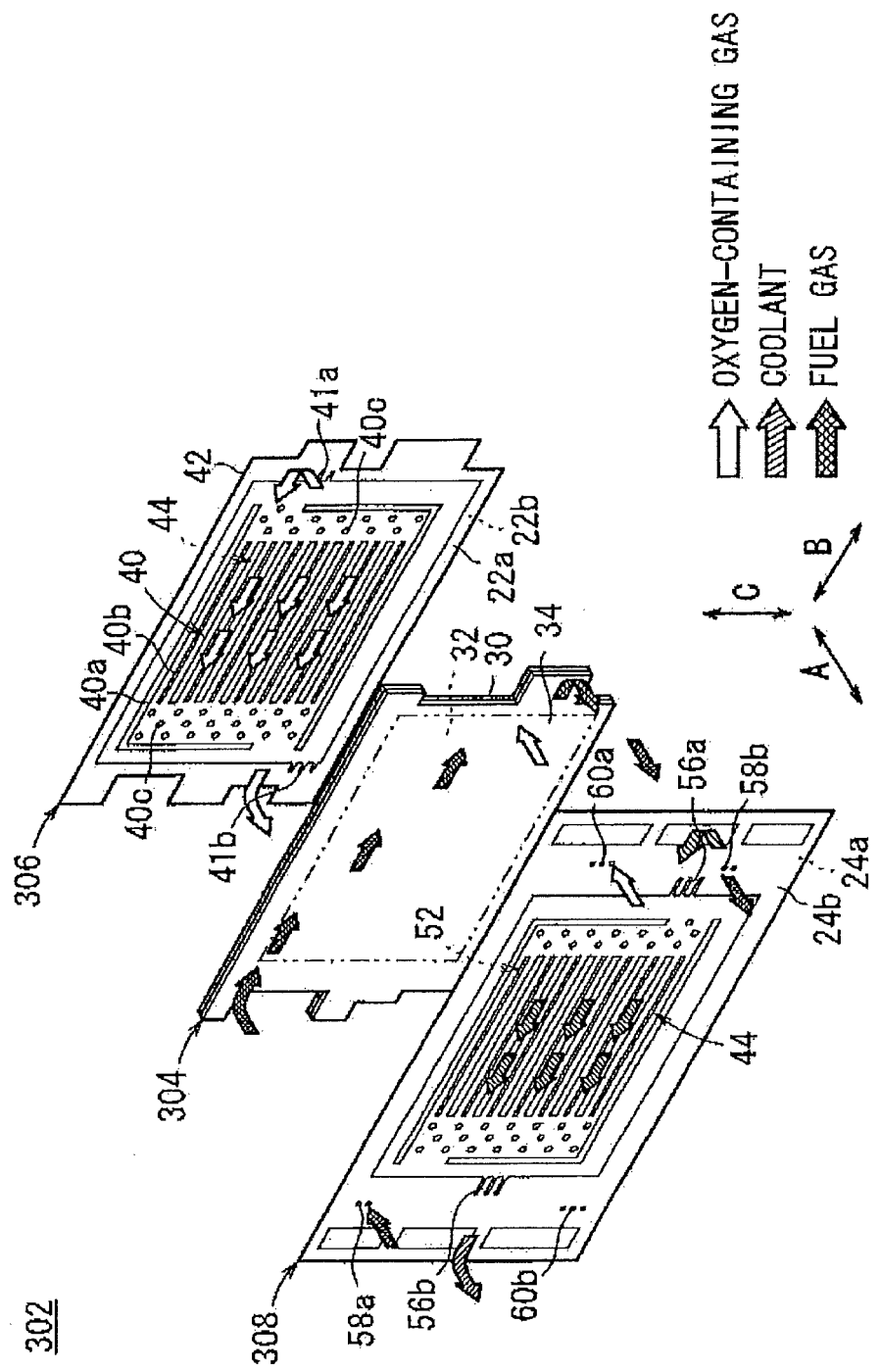
FIG. 32 is an exploded perspective view showing a unit cell of the fuel cell.

The fuel cell 300 is formed by stacking a plurality of unit cell 302 in the direction indicated by the arrow A. The unit cell 302 is formed by sandwiching the membrane electrode assembly (electrolyte electrode assembly) 304 between a first metal separator 306 and a second metal separator 308 (see FIGS. 31 and 32). The membrane electrode assembly 304 includes a solid polymer electrolyte membrane 30, a cathode 32, and an anode 34. The outer dimensions (surface areas) of the solid polymer electrolyte membrane 30, the cathode 32, and the anode 34 are the same.

The outer dimensions of the first metal separator 306 are smaller than the outer dimensions of the second metal separator 308. In effect, the first metal separator 306 has the same structure as the first metal separator 22 of the first embodiment.

Figure 33:
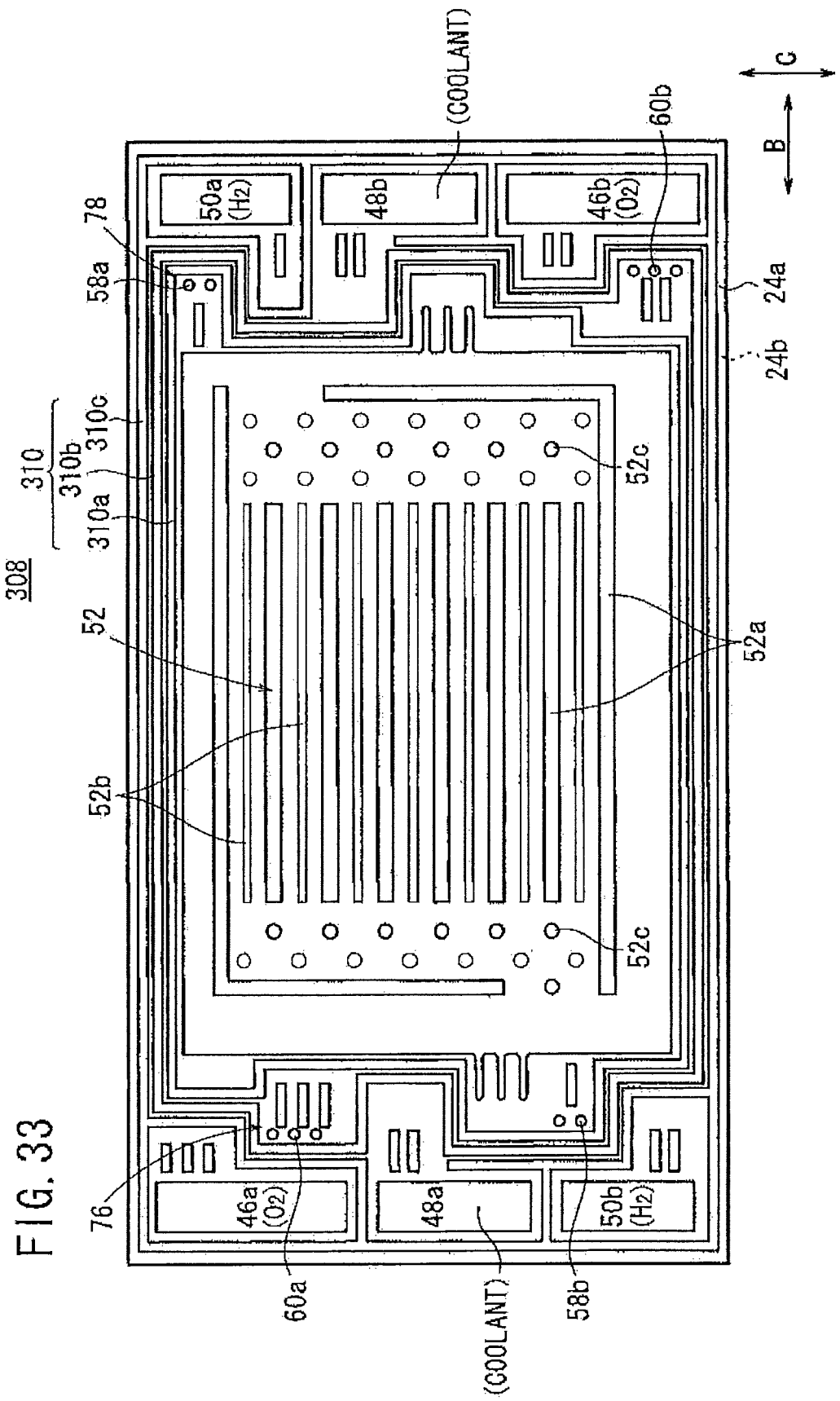
FIG. 33 is a view showing one surface of a second metal separator of the unit cell.

A seal member 310 is formed integrally with the second metal separator 308. As shown in FIGS. 31 and 33, on the surface 24a, the seal member 310 includes a first seal 310a, a second seal 310b, and a third seal 310c formed around the first fuel gas flow field 52.

The first seal 310a for preventing leakage of the fuel gas contacts the outer end of the solid polymer electrolyte membrane 30, the second seal 310b for preventing leakage of the oxygen-containing gas contacts the outer end of the first metal separator 306, and the third seal 310c for preventing leakage of the coolant contacts the second metal separator 308 of the adjacent unit cell 302 (see FIG. 31).

In the twelfth embodiment having the above structure, instead of adopting the first membrane electrode assembly 20a and the second membrane electrode assembly 20b including the electrodes having different sizes (referred to as a stepped MEA) according to the first embodiment, the membrane electrode assembly 304 including the electrodes having the same size as the solid polymer electrolyte membrane is adopted. Also in the structure, the same advantages as in the case of the above described embodiments are obtained.

Figure 34:
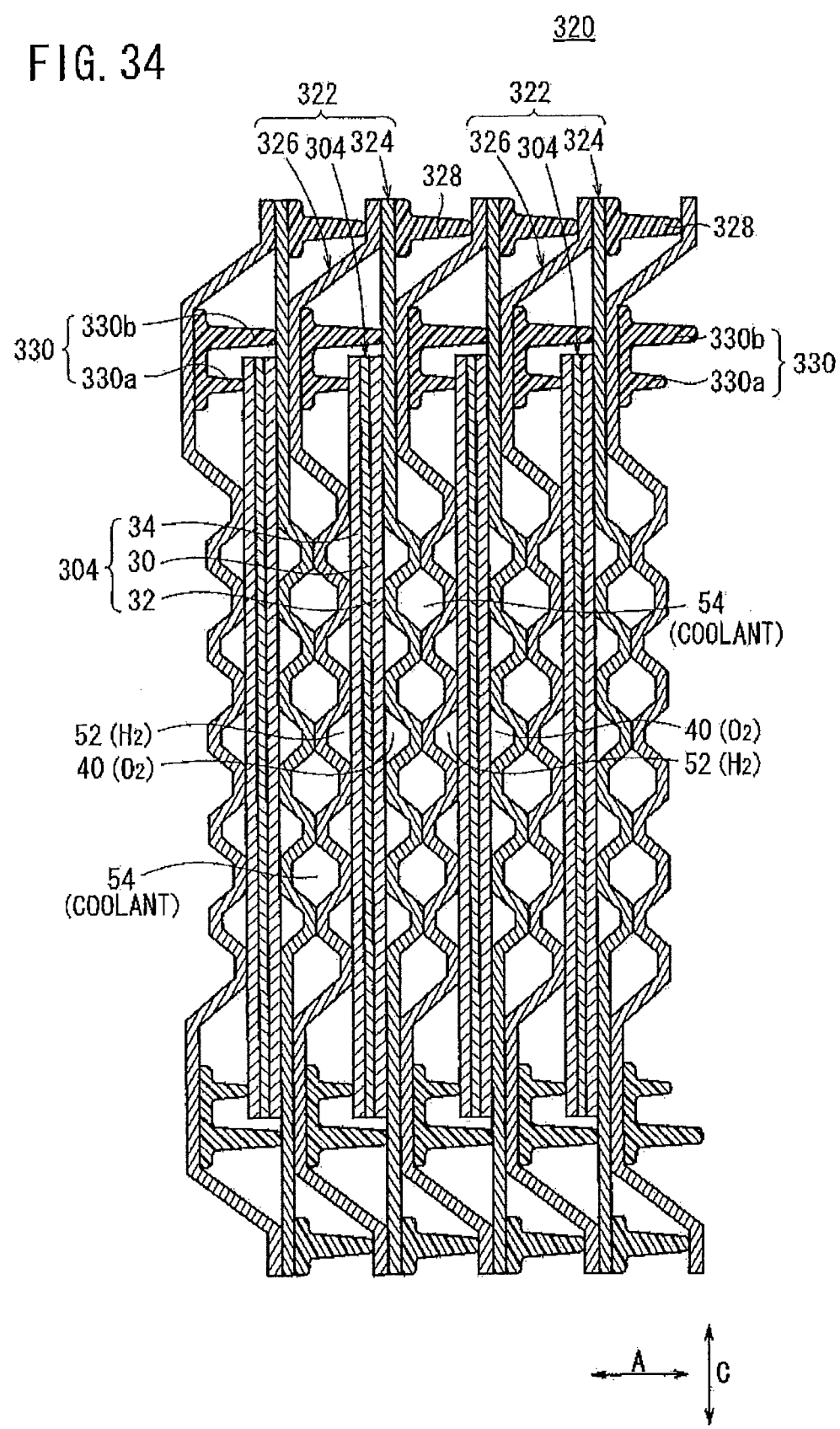
FIG. 34 is a cross sectional view showing a fuel cell according to a thirteenth embodiment of the present invention.

FIG. 34 is a cross sectional view showing a fuel cell 320 according to a thirteenth embodiment of the present invention.

The fuel cell 320 is formed by stacking a plurality of unit cells 322 in a direction indicated by the arrow A. The unit cell 322 includes a membrane electrode assembly 304, a first metal separator 324, and a second metal separator 326. The outer dimensions of the first metal separator 324 are substantially the same as the outer dimensions of the second metal separator 326.

Figure 35:
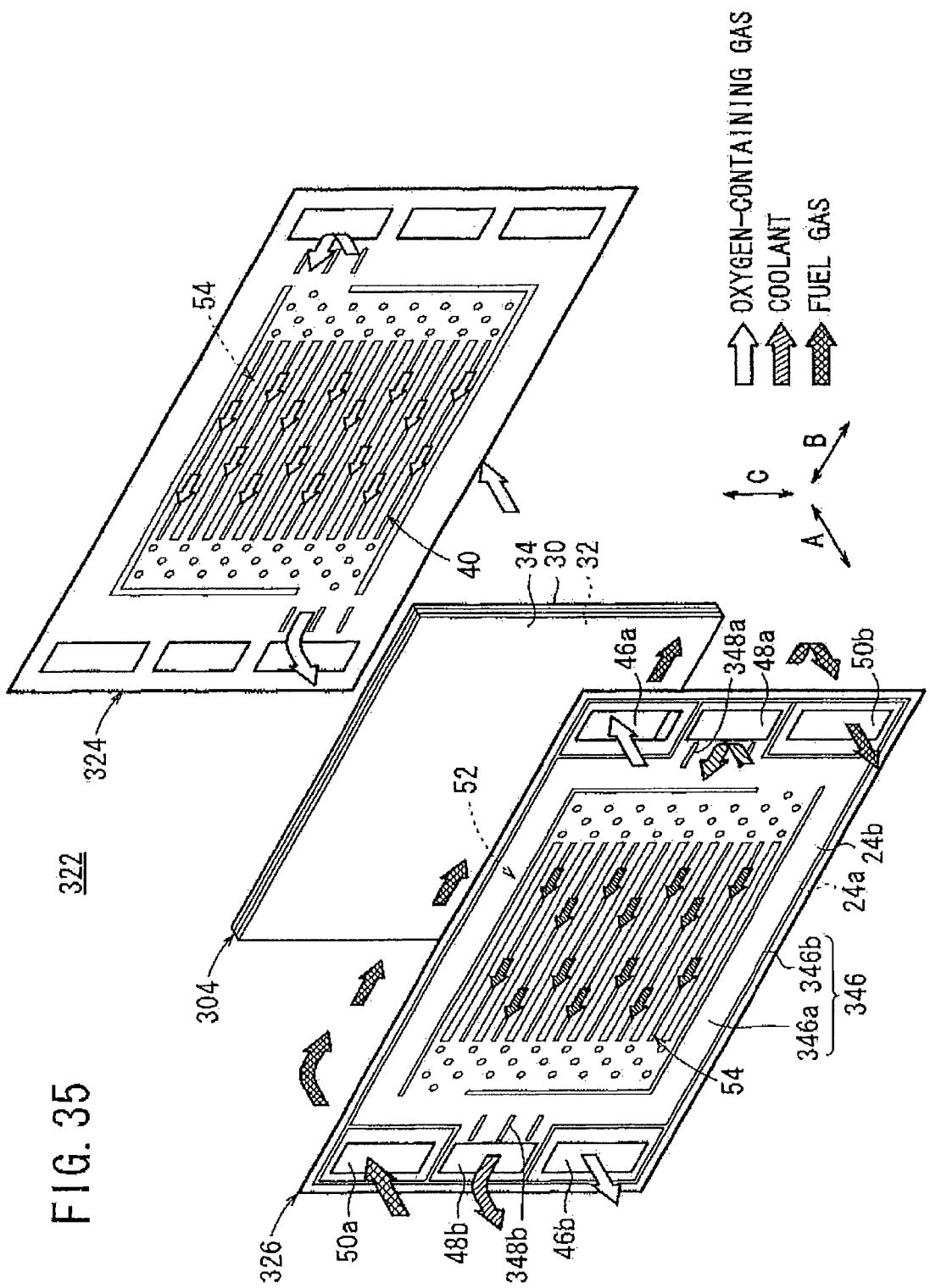
FIG. 35 is an exploded perspective view showing a unit cell of the fuel cell.
Figure 36:
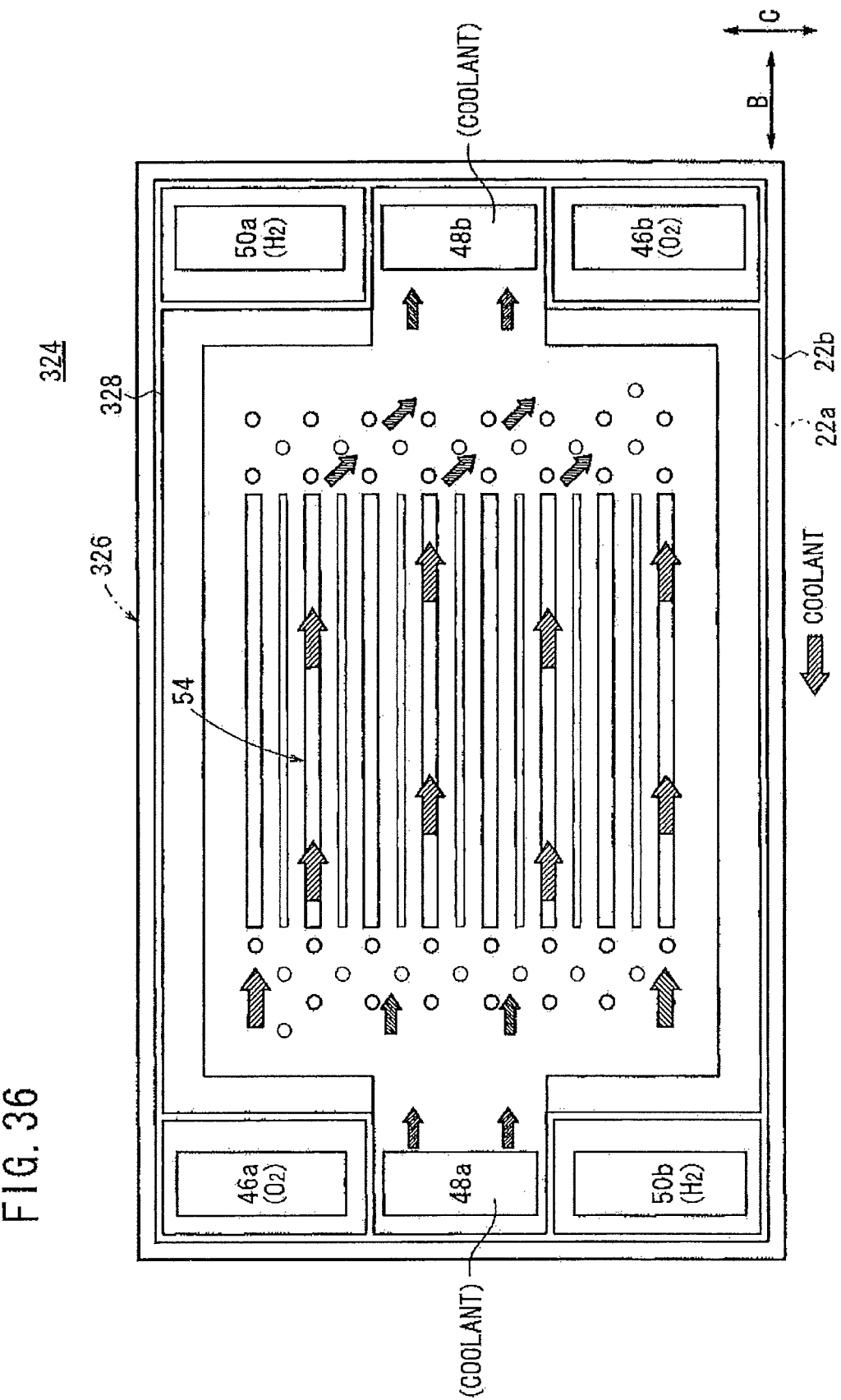
FIG. 36 is a front view showing a first metal separator of the unit cell.
Figure 37:
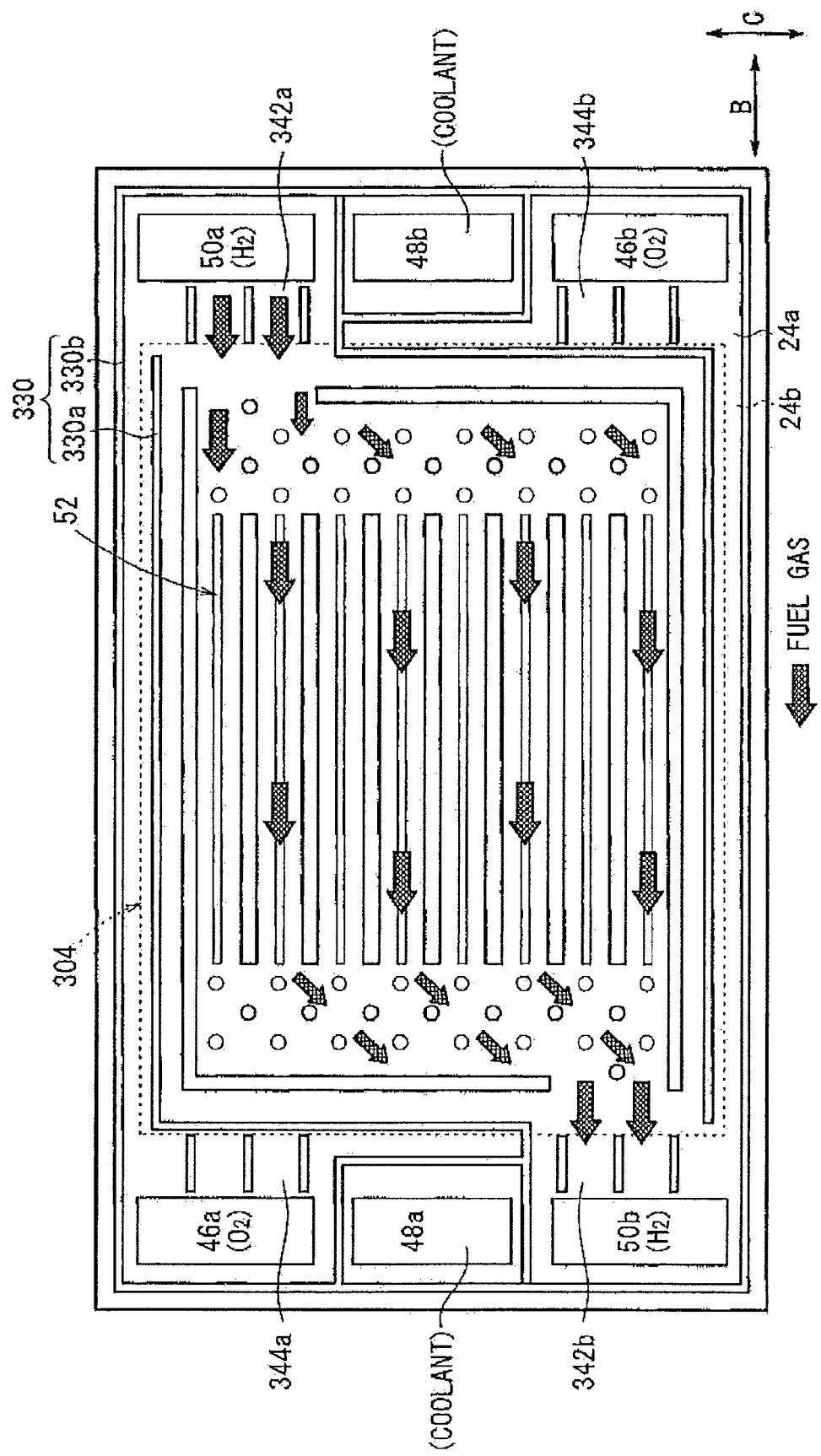
FIG. 37 is a view showing one surface of a second metal separator of the unit cell.

As shown in FIGS. 35 to 37, an oxygen-containing gas supply passage 46a, a coolant supply passage 48a, a fuel gas discharge passage 50b, a fuel gas supply passage 50a, a coolant discharge passage 48b, and an oxygen-containing gas discharge passage 46b extend through the first metal separator 324 and the second metal separator 326 in the stacking direction indicated by the arrow A.

As shown in FIGS. 34 and 36, an outer seal (third seal) 328 is formed integrally on a surface 22b of the first metal separator 324 around the coolant flow field 44, along the outer end of the surface 22b.

As shown in FIG. 37, a seal member 330 is formed integrally on a surface 24a of the second metal separator 326 around the fuel gas flow field 52. The seal member 330 includes an inner seal (first seal) 330a and an intermediate seal (second seal) 330b. The inner seal 330a contacts the outer end of the membrane electrode assembly 304 (see FIG. 34). The intermediate seal 330b contacts outer end of the first metal separator 324 such that the membrane electrode assembly 304 is sandwiched between the intermediate seal 330b and the first metal separator 324.

As shown in FIG. 37, the seal member 330 seals the oxygen-containing gas supply passage 46a, the oxygen-containing gas discharge passage 46b, the coolant supply passage 48a, and the coolant discharge passage 48b while allowing the fuel gas supply passage 50a and the fuel gas discharge passage 50b to be connected to the fuel gas flow field 52.

Grooves 342a are formed by the seal member 330 between the fuel gas supply passage 50a and the fuel gas flow field 52, and grooves 342b are formed by the seal member 330 between the fuel gas discharge passage 50b and the fuel gas flow field 52. Grooves 344a are formed near the oxygen-containing gas supply passage 46a, and grooves 344b are formed near the oxygen-containing gas discharge passage 46b.

In the fuel cell 320 having the above structure, the oxygen-containing gas supplied to the oxygen-containing gas supply passage 46a of each unit cell 322 flows through the grooves 344a of the second metal separator 326 (see FIG. 37), and the oxygen-containing gas is supplied to the oxygen-containing gas flow field 40 of the first metal separator 324 (see FIG. 35). The oxygen-containing gas consumed in the reaction in the oxygen-containing gas flow field 40 flows through the grooves 344b of the second metal separator 326, and the oxygen-containing gas is discharged to the oxygen-containing gas discharge passage 46b.

As shown in FIG. 37, the fuel gas supplied to the fuel gas supply passage 50a of each unit cell 322 flows through the grooves 342a, and the fuel gas is supplied to the fuel gas flow field 52. The fuel gas consumed in the fuel gas flow field 52 is discharged to the fuel gas discharge passage 50b through the grooves 342b.

The coolant supplied to the coolant supply passage 48a is supplied to the coolant flow field 54 (see FIG. 36). After the coolant is used for cooling each unit cell 322, the coolant is discharged to the coolant discharge passage 48b.

In the thirteenth embodiment, the outer seal 328 for preventing leakage of the coolant is provided in the outer end of the first metal separator 324, and the inner seal 330a for preventing leakage of the fuel gas, and the intermediate seal 330b for preventing leakage of the oxygen-containing gas are provided in the second metal separator 326. The outer seal 328, the inner seal 330a, and the intermediate seal 330b are offset from one another in the stacking direction. Thus, the same advantages as in the cases of the above described embodiments are obtained. For example, the dimension of the fuel cell 320 in the stacking direction is reduced as much as possible, and the overall size of the fuel cell 320 is reduced easily.

Figure 38:
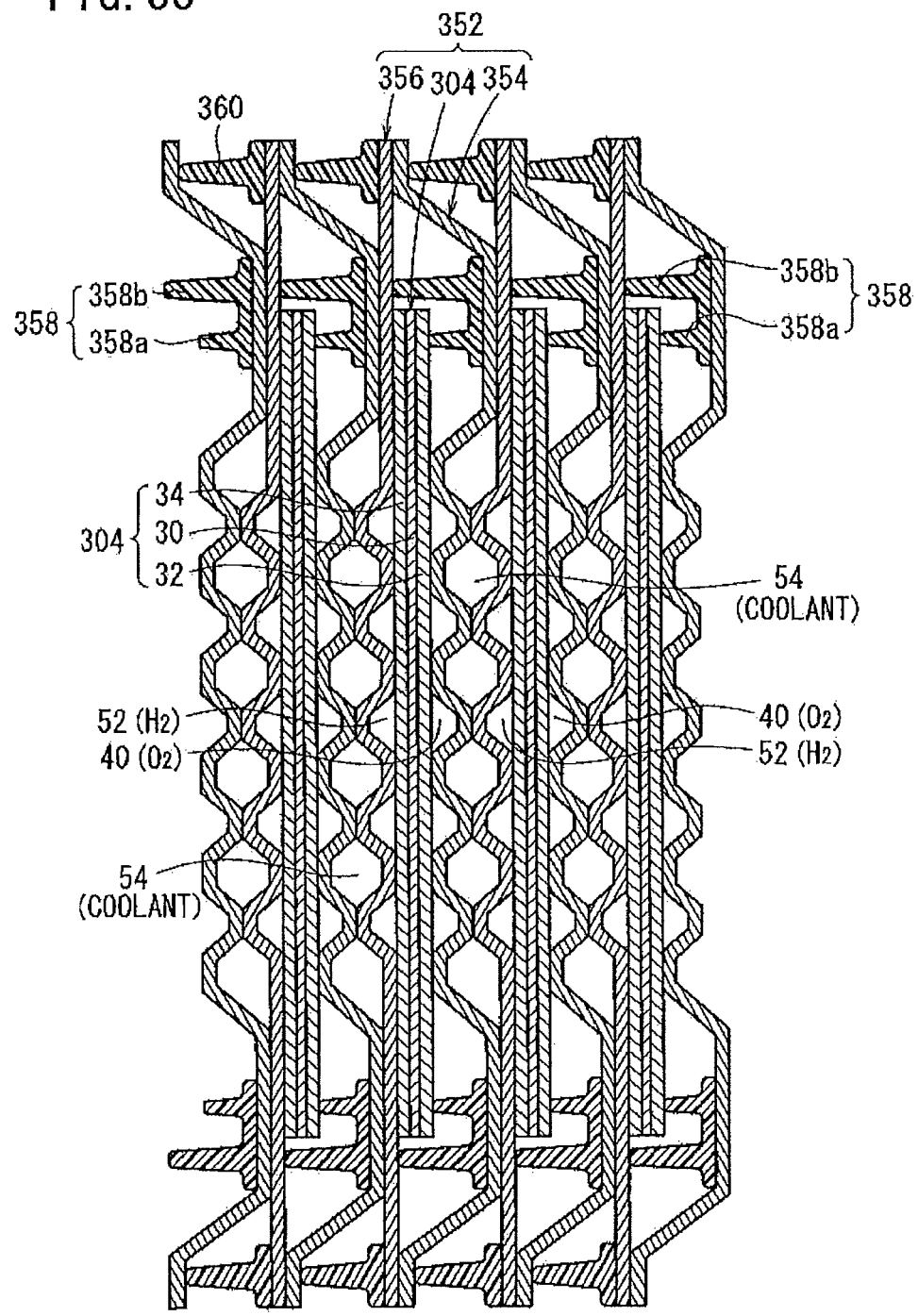
FIG. 38 is a cross sectional view showing a fuel cell according to a fourteenth embodiment of the present invention.

FIG. 38 is a cross sectional view showing a fuel cell 350 according to a fourteenth embodiment of the present invention.

The fuel cell 350 includes a plurality of unit cells 352. Each of the unit cells 352 is formed by stacking a membrane electrode assembly 304 between a first metal separator 354 and a second metal separator 356.

Figure 39:
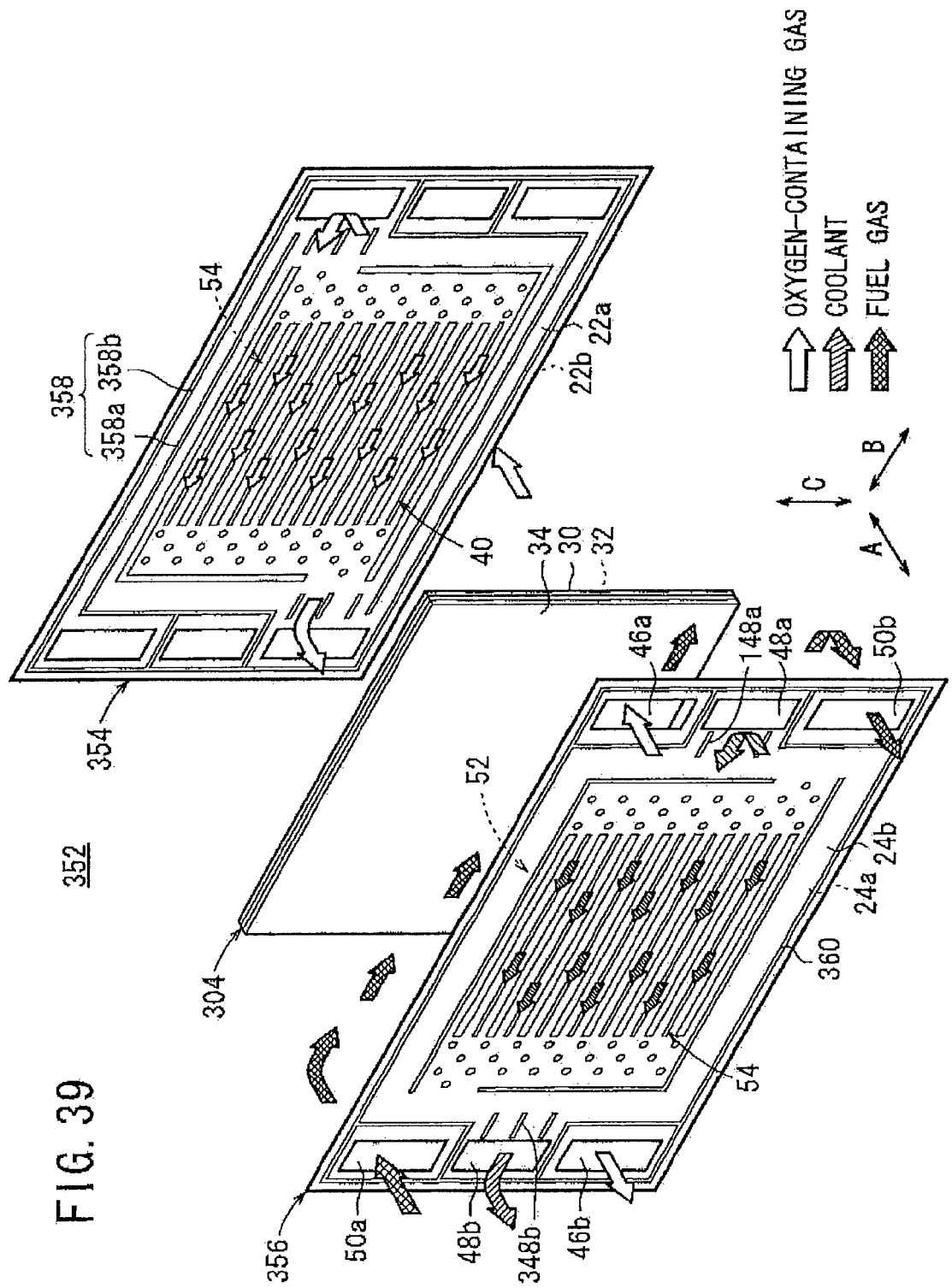
FIG. 39 is an exploded perspective view showing a unit cell of the fuel cell.

As shown FIG. 39, the seal member 358 is formed integrally on the surface 22a of the first metal separator 354 around the oxygen-containing gas flow field 40. The seal member 358 includes an inner seal (second seal) 358a and an intermediate seal (first seal) 358b. The inner seal 358a contacts the outer end of the cathode 32 of the membrane electrode assembly 304. The intermediate seal 358b is formed around the membrane electrode assembly 304, and contacts the second metal separator 356 (see FIG. 38).

An outer seal (third seal) 360 is formed integrally on the surface 24b of the second metal separator 356 around the coolant flow field 54, around the outer end of the surface 24b.

In the fourteenth embodiment, the inner seal 358a for preventing leakage of the oxygen-containing gas, the intermediate seal 358b for preventing leakage of the fuel gas, and the outer seal 360 for preventing leakage of the coolant are offset from one another in the stacking direction. Thus, the same advantages as in the cases of the above described embodiments are obtained.

Figure 40:
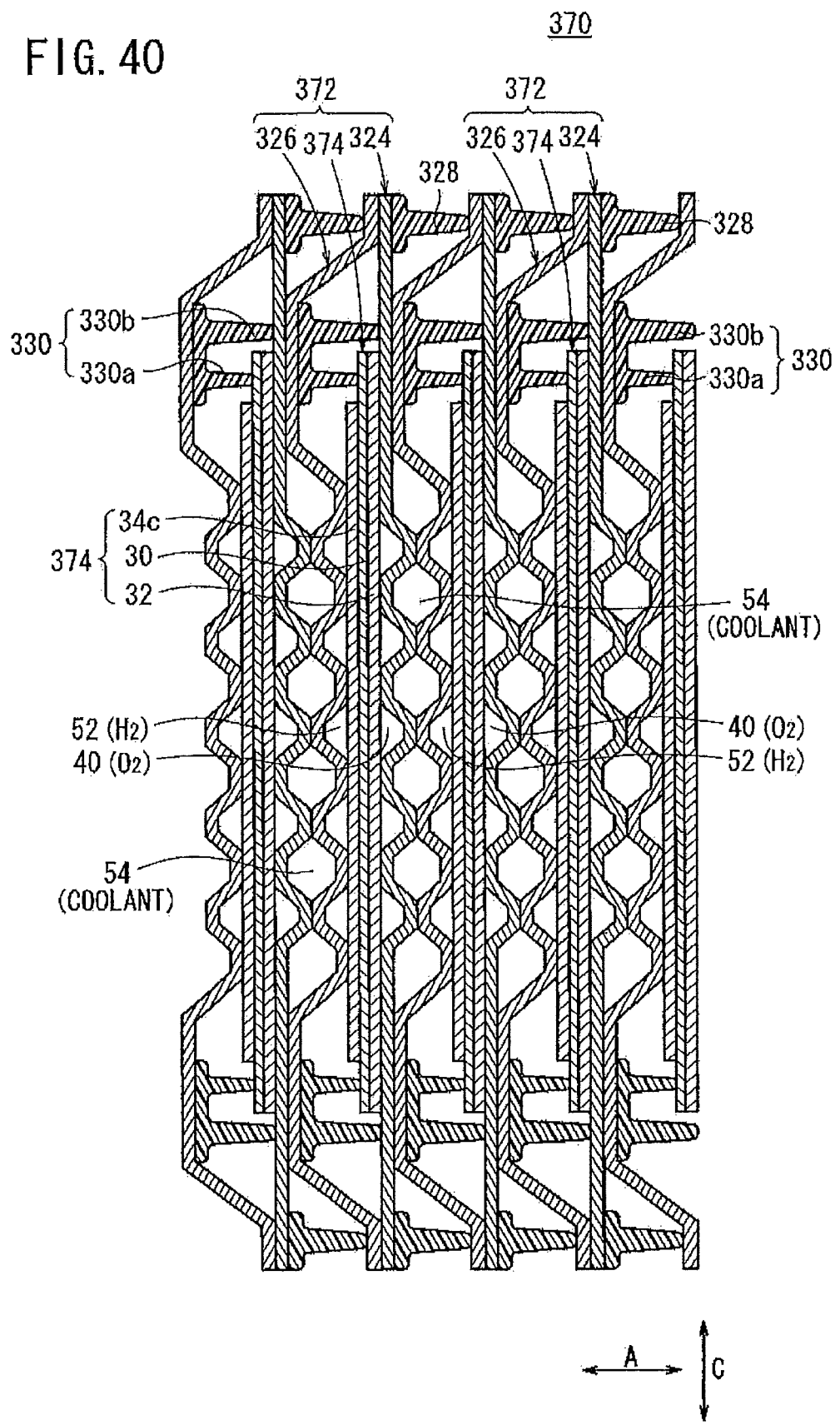
FIG. 40 is a cross sectional view showing a fuel cell according to a fifteenth embodiment of the present invention.

FIG. 40 is a cross sectional view showing a fuel cell 370 according to a fifteenth embodiment of the present invention.

Figure 41:
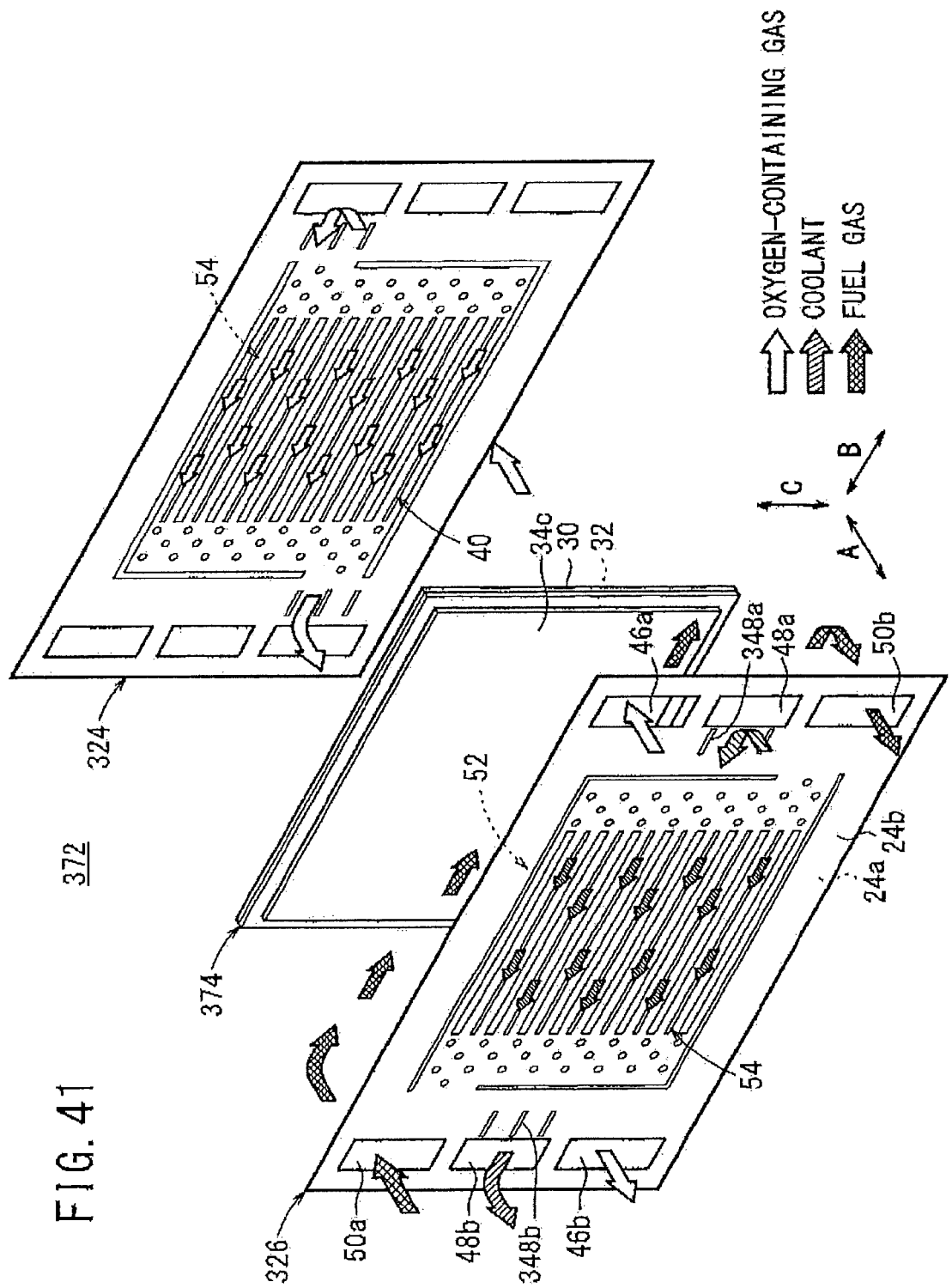
FIG. 41 is an exploded perspective view showing a unit cell of the fuel cell.

The fuel cell 370 includes unit cells 372 each including a membrane electrode assembly 374, a first metal separator 324, and a second metal separator 326. As shown in FIGS. 40 and 41, the membrane electrode assembly 374 includes an anode 34c having a surface area smaller than the surface areas of the solid polymer electrolyte membrane 30 and the cathode 32.

In the fifteenth embodiment having the above structure, the same advantages as in the case of the fuel cell 320 according to the thirteenth embodiment are obtained.

Figure 42:
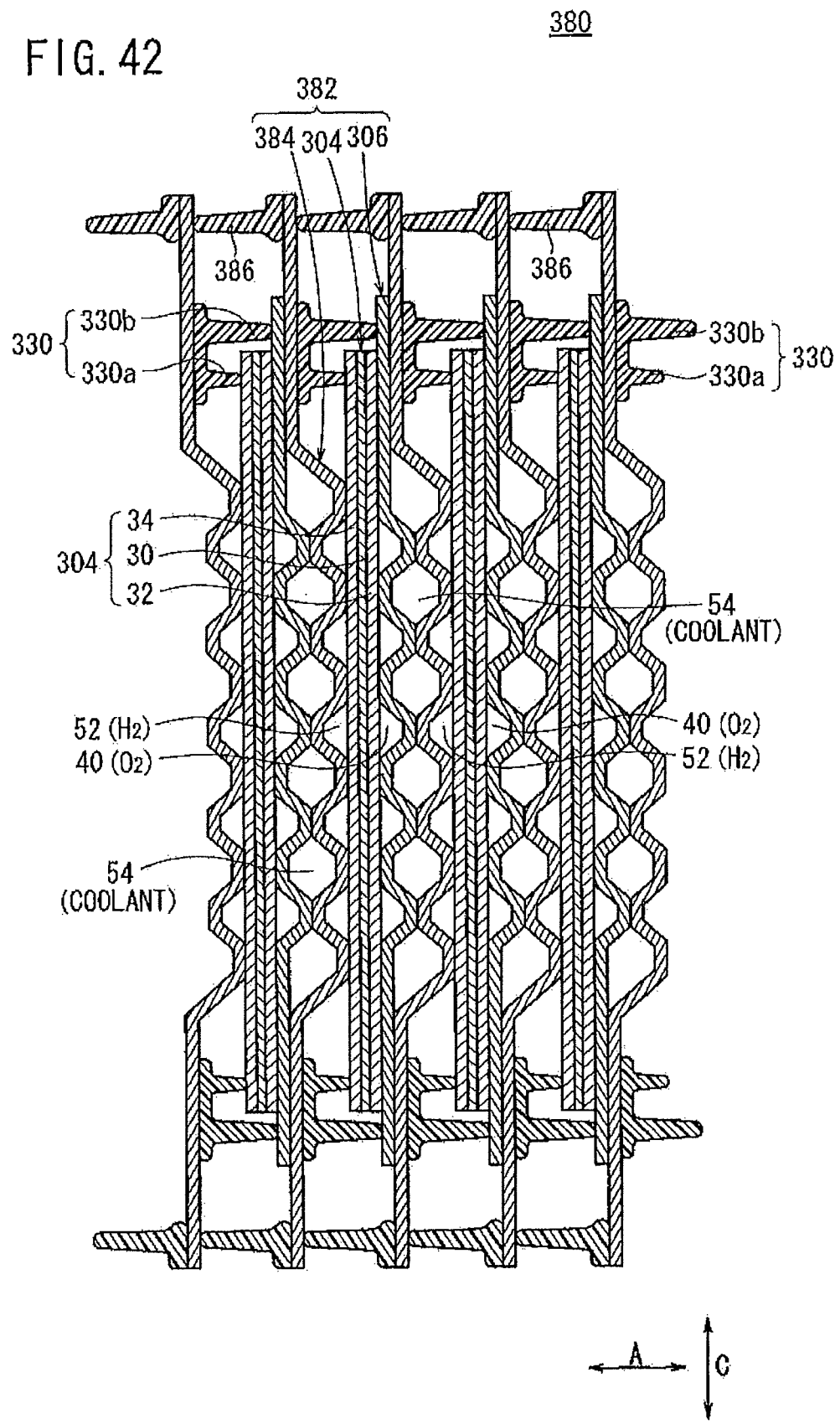
FIG. 42 is a cross sectional view showing a fuel cell according to a sixteenth embodiment of the present invention.

FIG. 42 is a cross sectional view showing a fuel cell 380 according to a sixteenth embodiment of the present invention.

Figure 43:
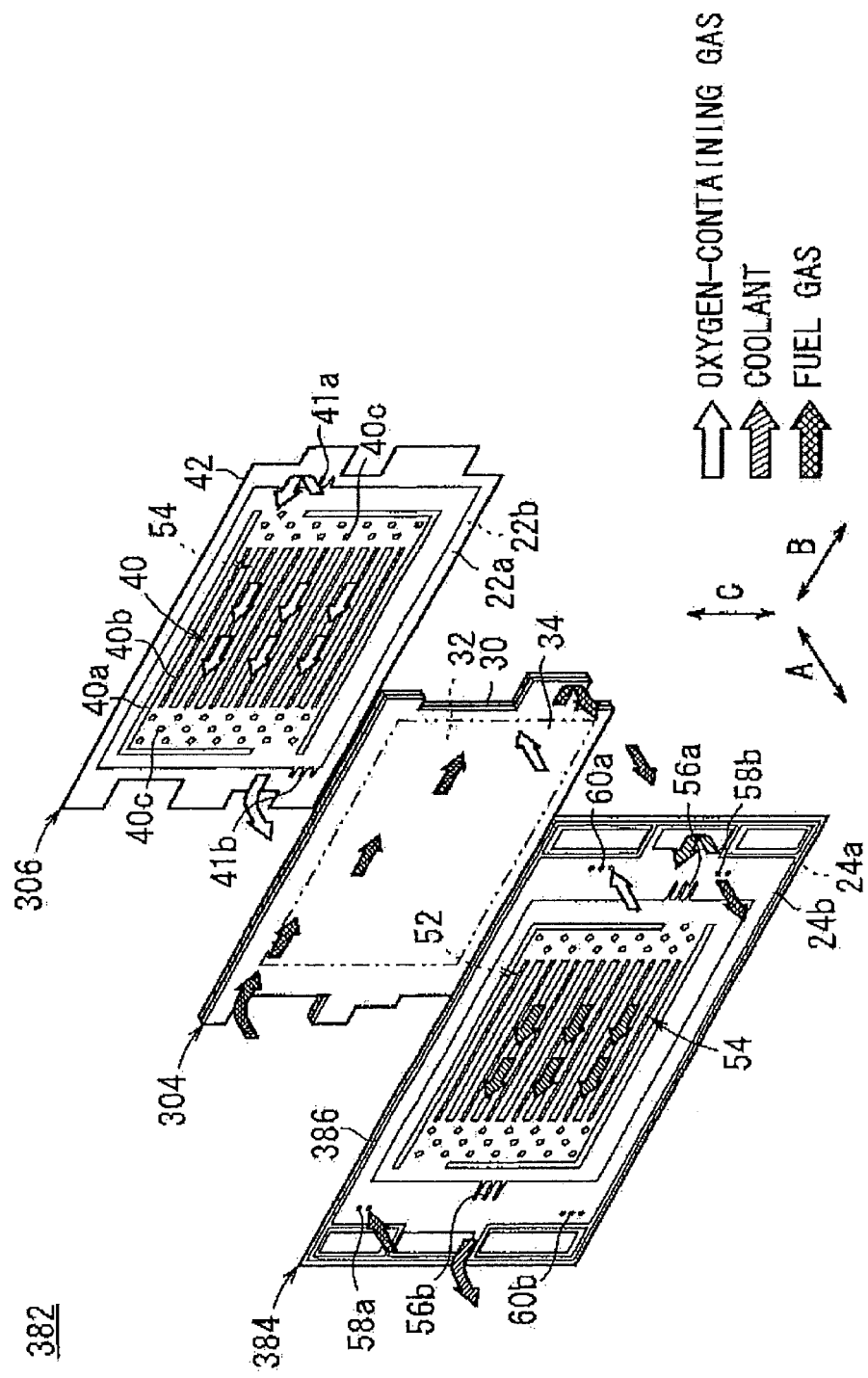
FIG. 43 is an exploded perspective view showing a unit cell of the fuel cell.

The fuel cell 380 includes unit cells 382 each formed by sandwiching a membrane electrode assembly 304 between the first metal separator 306 and the second metal separator 384 (see FIGS. 42 and 43). A seal member 330 having an inner seal 330a and an intermediate seal 330b is formed integrally on the surface 24a of the second metal separator 384. An outer seal (third seal) 386 is formed integrally on the surface 24b of the second metal separator 384. The outer seal (third seal) 386 contacts the surface 24a of the adjacent second metal separator 384 to prevent leakage of the coolant (see FIG. 42).

In the sixteenth embodiment having the above structure, the inner seal 330a, the intermediate seal 330b, and the outer seal 386 are offset from one another in the stacking direction, and the same advantages as in the cases of the above described embodiments are obtained.

Figure 44:
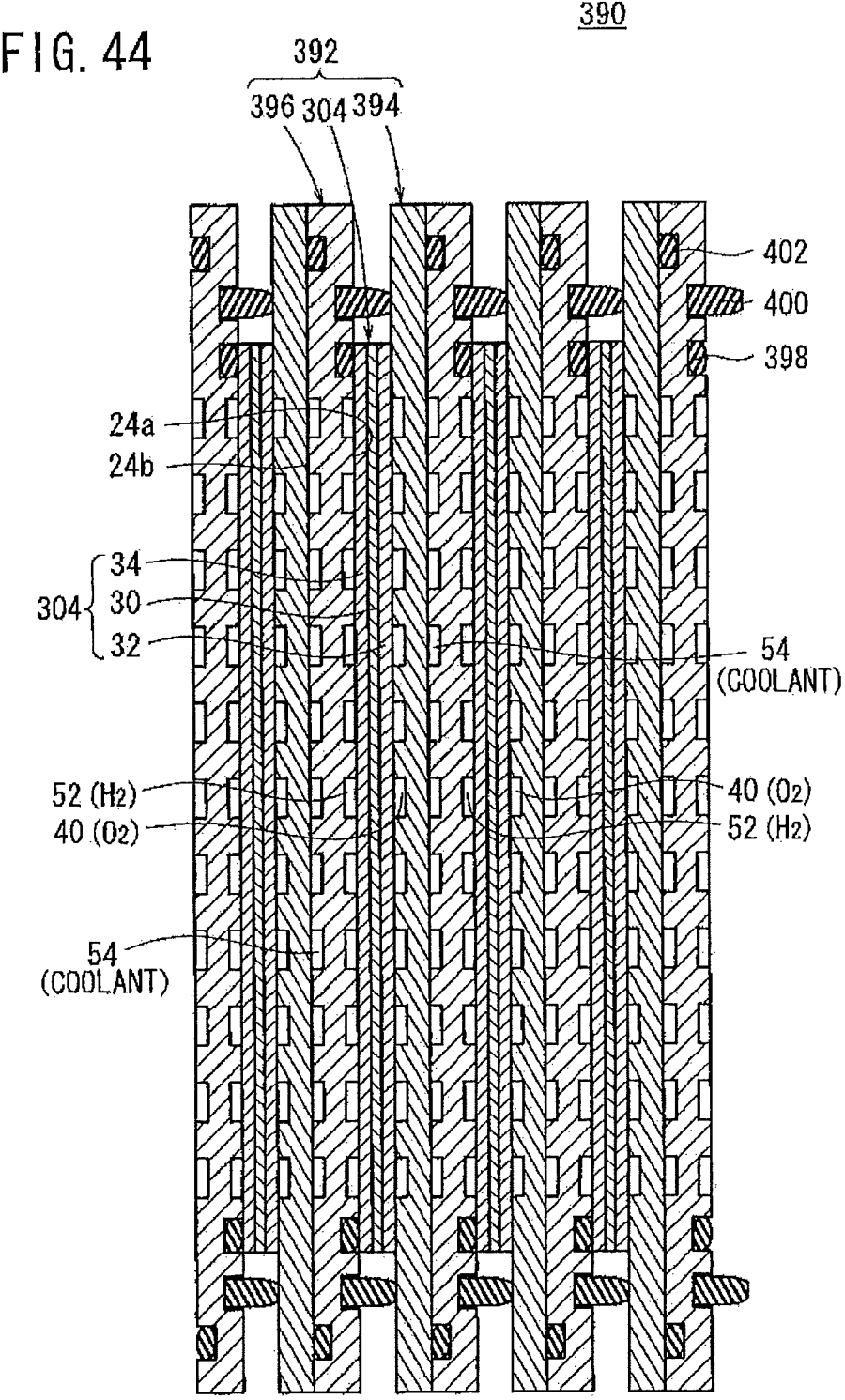
FIG. 44 is a cross sectional view showing a fuel cell stack according to a seventeenth embodiment of the present invention.
Figure 45:
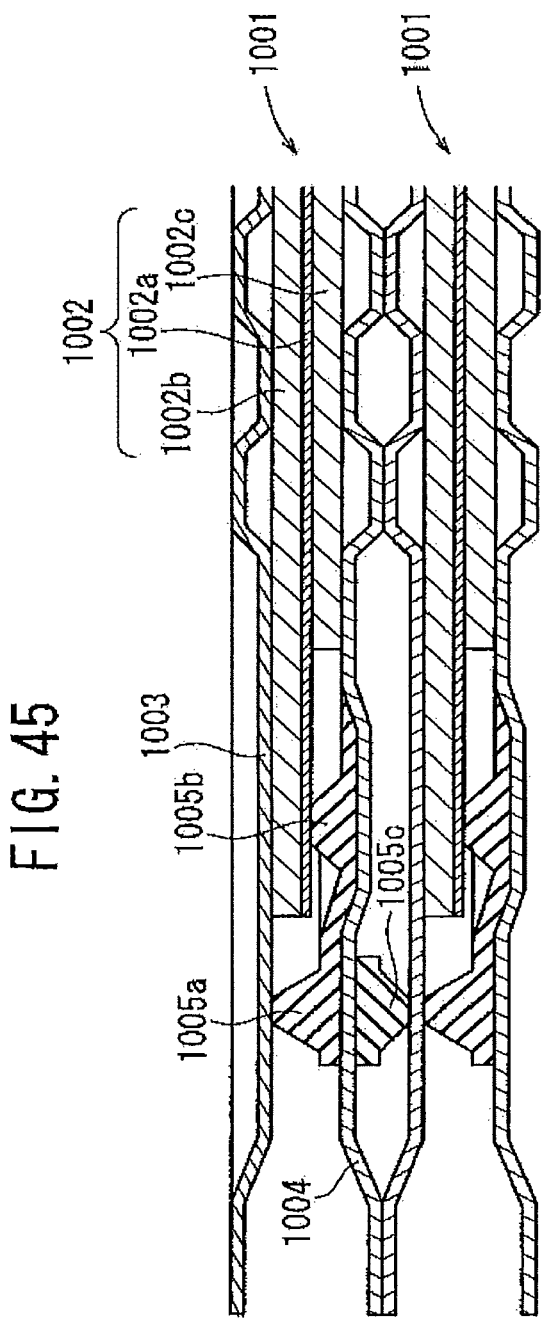
FIG. 45 is a view showing a conventional fuel cell stack.
Figure 46:
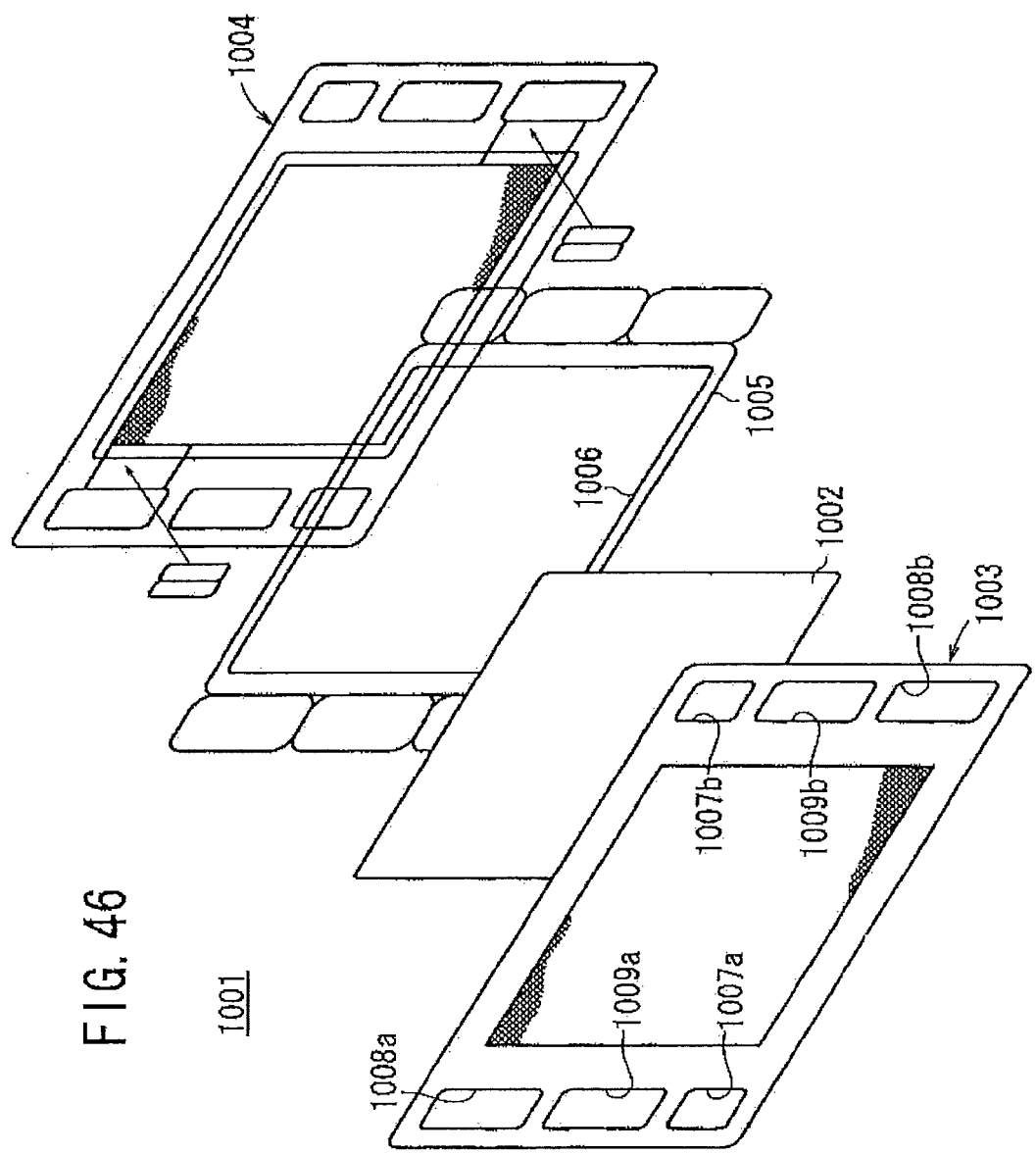
FIG. 46 is a view showing the fuel cell.
Figure 47:
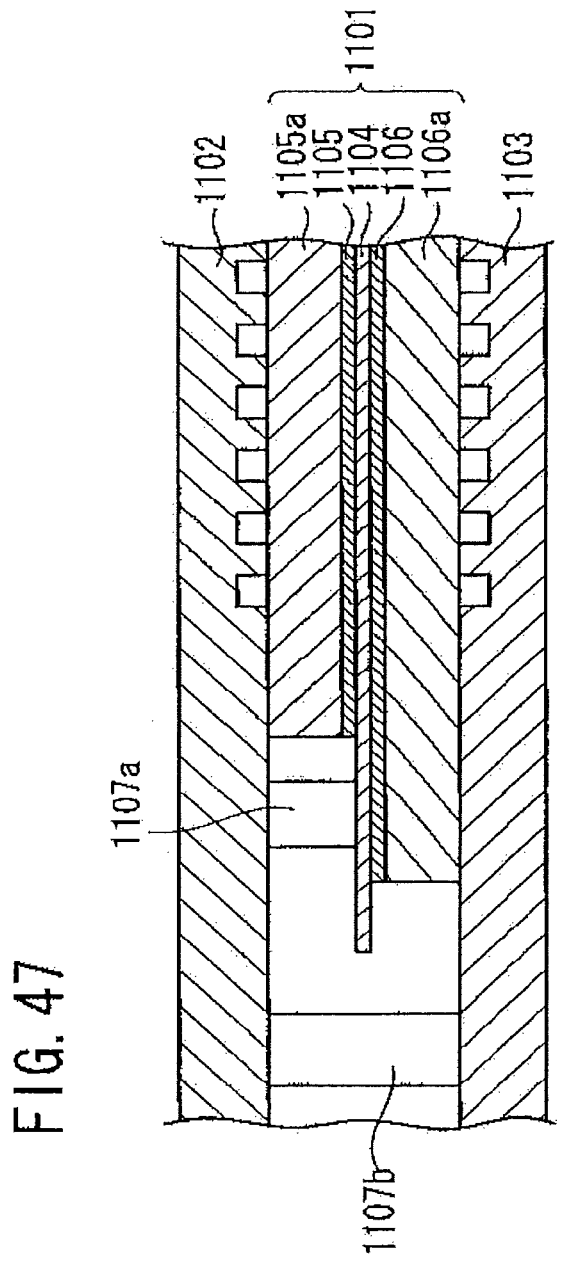
FIG. 47 is a view showing a conventional fuel cell.
Figure 48:
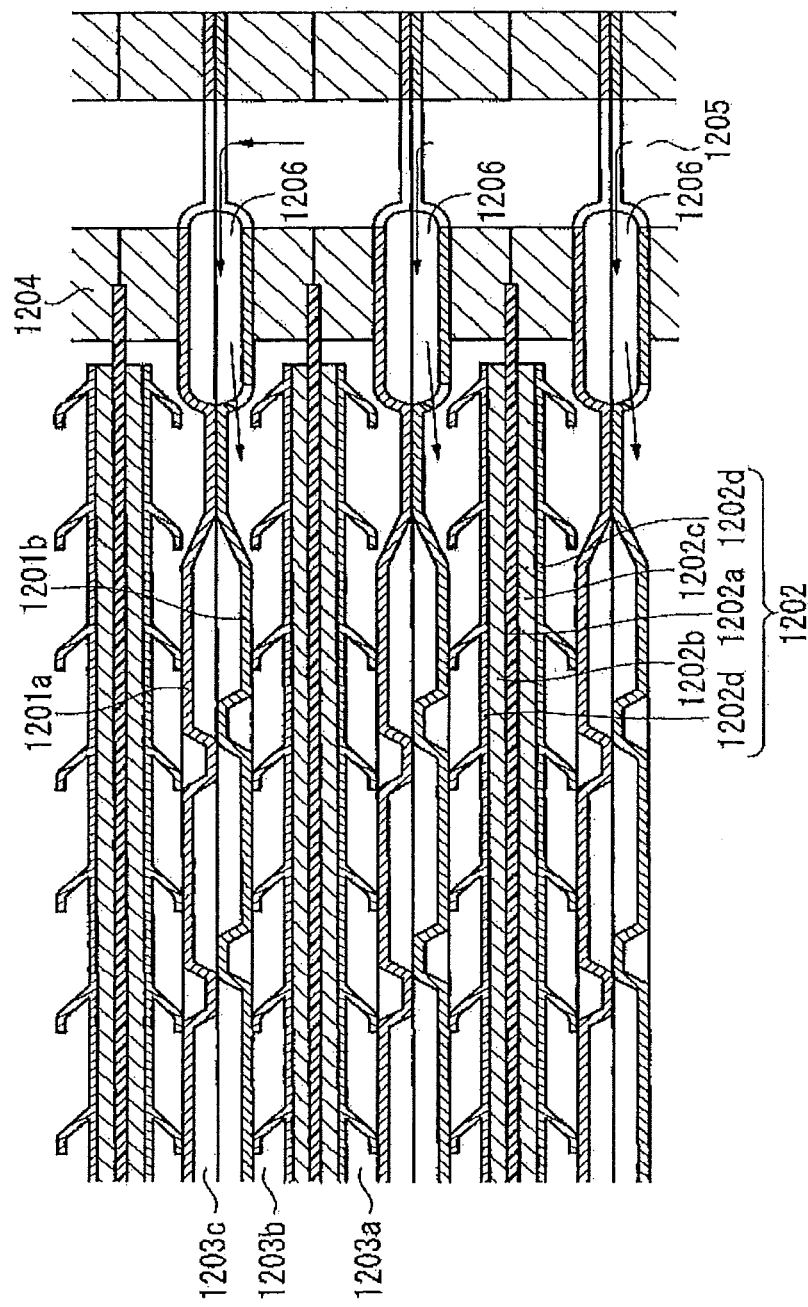
FIG. 48 is a view showing a conventional process control apparatus.

FIG. 44 is a cross sectional view showing a fuel cell 390 according to a seventeenth embodiment of the present invention.

The fuel cell 390 includes unit cells 392 each having a membrane electrode assembly 304, a first carbon separator 394, and a second carbon separator 396. A first seal 398 as an inner seal member and a second seal 400 as an intermediate seal member are formed on the surface 24a of the second carbon separator 396. The first seal 398 contacts the outer end of the membrane electrode assembly 304 for preventing leakage of the fuel gas, and the second seal 400 contacts the first carbon separator 394 such that the membrane electrode assembly 304 is sandwiched between the second seal 400 and the first carbon separator 394 for preventing leakage of the oxygen-containing gas.

A third seal 402 for preventing leakage of the coolant is formed on the surface 24b of the second carbon separator 396. The third seal 402 contacts the outer end of the first carbon separator 394 of the adjacent unit cell 392 for preventing leakage of the coolant.

The first seal 398, the second seal 400, and the third seal 402 are offset from one another in the stacking direction, and the same advantages as in the cases of the above described embodiments are obtained. For example, the overall dimension of the fuel cell 390 in the stacking direction is reduced as much as possible.

The invention claimed is:

1. A fuel cell comprising stacked unit cells each including an electrolyte electrode assembly and a first separator and a second separator sandwiching the electrolyte electrode assembly, the electrolyte electrode assembly including an anode, a cathode, and an electrolyte interposed between the anode and the cathode, a fuel gas flow field for supplying a fuel gas along the anode and an oxygen-containing gas flow field for supplying an oxygen-containing gas along the cathode being formed in the unit cells, a coolant flow field for supplying a coolant along an electrode surface being formed between the unit cells at intervals of every predetermined number of the unit cells, wherein at least the first separator or the second separator includes a first seal surrounding the fuel gas flow field for preventing leakage of the fuel gas, a second seal surrounding the oxygen-containing gas flow field for preventing leakage of the oxygen-containing gas, and a third seal surrounding the coolant flow field for preventing leakage of the coolant; and all of the first seal, the second seal and the third seal are offset from one another when viewed from a stacking direction.

2. A fuel cell according to claim 1, wherein the first seal forms an inner seal, the second seal forms an intermediate seal, and the third seal forms an outer seal.

3. A fuel cell according to claim 1, wherein the third seal forms an inner seal, the first seal forms an intermediate seal, and the second seal member forms an outer seal.

4. A fuel cell according to claim 1, wherein the second seal forms an inner seal, the first seal forms an intermediate seal, and the third seal member forms an outer seal.

5. A fuel cell according to claim 1, wherein a fuel gas supply passage, a fuel gas discharge passage, an oxygen-containing gas supply passage, an oxygen-containing gas discharge passage, a coolant supply passage, and a coolant discharge passage extend through an outer end of at least one of the first separator and the second separator in the stacking direction.

* * * * *